(12) United States Patent
Kudo

(10) Patent No.: US 7,156,155 B2
(45) Date of Patent: Jan. 2, 2007

(54) HEAT STORAGE UNIT AND MANUFACTURING METHOD THEREFOR

(75) Inventor: Tomohide Kudo, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 391 days.

(21) Appl. No.: 10/489,478

(22) PCT Filed: Sep. 25, 2002

(86) PCT No.: PCT/JP02/09835

§ 371 (c)(1),
(2), (4) Date: Mar. 11, 2004

(87) PCT Pub. No.: WO03/027592

PCT Pub. Date: Apr. 3, 2003

(65) Prior Publication Data

US 2004/0251011 A1 Dec. 16, 2004

(30) Foreign Application Priority Data

| Sep. 25, 2001 | (JP) | ............................ 2001-291050 |
| Feb. 13, 2002 | (JP) | ............................ 2002-035659 |
| Feb. 25, 2002 | (JP) | ............................ 2002-048335 |
| May 17, 2002 | (JP) | ............................ 2002-143347 |
| Jul. 4, 2002 | (JP) | ............................ 2002-195827 |

(51) Int. Cl.
*F28D 17/00* (2006.01)

(52) U.S. Cl. .................................. 165/10; 165/104.21

(58) Field of Classification Search .................. 165/10, 165/110, 280, 283–285, 297, 104.21
See application file for complete search history.

(56) References Cited

U.S. PATENT DOCUMENTS 5,143,148 A * 9/1992 Merryfull ..................... 165/10
5,449,035 A * 9/1995 Strahle et al. ................ 165/10

FOREIGN PATENT DOCUMENTS

JP 158028 10/1989

(Continued)

*Primary Examiner*—Teresa J. Walberg
(74) *Attorney, Agent, or Firm*—Hamre, Schumann, Mueller & Larson, PC

(57) ABSTRACT

As a heat storage unit wherein, the volume variation of a heat storage material can be absorbed without an accompanying decrease in heat capacity, decrease in heat transfer coefficient, and oxidation and deterioration of the heat storage material due to oxygen in the air, so that the heat storage capacity can be adequately maintained and high performance can be attained, and moreover, the number of parts and the cost can be reduced, there is provided on the outside of a main member having; a fluid passage formation section which forms a fluid passage for circulating a fluid introduced from an inlet, on the inside of an outer wall section, and a heat storage material filling space formation section which forms a heat storage material filling space for filling with a heat storage material for which the volume varies corresponding to the heat storage condition, adjacent to the fluid passage, a passage switching section which selectively switches a flow-in destination of a fluid introduced from the inlet by the position of a travelling member which travels due to the volume variation of the heat storage material, to the fluid passage or to a bypass passage which bypasses the fluid passage to discharge the fluid.

41 Claims, 43 Drawing Sheets

FOREIGN PATENT DOCUMENTS

| | | |
|---|---|---|
| JP | 5-4244 | 1/1993 |
| JP | 7-293908 | 11/1995 |
| JP | 9-145107 | 6/1997 |
| JP | 3106314 | 9/2000 |
| KR | 1992-0007311 | 10/1992 |
| KR | 1993-0002789 | 2/1993 |

* cited by examiner

US 7,156,155 B2

HEAT STORAGE UNIT AND MANUFACTURING METHOD THEREFOR

TECHNICAL FIELD

The present invention relates to a heat storage unit suitable for waste heat recovery, and a manufacturing method therefor.

BACKGROUND ART

For example, in an internal combustion engine, much waste heat is generated when driving. On the other hand, by applying heat when starting, start-up becomes smooth. Therefore in some cases a heat storage unit is provided so that the waste heat when driving is stored and is then used for warming up when starting.

As a device related to a conventional heat storage unit, there is for example, the one disclosed in Japanese Examined Patent Application, Second Publication No. Hei 5-4244. This heat storage unit has an inner case, a heat insulator for covering the outside of this inner case, and an outer case for covering the outside of this heat insulator. It also has a box provided with an inlet for introducing a fluid on one side of a central part, and provided with an outlet for discharging a fluid on the other side of the central part, a heat reservoir with heat storage material enclosed in an envelope and which is arranged in the box, and a core around which this heat reservoir is wrapped. The heat reservoir is wrapped around the core in a spiral shape with a plurality of spacers intervening, to thereby form crevices which become fluid passages for flowing the heat exchange fluid.

In the abovementioned heat storage unit, the heat storage material is enclosed in the envelope to form the heat reservoir, and the crevices which become fluid passages are formed with the spacers intervening, and this heat storage material is wrapped around the core in a spiral shape. As a result, there are problems in that, there are many parts, and since manufacture is complex, manufacturing cost is increased.

Moreover, another problem is that a core is always required for forming the crevices which become the fluid passages with spacers intervening, and for wrapping the heat reservoir around this in a spiral shape, and by the amount of this core, the heat storage capacity is decreased.

Therefore, it is an object of the present invention to provide a heat storage unit wherein the number of parts can be reduced, and manufacture is simplified so that manufacturing cost can be reduced, and also the heat storage capacity can be adequately maintained, and high performance can be attained, and a manufacturing method therefor.

On the other hand, in conventional heat storage units including the one mentioned above, as a heat storage material, for example, a PCM (Phase Change Material) is used. By using the latent heat of fusion when the heat storage material is converted from liquid form into solid form, a large amount of heat energy can be stored with a small size.

However, in the heat storage material including the abovementioned PCM, in some cases the density differs between liquid form and solid form and the volume varies corresponding to the heat storage condition. In a sealed space therefore, the volume variation occurring between the solid phase and liquid phase may cause deformation of the components of the heat storage unit. As a solution, generally, a specified quantity of air is enclosed in the heat storage material filling space for filling with the heat storage material, so that the volume variation is absorbed by this air.

However, in this way, in order to absorb the volume variation of the heat storage material by air without causing any deformation of components, the quantity of air to be enclosed must be set quite large, and much more than the volume variation of the heat storage material. Consequently, this may cause other problems such as a decrease in heat capacity, a decrease in heat transfer coefficient, and oxidation and deterioration of the heat storage material by the oxygen in the air.

Moreover, regarding the heat storage unit, in the heat storage process, when the heat from the fluid has been stored sufficiently to give the same temperature as that of the fluid, heat is not efficiently stored thereafter, resulting in wasteful passage resistance. Therefore, it is necessary to detect the condition of the heat storage material from the outside and to switch the fluid passage to a passage for bypassing the heat storage unit. Accordingly, there is a problem in that parts such as a sensor, three way valve, control unit and actuator are necessary, so that the number of parts is increased and cost is high.

DISCLOSURE OF INVENTION

The present invention takes into consideration the above problems, with the object of providing a heat storage unit wherein, the volume variation of the heat storage material can be absorbed without the accompanying decrease in heat capacity, decrease in heat transfer coefficient, and oxidation and deterioration of the heat storage material due to the oxygen in the air, so that the heat storage capacity can be adequately maintained and high performance can be attained. Moreover, the number of parts and the cost can be reduced.

A heat storage unit according to a first aspect of the present invention is characterized in comprising a main member (for example, the main member 1012 in the embodiment) provided with; a housing (for example, the housing 1016 in the embodiment) provided with openings; front and rear ends in the axial direction with identical cross-sections perpendicular to the axis, a fluid passage formation section (for example, the fluid passage formation section 1020 in the embodiment) which forms a fluid passage (for example, the fluid passage 1019 in the embodiment) for circulating a heat containing fluid, on the inside of the housing, and a heat storage material filling space formation section (for example, the heat storage material filling space formation section 1023 in the embodiment) which forms a heat storage material filling space (for example, the heat storage material filling space 1022 in the embodiment) for filling with a heat storage material (for example, the heat storage material 1021 in the embodiment), adjacent to the fluid passage on the inside of the housing: and a pair of lid members (for example, the lid members 1013 and 1014 in the embodiment) arranged at the front and rear ends of the main member, and the housing of the main member, the fluid passage formation section, and the heat storage material filling space formation section are integrally formed.

In this way, the housing of the main member, the fluid passage formation section which forms a fluid passage where a heat containing fluid circulates, on the inside of the housing, and the heat storage material filling space formation section which forms the heat storage material filling space for filling with a heat storage material, adjacent to the fluid passage on the inside of the housing, are integrally formed. Therefore, thereafter, all that is necessary is to fill the heat storage material into the heat storage material filling space. Compared to the arrangement where the heat storage material is enclosed in the envelope to form the heat reservoir, and the crevice which becomes the fluid passage is formed with spacers intervening, and this heat reservoir is wrapped around the core in a spiral shape, the number of parts is reduced and manufacture is simplified. Furthermore, the housing of the main member, the fluid passage formation section, and the heat storage material filling space formation section are integrally formed. Therefore the core becomes unnecessary, and the fluid passage and the heat storage section can be enlarged by that amount.

A heat storage unit according to another aspect of the present invention is characterized in comprising a main member (for example, the main member 1012 in the embodiment) provided with: a housing (for example, the housing 1016 in the embodiment) provided with openings at front and rear ends in the axial direction with identical cross-sections perpendicular to the axis, a heat insulating space formation section (for example, the heat insulating space formation section 1018 in the embodiment) which forms a heat insulating space (for example, the heat insulating space 1017 in the embodiment) where a heat insulator (for example, the heat insulator 1030 in the embodiment) for preventing radiation of heat is arranged, or which is to be a space, on the inside of the housing, a fluid passage formation section (for example, the fluid passage formation section 1020 in the embodiment) which forms a fluid passage (for example, the fluid passage 1019 in the embodiment) for circulating a heat containing fluid, on the inside of the heat insulating space, and a heat storage material filling space formation section (for example, the heat storage material filling space formation section 1023 in the embodiment) which forms a heat storage material filling space (for example, the heat storage material filling space 1022 in the embodiment) for filling with a heat storage material (for example, the heat storage material 1021 in the embodiment), adjacent to the fluid passage, on the inside of the heat insulating space: and a pair of lid members (for example, the lid members 1013 and 1014 in the embodiment) arranged at the front and rear ends of the main member, and the housing of the main member, the heat insulating space formation section, the fluid passage formation section, and the heat storage material filling space formation section are integrally formed.

In this way, the housing of the main member, the heat insulating space formation section which forms a heat insulating space where a heat insulator for preventing radiation of heat is arranged, or which is to be a space, the fluid passage formation section which forms a fluid passage where a heat containing fluid circulates, on the inside of the housing, and the heat storage material filling space formation section which forms the heat storage material filling space for filling with a heat storage material, adjacent to the fluid passage on the inside of the housing, are integrally formed. Therefore, thereafter, all that is necessary is to fill the heat storage material into the heat storage material filling space. Compared to an arrangement where the heat storage material is enclosed in the envelope to form the heat reservoir, and the crevice which becomes the fluid passage is formed with spacers intervening and this heat reservoir is wrapped around the core in a spiral shape, the number of parts is reduced and manufacture is simplified. Furthermore, the housing of the main member, the heat insulating space formation section, the fluid passage formation section, and the heat storage material filling space formation section are integrally formed. Therefore the core becomes unnecessary, and the fluid passage and the heat storage section can be enlarged by that amount.

In another aspect of the present invention, the fluid passage formation section and the heat storage material filling space formation section are in a shape for wrapping around the axis.

In this way, the fluid passage formation section and the heat storage material filling space formation section are in a shape for wrapping around the axis, being a complex shape. Therefore, the effect of simplifying manufacture by integrally forming the main member containing them is remarkable.

A heat storage unit according to another aspect of the present invention is characterized in that in the fluid passage formation section, a communication port (for example, the communication port 1032 in the embodiment) which communicates with either one of an inlet (for example, the inlet 1036 in the embodiment) for introducing a fluid, and an outlet (for example, the outlet 1037 in the embodiment) for discharging a fluid, formed in the lid member, is formed in an inner end, and a communication port (for example, the communication port 1031 in the embodiment) which communicates with the other one of the inlet and the outlet is formed in the outer end.

In this way, in the fluid passage formation section, the communication port which communicates with either one of the inlet or the outlet is formed at the inner end, and the communication port which communicates with the other one of the inlet or the outlet is formed at the outer end. Therefore, a fluid introduced from the inlet travels over the total length of the fluid passage and goes out from the outlet so that the flow does not diverge, and the heat can be effectively received from the heat storage material.

A manufacturing method for a heat storage unit is provided which has a main member (for example, the main member 1012 in the embodiment) provided with: a housing (for example, the housing 1016 in the embodiment) provided with openings at front and rear ends in the axial direction with identical cross-sections perpendicular to the axis, a fluid passage formation section (for example, the fluid passage formation section 1020 in the embodiment) which forms a fluid passage (for example, the fluid passage 1019 in the embodiment) for circulating a heat containing fluid, on the inside of the housing, and a heat storage material filling space formation section (for example, the heat storage material filling space formation section 1023 in the embodiment) which forms a heat storage material filling space (for example, the heat storage material filling space 1022 in the embodiment) for filling with a heat storage material (for example, the heat storage material 1021 in the embodiment), adjacent to the fluid passage, on the inside of the housing: and a pair of lid members (for example, the lid members 1013 and 1014 in the embodiment) arranged at the front and rear ends of the main member, and is characterized in integrally forming the housing of the main member, the fluid passage formation section, and the heat storage material filling space formation section.

In this way, the housing of the main member, the fluid passage formation section which forms the fluid passage where a heat containing fluid circulates, on the inside of the housing, and the heat storage material filling space formation section which forms the heat storage material filling space for filling with a heat storage material, adjacent to the fluid passage, on the inside of the housing, are integrally formed. Therefore, thereafter, all that is necessary is to fill the heat storage material into the heat storage material filling space. Compared to an arrangement where the heat storage material is enclosed in the envelope to form the heat reservoir, and the crevice which becomes the fluid passage is formed with spacers intervening, and this heat reservoir is wrapped around the core in a spiral shape, the number of parts is reduced and manufacture is simplified. Furthermore, the housing of the main member, the fluid passage formation section, and the heat storage material filling space formation section are integrally formed. Therefore the core becomes unnecessary, and the fluid passage and the heat storage section can be enlarged by that amount.

A manufacturing method for a heat storage unit is also provided which has a main member (for example, the main member 1012 in the embodiment) provided with: a housing (for example, the housing 1016 in the embodiment) provided with openings at front and rear ends in the axial direction with identical cross-sections perpendicular to the axis, a heat insulating space formation section (for example, the heat insulating space formation section 1018 in the embodiment) which forms a heat insulating space (for example, the heat insulating space 1017 in the embodiment) where a heat insulator (for example, the heat insulator 1030 in the embodiment) for preventing radiation of heat is arranged, or which is to be a space, on the inside of the housing, a fluid passage formation section (for example, the fluid passage formation section 1020 in the embodiment) which forms a fluid passage (for example, the fluid passage 1019 in the embodiment) for circulating a heat containing fluid, on the inside of the heat insulating space, and a heat storage material filling space formation section (for example, the heat storage material filling space formation section 1023 in the embodiment) which forms a heat storage material filling space (for example, the heat storage material filling space 1022 in the embodiment) for filling with a heat storage material (for example, the heat storage material 1021 in the embodiment), adjacent to the fluid passage, on the inside of the heat insulating space, and a pair of lid members (for example, the lid members 1013 and 1014 in the embodiment) arranged at the front and rear ends of the main member, and is characterized in integrally forming the housing of the main member, the heat insulating space formation section, the fluid passage formation section, and the heat storage material filling space formation section.

In this way, the housing of the main member, the heat insulating space formation section which forms the heat insulating space where a heat insulator for preventing radiation of heat is arranged, or which is to be a space, the fluid passage formation section which forms the fluid passage where a heat containing fluid circulates, on the inside of the housing, and the heat storage material filling space formation section which forms the heat storage material filling space for filling with a heat storage material, adjacent to the fluid passage on the inside of the housing, are integrally formed. Therefore, thereafter, all that is necessary is to fill the heat storage material into the heat storage material filling space. Compared to an arrangement where the heat storage material is enclosed in the envelope to form the heat reservoir, and the crevice which becomes the fluid passage is formed with spacers intervening and this heat reservoir is wrapped around the core in a spiral shape, the number of parts is reduced and manufacture is simplified. Furthermore, the housing of the main member, the heat insulating space formation section, the fluid passage formation section, and the heat storage material filling space formation section are integrally formed. Therefore the core becomes unnecessary, and the fluid passage and the heat storage section can be enlarged by that amount.

In the manufacturing method, the fluid passage formation section and the heat storage material filling space formation section are formed in a shape for wrapping around the axis.

In this way, the fluid passage formation section and the heat storage material filling space formation section are formed in a shape for wrapping around the axis, being a complex shape. Therefore, the effect of simplifying manufacture by integrally forming the main member containing them is remarkable.

A communication port (for example, the communication port 1032 in the embodiment) which communicates with either one of an inlet (for example, the inlet 1036 in the embodiment) for introducing a fluid, and an outlet (for example, the outlet 1037 in the embodiment) for discharging a fluid, formed in the lid member, is formed in an inner end of the fluid passage formation section, and a communication port (for example, the communication port 1031 in the embodiment) which communicates with the other one of the inlet and the outlet is formed in an outer end of the fluid passage formation section.

In this way, in the fluid passage formation section, a communicating port which communicates with either one of the inlet and the outlet is formed at the inner end, and a communicating port which communicates the other one of the inlet or the outlet is formed at the outer end. Therefore, a fluid introduced from the inlet travels over the total length of the fluid passage and goes out from the outlet so that the heat can be effectively received from the heat storage material.

A heat storage unit according to another aspect of the present invention is characterized in having a pair of main members (for example, the main members 2012 and 2112 in the embodiment) wherein: bottomed cylindrical housing sections (for example, the housing sections 2016 and 2116 in the embodiment) provided with openings (for example, the openings 2015 and 2115 in the embodiment) at one end, fluid passage formation sections (for example, the fluid passage formation sections 2020 and 2120 in the embodiment) which form fluid passages (for example, the fluid passages 2019 and 2119 in the embodiment) for circulating a heat containing fluid, on the inside of the housing sections, and heat storage material filling space formation sections (for example, the heat storage material filling space formation sections 2023 and 2123 in the embodiment) which form heat storage material filling spaces (for example, the heat storage material filling spaces 2022 and 2122 in the embodiment) for filling with a heat storage material (for example, the heat storage materials 2021 and 2121 in the embodiment), adjacent to the fluid passages, on the inside of the housing sections, are integrally formed with a pair of main members having the opening sides of the housing sections mutually opposed.

As a result, the housing sections, the fluid passage formation sections which form the fluid passages where a heat containing fluid circulates, on the inside of the housing sections, and the heat storage material filling space formation sections which form the heat storage material filling spaces for filling with a heat storage material, adjacent to the fluid passages on the inside of the housing sections, are integrally formed to form the main member. Thereafter, all that is necessary is, for example, to connect these main members as a pair with the opening sides of the housing sections facing each other, and to fill the heat storage material into the heat storage material filling space. Therefore, compared to an arrangement where the heat storage material is enclosed in the envelope to form the heat reservoir, and the crevice which becomes the fluid passage is formed with spacers intervening, and this heat reservoir is wrapped around the core in a spiral shape, the number of parts is reduced and manufacture is simplified. Furthermore, the housing of the main member, the fluid passage formation section, and the heat storage material filling space formation section are integrally formed. Therefore the core becomes unnecessary, and the fluid passage and the heat storage section can be enlarged by that amount.

In the main members, heat insulating space formation sections (for example, the heat insulating space formation sections 2018 and 2118 in the embodiment) which form heat insulating spaces (for example, the heat insulating spaces 2017 and 2117 in the embodiment) where heat insulators (for example, the heat insulators 2086 and 2186 in the embodiment) for preventing radiation of heat are arranged, or which are to be spaces, between the housing sections, the fluid passage formation sections and the heat storage material filling space formation sections, are further integrally formed.

In this way, in the main members, in addition to the housing sections, the fluid passage formation sections which form the fluid passages where a heat containing fluid circulates, on the inside of the housing sections, and the heat storage material filling space formation sections which form the heat storage material filling spaces for filling with a heat storage material, adjacent to the fluid passages, on the inside of the housing sections, the heat insulating space formation sections which form the heat insulating spaces where heat insulators are arranged or which are to be spaces, are further integrally formed. Therefore, the number of parts is also reduced for the heat insulating space formation sections, and manufacture is simplified.

In addition, in the main members, fluid inlets (for example, the half inlets 2025 and 2125 in the embodiment) with axes arranged on the opening sides of the housing sections and which form a fluid introducing opening (for example, the fluid introducing openings 2024 and 2124 in the embodiment) which communicates with one of the fluid passages, and fluid outlets (for example, the half outlets 2027 and 2127 in the embodiments) with axes arranged on the opening sides of the housing sections and which form a fluid outlet opening (for example, the fluid outlet openings 2026 and 2126 in the embodiment) which communicates with the other of the fluid passages, are further integrally formed.

As a result, when these main members are connected as a pair with the opening sides of the housing sections facing each other, the fluid inlets are connected to each other to form the inlet which communicates with one of the fluid passages, and the fluid outlets are connected to each other to form the outlet which communicates with the other of the fluid passages. In this way, in the main members, in addition to the housing sections, the fluid passage formation sections which form the fluid passages where a heat containing fluid circulates, on the inside of the housing sections, and the heat storage material filling space formation sections which form the heat storage material filling spaces for filling with a heat storage material, adjacent to the fluid passages, on the inside of the housing sections, the fluid inlets and the fluid outlets are further integrally formed. Therefore, the number of parts is also reduced for the inlets and outlets which communicate with the fluid passages, and manufacture is simplified.

Further, in the main members, at the bottom sections (for example, the bottom sections 2014 and 2114 in the embodiment) of the housing sections, heat storage material circulation port sections (for example, the heat storage material circulation port sections 2029 and 2129 in the embodiment) which form heat storage material circulation openings (for example, the heat storage material circulation openings 2028 and 2128 in the embodiment) which communicate with the heat storage material filling spaces, are further integrally formed.

In this way, in the main members, in addition to the housing sections, the fluid passage formation sections which form the fluid passages where a heat containing fluid circulates, on the inside of the housing sections, and the heat storage material filling space formation sections which form the heat storage material filling spaces for filling with a heat storage material, adjacent to the fluid passage, on the inside of the housing sections, at the bottom of the housing sections the heat storage material circulation port sections which form the heat storage material circulation openings which communicate with the heat storage material filling spaces, are further integrally formed. Therefore the number of parts is also reduced for these heat storage material circulation port sections, and manufacture is simplified.

In one embodiment, the main member (for example, the main member 2012 in the embodiment) is left-right symmetrically shaped.

Since in this way the main member is left-right symmetrically shaped, for example, the identically-shaped main members can be directly joined to each other.

Between the pair of main members (for example, the main members 2112 in the embodiment), a separator (for example, the separator 2110 in the embodiment) which separates between both of these main members is provided.

In this way, between the pair of main members, the separator which separates between both of these main members is provided. Therefore, the respective fluid passages and heat storage material filling spaces of the pair of main members are respectively closed off by the separator.

In the separator, a communication hole (for example, a connection hole 2152 in the embodiment) which communicates between the heat storage material filling spaces of the pair of main members is formed.

In this way, in the separator, the communication hole which communicates between the heat storage material filling spaces of the pair of main members is formed. Therefore, the heat storage material can be filled into the heat storage material filling spaces of the pair of main members at one time.

In one embodiment, the fluid passages are double spiral shaped communicating with each other at the center.

In this way, the fluid passages are double spiral shaped communicating with each other at the center. Therefore, the inlet and the outlet for guiding the fluid passages to the outside can be arranged on the outermost peripheral section, while keeping a large radius of curvature and a small number of windings of the fluid passages.

In one version, the heat storage material filling spaces are double spiral shaped.

Since in this way, the heat storage material filling spaces are double spiral shaped, the radius of curvature of the heat storage material filling spaces can be enlarged.

In one version, the pair of main members are identically-shaped.

Since in this way the pair of main members is identically-shaped, a mold for integrated formation can be shared by the respective main members.

In one version, a main member (for example, the main member 2112 in the embodiment) is provided wherein: a bottomed cylindrical housing section provided with an opening at one end, a fluid passage formation section which forms a fluid passage for circulating a heat containing fluid, on the inside of the housing sections, and a heat storage material filling space formation section which forms a heat storage material filling space for filling with a heat storage material, adjacent to the fluid passage, on the inside of the housing section, are integrally formed, and a lid member (for example, the lid member 2201 in the embodiment) opposes the opening side of the housing section.

As a result, the housing section, the fluid passage formation section which forms the fluid passage where a heat containing fluid circulates, on the inside of the housing section, and the heat storage material filling space formation section which forms the heat storage material filling space for filling with a heat storage material, adjacent to the fluid passage, on the inside of the housing section, are integrally formed to form the main member, and the lid member is formed. Thereafter, all that is necessary is, for example, to connect the lid member opposed to the opening side of the housing section and to fill the heat storage material into the heat storage material filling space. Therefore, compared to an arrangement where the heat storage material is enclosed in the envelope to form the heat reservoir, and the crevice which becomes the fluid passage is formed with spacers intervening, and this heat reservoir is wrapped around the core in a spiral shape, the number of parts is reduced and manufacture is simplified. Furthermore, the housing of the main member, the fluid passage formation section, and the heat storage material filling space formation section are integrally formed. Therefore the core becomes unnecessary, and the fluid passage and the heat storage section can be enlarged by that amount.

In the main member, a heat insulating space formation section which forms a heat insulating space where a heat insulator for preventing radiation of heat is arranged or which is to be a space, between the housing section, the fluid passage formation section and the heat storage material filling space formation section, is further integrally formed.

In this way, in the main member, in addition to the housing section, the fluid passage formation section which forms the fluid passage where the heat containing fluid circulates, on the inside of the housing section, and the heat storage material filling space formation section which forms the heat storage material filling space for filling with a heat storage material, adjacent to the fluid passage on the inside of the housing section, the heat insulating space formation section which forms the heat insulating space where a heat insulator is arranged or which is to be a space, is further integrally formed. Therefore, the number of parts is also reduced for the heat insulating space formation section, and manufacture is simplified.

In addition, in the main member, a fluid inlet (for example, the half inlet 2125 in the embodiment) with an axis arranged on an opening side of the housing section and which forms a fluid introducing opening which communicates with one of the fluid passages, and a fluid outlet (for example, the half outlet 2127 in the embodiment) with an axis arranged the opening side of the housing section and which forms a fluid outlet opening which communicates with the other of the fluid passages, are further integrally formed, and in the lid member, cover sections (for example, the half inlet 2201 and half outlet 2202 in the embodiment) are respectively provided corresponding to the fluid inlet and the fluid outlet of the main member.

As a result, when the lid member is connected opposed to the opening side of the housing section of the main member, the fluid inlet of the main member is connected to the cover section of the lid member to form the inlet which communicates with one of the fluid passages, and the fluid outlet of main member is connected to the cover section of the lid member to form the outlet which communicates with the other of the fluid passages. In this way, in the main member, in addition to the housing section, the fluid passage formation section which forms the fluid passage where a heat containing fluid circulates, on the inside of the housing section, and the heat storage material filling space formation section which forms the heat storage material filling space for filling with a heat storage material, adjacent to the fluid passage, on the inside of the housing section, the fluid inlet and the fluid outlet are further integrally formed. Therefore, the number of parts is also reduced for the inlet and outlet which communicate with the fluid passage, and manufacture is simplified.

In the lid member, a heat storage material circulation port section which forms a heat storage material circulation opening which communicates with the heat storage material filling space, is integrally formed.

In this way, in the lid member, the heat storage material circulation port section which forms the heat storage material circulation opening which communicates with the heat storage material filling space, is integrally formed. Therefore, the number of parts is also reduced for this heat storage material circulation port section, and manufacture is simplified.

In one version, the fluid passage is a double spiral shape communicating with each other at the center.

In this way, the fluid passage is a double spiral shape communicating with each other at the center. Therefore, the inlet and the outlet for guiding the fluid passage to the outside can be arranged on the outermost peripheral section, while keeping a large radius of curvature and a small number of windings of the fluid passage.

In another version, the heat storage material filling space is a double spiral shape.

Since in this way the heat storage material filling space is a double spiral shape, the radius of curvature of the heat storage material filling space can be enlarged.

In another embodiment, a heat storage unit is characterized in having: two or more main members (for example, the main member 3012 in the embodiment) wherein; a cylindrical outer wall section (for example, the outer wall section 3016 in the embodiment) with both ends open, a fluid passage formation section (for example, the fluid passage formation section 3020 in the embodiment) which forms a fluid passage (for example, the fluid passage 3019 in the embodiment) for circulating a heat containing fluid, on the inside of the outer wall section, a heat storage material filling space formation section (for example, the heat storage material filling space formation section 3023 in the embodiment) which forms a heat storage material filling space (for example, the heat storage material filling space 3022 in the embodiment) for filling with a heat storage material (for example, the heat storage material 3021 in the embodiment), adjacent to the fluid passage, on the inside of the outer wall section, are integrally formed, and which are set front to back so that the openings are opposed, a separator (for example, the first separator 3039 and second separator 3043 in the embodiment) which separates between the main members adjacent to each other, and a lid member (for example, the lid member 3046 in the embodiment) which is respectively set on a front side of the main member at a front end and on a rear side of the main member at a rear end.

As a result, the outer wall section, the fluid passage formation section which forms the fluid passage where a heat containing fluid circulates, on the inside of the outer wall section, and the heat storage material filling space formation section which forms the heat storage material filling space for filling with a heat storage material, adjacent to the fluid passage, on the inside of the outer wall section, are integrally formed to form the main member. Thereafter, all that is necessary is, for example, to connect between the at least two main members via the separators, and to connect the lid member on the front side of the main member at the front end and on the rear side of the main member at the rear end, and to fill the heat storage material into the heat storage material filling space. Therefore, compared to an arrangement where the heat storage material is enclosed in the envelope to form the heat reservoir, and the crevice which becomes the fluid passage is formed with spacers intervening, and this heat reservoir is wrapped around the core in a spiral shape, the number of parts is reduced and manufacture is simplified. Furthermore, the outer wall section of the main member, the fluid passage formation section, and the heat storage material filling space formation section are integrally formed. Therefore the core becomes unnecessary, and the fluid passage and the heat storage section can be enlarged by that amount.

In the main members, heat insulating space formation sections (for example, the heat insulating space formation sections 3018 in the embodiment) which form heat insulating spaces (for example, the heat insulating space 3017 in the embodiment) where a heat insulator (for example, the heat insulator 3036 in the embodiment) for preventing radiation of heat is arranged or which are to be spaces, between the outer wall sections, the fluid passage formation sections and the heat storage material filling space formation sections, are further integrally formed.

In this way, in the main members, in addition to the outer wall sections, the fluid passage formation sections which form the fluid passages where a heat containing fluid circulates, on the inside of the outer wall sections, and the heat storage material filling space formation sections which form the heat storage material filling spaces for filling with a heat storage material, adjacent to the fluid passages, on the inside of the outer wall sections, the heat insulating space formation sections which form the heat insulating spaces where heat insulators are arranged or which are to be spaces, are further integrally formed. Therefore the number of parts is also reduced for the heat insulating space formation sections, and manufacture is simplified.

In the lid member, a fluid circulation port section (for example, the fluid circulation port section 3048 in the embodiment) which forms a fluid circulation opening (for example, the fluid circulation opening 3052 in the embodiment) which communicates with the fluid passage, is integrally formed.

In this way, in the lid member, the fluid circulation port section which forms the fluid circulation opening which communicates with the fluid passage, is integrally formed. Therefore, the number of parts is also reduced for this fluid circulation port section which communicates with the fluid passage, and manufacture is simplified.

In addition, in the lid member, the heat storage material filling port section (for example, the heat storage material filling port section 3049 in the embodiment) which forms a heat storage material filling opening (for example, the heat storage material filling opening 3053 in the embodiment) which communicates with the heat storage material filling space, is integrally formed.

In this way, in the lid member, the heat storage material filling port section which forms the heat storage material filling opening which communicates with the heat storage material filling space, is integrally formed. Therefore, the number of parts is also reduced for this heat storage material filling opening which communicates with the heat storage material filling space, and manufacture is simplified.

In the separator, a fluid passage communication hole (for example, the fluid passage communication holes 3040 and 3044 in the embodiment) which communicates between the fluid passages of the main members adjacent to each other, is formed.

Since in this way, in the separator, the fluid passage communication hole which communicates between the fluid passages of the main members adjacent to each other is formed, a fluid introduced from one of the fluid circulation openings can be passed to all of the fluid passages of the at least two main members.

Further, in the separator, a heat storage material filling space communication hole (for example, the heat storage material filling space communication holes 3041 and 3045 in the embodiment) which communicates between the heat storage material filling spaces of the main members adjacent to each other, is formed.

Since in this way, in the separator, the heat storage material filling space communication hole which communicates between the heat storage material filling spaces of the main members adjacent to each other, is formed, the heat storage material can be filled into the heat storage material filling spaces of the main members adjacent to each other at one time.

In one version the at least two main members are identically-shaped.

Since in this way the at least two main members are identically shaped, a mold for integrated formation can be shared by the respective main members.

In addition, in one embodiment, the fluid passages and the heat storage material filling spaces are respectively single spiral shaped or multiple spiral shaped.

In this way, the fluid passages and the heat storage material filling spaces are respectively in a single spiral shape or a multiple spiral shape. Therefore, the heat transfer area of the heat storage material can be enlarged and the fluid passage resistance can be kept small, while keeping a small number of windings of the fluid passages and the heat storage material filling spaces.

In one embodiment, the main members are formed by injection molding or extrusion molding, and the at least two main members, the separators and the pair of lid members are joined and integrated.

Since in this way the main members are formed by the injection molding or extrusion molding, the main members can be formed easily and are resistant to heat contraction.

A heat storage unit according to another embodiment of the present invention is characterized, in having: a heat storage material filling space (for example, the heat storage material filling space 4029 in the embodiment) for filling with a heat storage material (for example, the heat storage material 4028 in the embodiment) for which the volume varies corresponding to the heat storage condition, a fluid passage (for example, the fluid passage 4025 in the embodiment) which circulates a heat containing fluid introduced from an inlet (for example, the inlet 4064 in the embodiment) along the heat storage material filling space filled with the heat storage material, a bypass passage (for example, the bypass passage 4078 in the embodiment) which bypasses the fluid passage to discharge the fluid introduced from the inlet, and a passage switching section (for example, the slider unit 4017 in the embodiment) having a travelling member (for example, the slider 4051 in the embodiment) which travels due to the volume variation of the heat storage material inside the heat storage material filling space by being arranged so that a part faces to the heat storage material filling space, and which selectively switches the flow-in destination of the fluid introduced from the inlet by the position of the travelling member, to the fluid passage or to the bypass passage.

As a result, if the volume of the heat storage material varies according to the heat storage condition, the travelling member which is arranged so that a part faces to the heat storage material filling space travels so that the volume variation is absorbed. Therefore, it becomes unnecessary to enclose air for absorbing the volume variation of the heat storage material, in the heat storage material filling space, and a sufficient amount of heat storage material can be filled into the heat storage material filling space.

Furthermore, the passage switching section utilizes the travel of the travelling member according to the volume variation of this heat storage material in order to select the flow-in destination of the fluid introduced from the inlet, to the fluid passage or to the bypass passage Consequently, components such as a sensor, three way valve, control unit and actuator become unnecessary.

The heat storage material is one which if it stores heat and melts, the volume is increased, while if it releases heat and solidifies, the volume is decreased, and the passage switching section selects the flow-in destination of the fluid introduced from the inlet, to the fluid passage, in a condition where at least a part of the heat storage material is solidified, and selects the flow-in destination of the fluid introduced from the inlet, to the bypass passage, in a condition where the heat storage material is completely melted.

As a result, in the condition where at least a part of the heat storage material is solidified, the passage switching section selects the flow-in destination of the fluid introduced from the inlet to the fluid passage. Therefore, a fluid which has been heated by the heat storage material by passing through the fluid passage is discharged to the engine side so that the heat is applied to the engine side and the start-up becomes smooth. On the other hand, in the condition where the engine side generates heat and the heat storage material completely melts, the passage switching section selects the flow-in destination of the fluid introduced from the inlet, to the bypass passage. Therefore the fluid passes through the bypass passage to avoid passing through the fluid passage, thereby preventing the occurrence of wasteful passage resistance.

A heat storage unit according to another embodiment of the present invention is characterized in having: a main member (for example, the main member 5012 in the embodiment) wherein: a cylindrical outer wall section (for example, the outer wall section 5021 in the embodiment) having openings (for example, the openings 5020 in the embodiment) at both ends, a fluid passage formation section (for example, the fluid passage formation section 5025 in the embodiment) which forms a fluid passage (for example, the fluid passage 5024 in the embodiment) for circulating a heat containing fluid introduced from an inlet (for example, the inlet 5032 in the embodiment), on the inside of the outer wall section, and a heat storage material filling space formation section (for example, the heat storage material filling space formation section 5028 in the embodiment) which forms a heat storage material filling space (for example, the heat storage material filling space 5027 in the embodiment) for filling with a heat storage material (for example, the heat storage material 5026 in the embodiment) for which the volume varies corresponding to the heat storage condition, adjacent to the fluid passage, on the inside of the outer wall section, are integrally formed, and a passage switching section (for example, the slider unit 5013 in the embodiment) which is provided on thy outside of the main member, and which selectively switches the flow-in destination of the fluid introduced from the inlet, according to a position of a travelling member (for example, the slider 5042 in the embodiment) which travels due to the volume variation of the heat storage material, to the fluid passage or to a bypass passage (for example, the bypass passage 5090 in the embodiment) which bypasses the fluid passage to discharge.

As a result, if the volume of the heat storage material varies according to the heat storage condition, the travelling member travels so that the volume variation is absorbed. Therefore, it becomes unnecessary to enclose air for absorbing the volume variation of the heat storage material, in the heat storage material filling space and a sufficient amount of heat storage material can be filled into the heat storage material filling space. Furthermore, the passage switching section utilizes the travel of the travelling member according to the volume variation of this heat storage material in order to select the flow-in destination of the fluid introduced from the inlet, to the fluid passage or to the bypass passage. Consequently, components such as a sensor, three way valve, control unit and actuator become unnecessary. In addition, the passage switching section is provided on the outside of the main member which is integrally formed with the outer wall section, the fluid passage formation section, and the heat storage material filling space formation section. Therefore compared to the case where the passage switching section is built-in, the shapewise limitation on the main member due to providing the passage switching section is minimal.

The fluid passage and the heat storage material filling space are respectively double or more spiral shaped centered on an axis in a direction linking both ends of the openings, and the passage switching section is set side by side with the main member in a direction linking both ends of the openings.

As a result, since the fluid passage is a double or more spiral shape, then compared to a single spiral, for the same flow quantity, the flow velocity can be significantly reduced without reducing the heat exchange area. Moreover, compared to a single spiral, for the same flow quantity, the width of the passage can be narrowed and the quantity of fluid circulating can be reduced, without reducing the heat exchange area.

Furthermore, in this manner, in the case where the fluid passage and the heat storage material filling space are double or more spiral shaped, the double or more spiral shaped heat storage material filling space becomes a shape converging on the center side of the spiral. However, in order to adequately operate the travelling member of the passage switching section by the volume variation of the heat storage material, it is effective to concentrate the volume variation of the heat storage material, from all of the center sides of the heat storage material filling spaces which converge on the center side in this manner, and transmit this to the travelling member of the passage switching section. Due to this reason, by setting the passage switching section side by side with the main member in the direction linking the openings at both ends of the main member, the volume variation of the heat storage material can be effectively transmitted to the travelling member.

In addition, the travelling member travels along a direction linking the openings at both ends of the main member.

As mentioned above, when concentrating the volume variation of the heat storage material from all of the center sides of the spirals of the double or more spiral shaped heat storage material filling spaces, and transmitting this to the travelling member of the passage switching section which is set side by side with the main member in the direction linking the openings at both ends of the main member, the direction of the volume variation of the heat storage material becomes the direction linking the openings of the main member. Therefore, this arrangement is the most effective for moving the traveling member along the direction linking the openings of the main member.

Further, the heat storage material is one which if it stores heat and melts, the volume is increased, while if it releases heat and solidifies, the volume is decreased, and the passage switching section selects the flow-in destination of the fluid introduced from the inlet, to the fluid passage, in a condition where at least a part of the heat storage material is solidified, and selects the flow-in destination of the fluid introduced from the inlet, to the bypass passage, in a condition where the heat storage material is completely melted.

As a result, in the condition where at least a part of the heat storage material is solidified, the passage switching section selects the flow-in destination of the fluid introduced from the inlet, to the fluid passage. Therefore, a fluid which has received heat from the heat storage material by passing through the fluid passage is discharged to the engine side so that the heat is applied to the engine side and the start-up becomes smooth. On the other hand, in the condition where the engine side generates heat and the heat storage material completely melts, the passage switching section selects the flow-in destination of the fluid introduced from the inlet, to the bypass passage. Therefore the fluid passes through the bypass passage to avoid passing through the fluid passage, thereby preventing the occurrence of wasteful passage resistance.

BEST MODE FOR CARRYING OUT THE INVENTION

Hereunder is a description of an embodiment in a first aspect of the present invention, with reference to the drawings.

Figure 1:
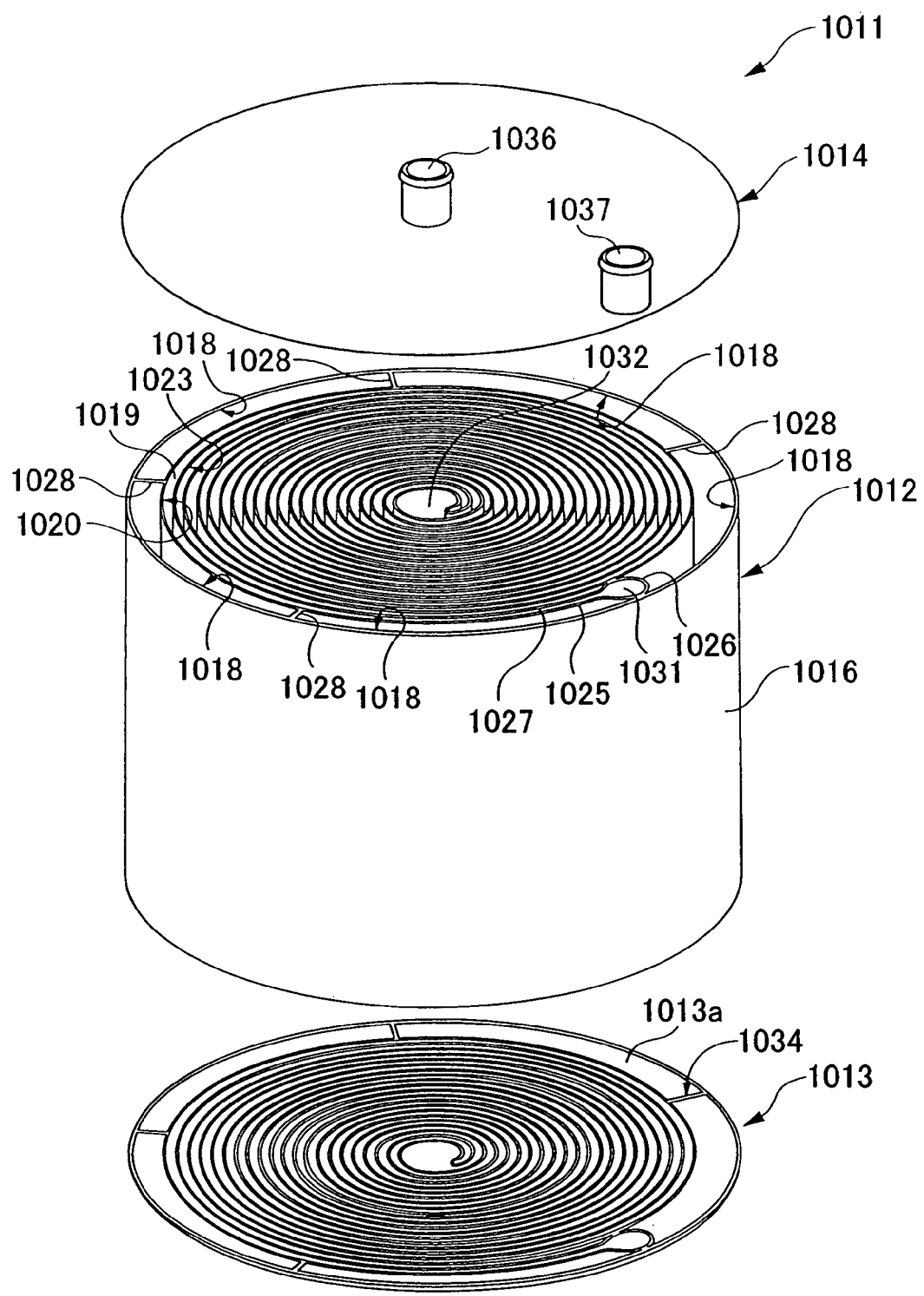
FIG. 1 is an exploded perspective view showing a heat storage unit of a first aspect of the present invention.

A heat storage unit 1011 of the present embodiment, as shown in FIG. 1, has a main member 1012 provided with openings at the front and rear ends, and a pair of lid members 1013 and 1014 fitted to the front and rear ends of this main member 1012.

Figure 2:
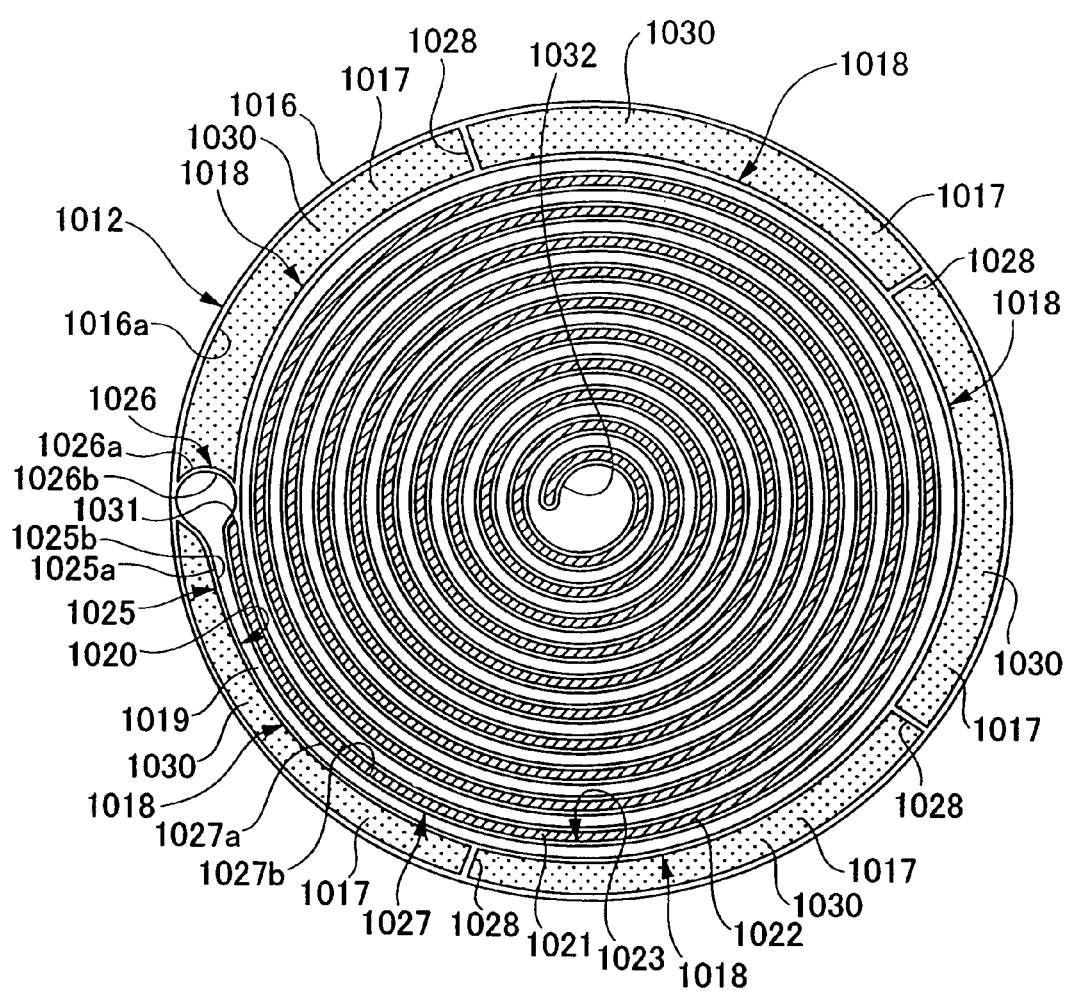
FIG. 2 is a plan view showing the heat storage unit of the first aspect of the present invention with the lid member removed.

The main member 1012, as shown in FIG. 2, is provided with: a cylindrical housing 1016 having openings at the front and rear axial ends with cross-sections perpendicular to the central axis the same; a heat insulating space formation section 1018 which forms a heat insulating space 1017 for preventing radiation of heat, on the inside of the housing 1016; a fluid passage formation section 1020 which forms a fluid passage 1019 for circulating a heat containing fluid, on the inside of the heat insulating space 1017; and a heat storage material filling space formation section 1023 which forms a heat storage material filling space 1022 for filling with a heat storage material 1021, adjacent to the fluid passage 1019 on the inside of the heat insulating space 1017.

That is to say, the main member 1012 has: the cylindrical housing 1016; a first wall section 1025 which extends substantially from a radially inner surface 1016a of the housing 1016 along the housing 1016, and is shaped to extend in a spiral shape (helix) towards the central position of the housing 1016 with a gradually reducing radius of curvature; a second wall section 1026 which extends from near the extension starting point of the first wall section 1025 at the inner surface 1016a of the housing 1016 to the opposite side to the extension direction of the first wall section 1025 to form a semicircular shape which contacts a part approximately one round from the outer end of the first wall section 1025; a third wall section 1027 which extends from near the tangent point of the second wall section 1026 in the first wall section 1025 extends in a small amount in the radial direction of the housing 1016, and is shaped to extend in a spiral shape (helix) in a space formed behind the first wall section 1025 towards the central position of the housing 1016 with a gradually reducing radius of curvature; and a plurality of reinforcing wall sections 1028 which is protrude from the inner surface 1016a of the housing 1016 along the radial direction and are shaped to connect between parts on one round of the first wall section 1025 from the outer end. The inner ends of the first wall section 1025 and the third wall section 1027 are shaped to be mutually connected.

Moreover, a heat insulating space formation section 1018 is configured by, a part on the inner surface 1016a side including the inner surface 1016a of the housing 1016, a part on a radially outer surface 1025a side including the radially outer surface 1025a of the one revolution part at the outermost side of the first wall section 1025, and the reinforcing wall sections 1028, or these parts and a part on the outer surface side 1026a including the radially outer surface 1026a of the second wall section 1026. Inside of the heat insulating space formation section 1018, a heat insulating space 1017 for preventing radiation of heat is formed. In the heat insulating space 1017, a heat insulator 1030 such as urethane is filled. However, even if the heat insulating space 1017 is not filled with anything and is left as a space, an air layer of this space prevents the radiation of heat. Polish treatment may be applied to the heat insulating space formation section 1018 in order to further increase the thermal insulation performance. Here, in some cases, the heat insulating space 1017 and the heat insulating space formation section 1018 are not formed.

Moreover, the fluid passage formation section 1020 is configured by, a part on the inner surface 1025b side including the radially inner surface 1025b of the first wall section 1025, a part on the inner surface 1026b side including the radially inner surface 1026b of the second wall section 1026, and a part on the outer surface 1027a side including the radially outer surface 1027a of the third wall section 1027. As a result, this fluid passage formation section 1020 is spiral shaped. Then, inside of this spiral shaped fluid passage formation section 1020 becomes a spiral shaped fluid passage 1019 for circulating a heat containing fluid. The outer end of the spiral of the fluid passage formation section 1020 is approximately cylindrical shaped and becomes a communication port 1031. Moreover, the inner end of the spiral of the fluid passage formation section 1020 is approximately cylindrical shaped and becomes a communication port 1032.

Furthermore, the heat storage material filling space formation section 1023 is configured by, a part on the radially inner surface 1027b side including the radially inner surface 1027b of the third wall section 1027, and a part on the radially outer surface 1025a side including the radially outer surface 1025a of the part except for the one revolution part on the outermost side of the first wall section 1025. As a result, the heat storage material filling space formation section 1023 is spiral shaped. Moreover, inside of the spiral shaped heat storage material filling space formation section 1023, is formed the spiral shaped heat storage material filling space 1022 which is filled with the heat storage material 1021. As a result of the above configuration, the spiral shaped fluid passage 1019 is arranged adjacent to the spiral shaped heat storage material filling space 1022 via the first wall section 1025 or the third wall section 1027. Moreover, the heat storage material 1021 which is filled into the heat storage material filling space 1022 becomes one cell. Here, the heat storage material 1021 to be filled into the heat storage material filling space 1022 is a latent heat storage material. Specifically, $Ba(OH)_2 \cdot 8H_2O$, $Sr(OH)_2 \cdot 8H_2O$, and the like are used. The fluid passage formation section 1020 and the heat storage material filling space formation section 1023 may be any shape as long as they are a shape circulating around the axis. Besides the spiral shape which circulates around the axis in a circular arc form, for example, these may be shaped to circulate around the axis in zigzag form, or shaped to circulate around the axis meandering at random.

Here, the main member 1012 formed as above is such that a cross-section orthogonal to the direction of the axis is identically-shaped at any position, and is integrally formed by extrusion molding material along the direction of this axis. That is to say, the housing 1016 of the main member 1012, the heat insulating space formation section 1018, the fluid passage formation section 1020 and the heat storage material filling space formation section 1023 are integrally formed by extrusion molding. The main member is comprised of a metal such as aluminum, or a synthetic resin such as polyethylene which are suitable for extrusion molding. Here, the main member 1012 may be formed by any method as long as the housing 1016, the heat insulating space formation section 1018, the fluid passage formation section 1020 and the heat storage material filling space formation section 1023 are integrally formed. For example, it may be formed by injection molding, grinding, casting, or the like. However, since the main member 1012 is formed such that the cross-section orthogonal to the direction of the axis is identically-shaped at any position, it is more preferable to form by extrusion molding from the viewpoint of improving production efficiency, and low cost. This also applies in the case where the heat insulating space formation section 1018 is not formed in the main member 1012.

The one lid member 1013 is disc shaped, and is joined to the main member 1012 in order to close off one side in the axial direction of the main member 1012. Here, in the surface section 1013a on the joint side of the lid member 1013 to the main member 1012, crevices 1034, which are of identical shape to the end surfaces of the main member 1012 are formed, into which the housing 1016 of the main member 1012, the first wall section 1025, the second wall section 1026, the third wall section 1027 and the plurality of reinforcing wall sections 1028 are fitted without any gap. This lid member 1013 is comprised of the same material to that of the main member 1012.

The other lid member 1014 is approximately disc shaped, and is joined to the main member 1012 in order to close off the other side in the axial direction of the main member 1012. Here, though not shown in the drawing, also in the surface section on the joint side of the lid member 1014 to the main member 1012, crevices, which are of identical shaped to the end surfaces of the main member 1012 are formed, into which the housing 1016 of the main member 1012, the first wall section 1025, the second wall section 1026, the third wall section 1027 and the plurality of reinforcing wall sections 1028 are fitted without any gap. Moreover, in this lid member 1014, an inlet 1036 for introducing a fluid from the outside is formed in the central position, and an outlet 1037 for discharging a fluid to the outside is formed in a predetermined position on the outer diameter side. Here when this lid member 1014 is joined to the main member 1012 in an aligned condition, the inside of the inlet 1036 of the lid member 1014 communicates with to the communication port 1032 formed in the inner end of the fluid passage formation section 1020, and the inside of the outlet 1037 of the lid member 1014 communicates with the communication port 1031 formed in the outer end of the fluid passage formation section 1020. This lid member 1014 is also comprised of the same material to that of the main member 1012.

In the case where the main member 1012, and the lid members 1013 and 1014 are comprised of a metal such as aluminum, for example, they are joined by brazing. Moreover, in the case where the main member 1012, and the lid members 1013 and 1014 are comprised of a synthetic resin such as polyethylene, for example, they are joined by ultrasonic welding.

Here, in the abovementioned heat storage unit 1011, for example, the one lid member 1013 is joined to the main member 1012 in an aligned condition. Then, the heat insulating material 1030 is filled into the heat insulating space 1017 on the inside of the heat insulating space formation section 1018 and the heat storage material 1021 is filled into the heat storage material filling space 1022 on the inside of the heat storage material filling space formation section 1023. Then, the other lid member 1014 is assembled so as to be joined in an aligned condition.

According to the above embodiment, the cylindrical housing 1016 of the main member 1012, the heat insulating space formation section 1018 which forms the heat insulating space 1017 for preventing radiation of heat, on the inside of the housing 1016, the fluid passage formation section 1020 which forms the fluid passage 1019 where a heat containing fluid circulates, on the inside of the heat insulating space 1017, and the heat storage material filling space formation section 1023 which forms the heat storage material filling space 1022 for filling with the heat storage material 1021, adjacent to the fluid passage 1019, on the inside of the heat insulating space 1017, are integrally formed by extrusion molding. Therefore, thereafter, all that is necessary is to fill the heat storage material 1021 into the heat storage material filling space 1022 on the inside of the heat storage material filling space formation section 1023. Compared to an arrangement where the heat storage material is enclosed in the envelope to form the heat reservoir, and a crevice which becomes the fluid passage 1019 is formed with spacers intervening and this heat reservoir is wrapped around the core in a spiral shape, the number of parts is reduced and manufacture is simplified. Furthermore, thickness control of the heat storage material 1021 is also simplified.

Moreover, the housing 1016 of the main member 1012, the heat insulating space formation section 1018, the fluid passage formation section 1020, and the heat storage material filling space formation section 1023 are integrally formed by extrusion molding so that the core becomes unnecessary, and the fluid passage 1019 and the heat storage material filling space 1022 can thus be enlarged by that amount (conversely if the same performance is to be obtained, the volume can be reduced).

Therefore, the number of parts can be reduced. Moreover, manufacture is simplified, manufacturing cost can be reduced, heat storage capacity can be increased and high performance can be attained.

Moreover, the fluid passage formation section 1020 and the heat storage material filling space formation section 1023 are spiral shaped in a complex form. Therefore, the effect of simplifying manufacture by integrally forming the main member 1012 containing these by extrusion molding, is remarkable.

Furthermore, in the fluid passage formation section 1020, the communication port 1032 which communicates the inlet 1036 is formed at the inner end of the spiral, and the communication port 1031 which communicates with the outlet 1037 is formed at the outer end of the spiral. Therefore, a fluid introduced from the inlet 1036 travels over the total length of the fluid passage 1019 along the spiral and goes out from the outlet 1037 so that the flow does not diverge, and the heat can be effectively received from the heat storage material 1021.

In addition, the heat storage material 1021 filled into the heat storage material filling space 1022 becomes one cell. Therefore, when the heat storage material 1021 radiates heat, if any one part is crystallized, this spreads out to the whole of the cell so that a supercooling phenomenon is unlikely to occur.

It is also possible to form the fluid passage formation section 1020 and the heat storage material filling space formation section 1023 into other shape besides the spiral shape.

Figure 3:
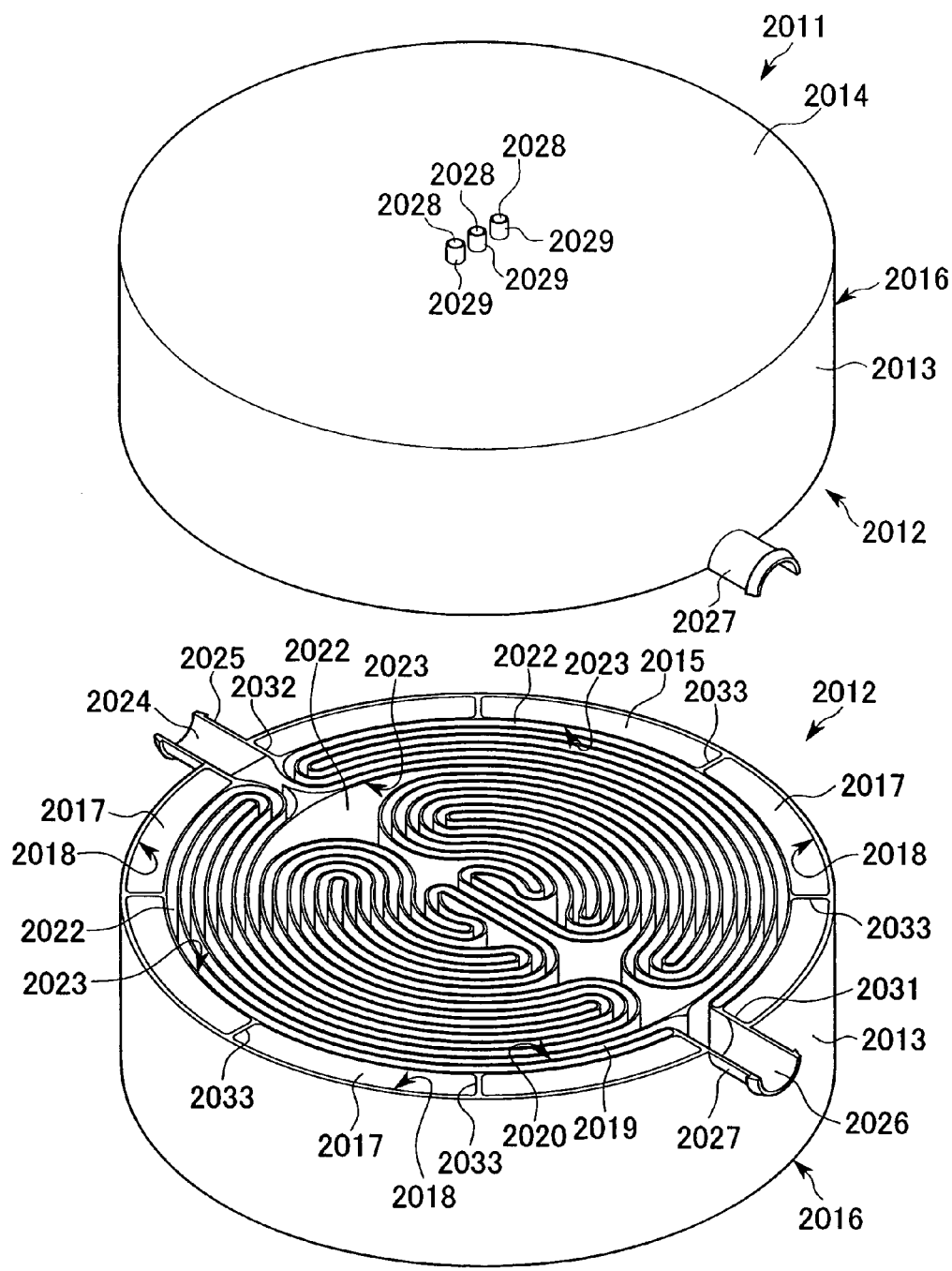
FIG. 3 is an exploded perspective view showing a heat storage unit of the second aspect of the present invention.
Figure 4:
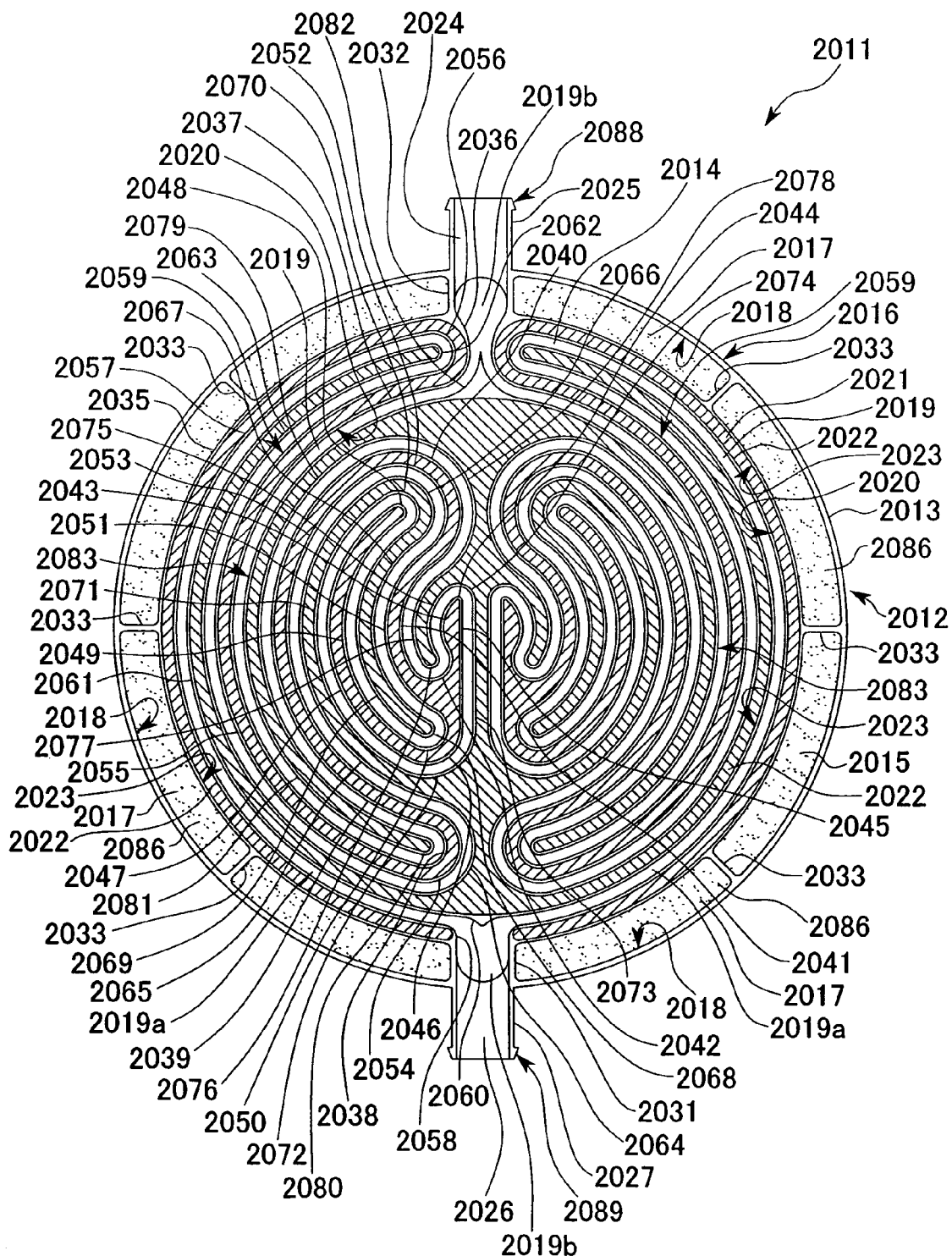
FIG. 4 is a cross-sectional view orthogonal to the axis, showing the heat storage unit of the second aspect of the present invention.

Hereunder is a description of the second aspect of the present invention, with reference to FIG. 3 and FIG. 4.

A heat storage unit 2011 in the present embodiment, as shown in FIG. 3, has a pair of main members 2012.

The main member 2012, as shown in FIG. 4, has: a bottomed cylindrical housing section 2016 having a cylindrical section 2013, and a bottom section 2014 which is perpendicular to the axis of this cylindrical section 2013 to close off one end in the direction of the axis, and is provided with an opening 2015 at the other end in the direction of the axis; a heat insulating space formation section 2018 which forms a heat insulating space 2017 for preventing radiation of heat, on the inside of the housing 2016; a fluid passage formation section 2020 which forms a fluid passage 2019 for circulating a heat containing fluid, on the inside of the heat insulating space 2017 (that is, on the inside of the housing 2016), and a heat storage material filling space formation section 2023 which forms a heat storage material filling space 2022 for filling with heat storage material 2021, adjacent to the fluid passage 2019, on the inside of the heat insulating space 2017 (that is, on the inside of the housing 2016).

Moreover, each main member 2012 is integrally formed with, a semicircular shaped half inlet 2025 with an axis arranged on the opening 2015 side of the housing section 2016, and which half forms on the inside, a fluid introducing opening 2024 which communicates with one fluid passage 2019, a semicircular shaped half outlet 2127 with an axis arranged on the opening 2015 side of the housing section 2016, and which half forms on the inside, a fluid outlet opening 2026 which communicates with the other fluid passage 2019, and a heat storage material circulation port section 2029 at the bottom section 2014 of the housing section 2016, which forms on the inside a heat storage material circulation opening 2028 which communicates with a heat storage material filling space 2022. By means of the above, the heat insulating space formation section 2018 forms the heat insulating space 2017 between the housing section 2016, the fluid passage formation section 2020 and the heat storage material filling space formation section 2023.

Hereunder is a description of the main member 2012 mainly with reference to FIG. 4. In the description of the main member 2012 hereunder, while not particularly specified, the description of the axis direction, the circumferential direction, the center side, and the outer diameter side, denote the axis direction, the circumferential direction, the center side, and the outer diameter side all for the cylindrical section 2013 of the housing section 2016.

The main member 2012 has; a pair of wall sections 2031 and 2032 which protrude from symmetrical positions of the housing section 2016 on the inner surface of the cylindrical section 2013 to the center side, and a plurality of wall sections 2033 arranged at equal intervals between these wall sections 2031 and 2032 and which extend from the inner surface of the cylindrical section 2013 to the center side.

Moreover, the main member 2012 has; a wall section 2035 which extends from one end position in the circumferential direction on the center side of one wall section 2031 to one side in the circumferential direction concentric with the cylindrical section 2013, and connects to the other wall section 2032, while connecting the ends on the center side of the plurality of wall sections 2033 arranged on the extension side, and a wall section 2036 which extends in a semicircular shape from the joint position of the wall section 2032 and the wall section 2035 to the center side, and turns back ahead of an imaginary line linking between the centers in the circumferential direction of the wall sections 2031 and 2032.

In addition, the main member 2012 has a wall section 2037 which extends from the opposite side of this wall section 2036 with respect to the wall section 2035 in the direction of the wall section 2031, concentric with the cylindrical section 2013, a wall section 2038 which extends in a semicircular shape from the opposite end of this wall section 2037 with respect to the wall section 2036 to the center side and turns back ahead of an imaginary line linking between the centers in the circumferential direction of the wall sections 2031 and 2032, and a wall section 2039 which extends from the opposite end of this wall section 2038 with respect to the wall section 2037 in the direction of the wall section 32 concentric with the cylindrical section 2013.

Furthermore, the main member 2012 has a wall section 2040 which extends in a semicircular shape from the opposite end of this wall section 2039 with respect to the wall section 38 to the center side and turns back ahead of an imaginary line linking between the centers in the circumferential direction of the wall sections 2031 and 2032, a wall section 2041 which extends from the opposite end of this wall section 2040 with respect to the wall section 2039 in the direction of the wall section 2031 concentric to the cylindrical section 2013, a wall section 2042 which extends in a semicircular shape from the opposite end of this wall section 2041 with respect to the wall section 2040 to the center side and turns back ahead of an imaginary line linking between the centers in the circumferential direction of the wall sections 2031 and 2032, a wall section 2043 which extends from the opposite end of this wall section 2042 with respect to the wall section 2041 in the direction of the wall section 2032 concentric with the cylindrical section 2013, and a wall section 2044 which extends in a semicircular shape from the opposite end of this wall section 2043 with respect to the wall section 2042 to the center side and turns back ahead of an imaginary line linking between the centers in the circumferential direction of the wall sections 2031 and 2032.

In addition, the main member 2012 has a wall section 2045 which extends from the opposite end of this wall section 2044 with respect to the wall section 2043 in the direction of the wall section 2031 in parallel with an imaginary line linking between the centers in the circumferential direction of the wall sections 2031 and 2032, a wall section 2046 which extends in a semicircular shape from the opposite end of this wall section 2045 with respect to the wall section 2044 to the outer diameter side and turns back, a wall section 2047 which extends from the opposite end of this wall section 2046 with respect to the wall section 2045 concentric to the cylindrical section 2013 in the direction of the wall section 2032, and a wall section 2048 which extends in a semicircular shape from the opposite end of this wall section 2047 with respect to the wall section 2046 to the center side and turns back ahead of the wall section 2040.

Furthermore, the main member 2012 has a wall section 2049 which extends from the opposite end of this wall section 2048 with respect to the wall section 2047 at a predetermined spacing with the wall section 2047 along the wall section 2047, a wall section 2050 which extends from the opposite end of this wall section 2049 with respect to the wall section 2048 at a predetermined spacing with the wall section 2046 along the wall section 2046, a wall section 2051 which extends from the opposite end of this wall section 2050 with respect to the wall section 2049 at a predetermined spacing with the wall section 2041 along the wall section 2041, a wall section 2052 which extends from the opposite end of this wall section 2051 with respect to the wall section 2050 at a predetermined spacing with the wall section 2040 along the wall section 2040, and a wall section 2053 which extends from the opposite end of this wall section 2052 with respect to the wall section 2051 at a predetermined spacing with the wall section 2039 along the wall section 2039.

Furthermore, the main member 2012 has a wall section 2054 which extends from the opposite end of this wall section 2053 with respect to the wall section 2052 at a predetermined spacing with the wall section 2038 along the wall section 2038, a wall section 2055 which extends from the opposite of this wall section 2054 with respect to the wall section 2053 at a predetermined spacing with the wall section 2037 along the wall section 2037, a wall section 2056 which extends from the opposite end of this wall section 2055 with respect to the wall section 2054 at a predetermined spacing with the wall section 2036 along the wall section 2036, a wall section 2057 which extends from the opposite end of this wall section 2056 with respect to the wall section 2055 at a predetermined spacing with the wall section 2035 along the wall section 2035, and a wall section 2058 which extends in a semicircular shape from the opposite end of this wall section 2057 with respect to the wall section 2056 to the outer diameter side and is merged into a connection point between the wall section 2031 and the wall section 2035.

Here, the abovementioned wall sections 2035 to 2058 form a wall group 2059 which is connected in a loop shape. The main member 2012 also has a similar wall group 2059 on the opposite side symmetric with respect to an imaginary line linking between centers in the circumferential direction of the wall sections 2031 and 2032.

Moreover, the main member 2012 has a wall section 2060 which extends from near the central position in the circumferential direction of the wall section 2031 at a predetermined spacing with the wall section 2058 and approximately along the wall section 2058 to one side in the circumferential direction, a wall section 2061 which extends from the tip on the protrusion side of this wall section 2060 at a predetermined spacing with the wall section 2057 along the wall section 2057 to one side in the circumferential direction, a wall section 2062 which extends from the opposite end of this wall section 2061 with respect to the wall section 20560 at a predetermined spacing with the wall section 2056 along the wall section 2056, a wall section 2063 which extends from the opposite end of this wall section 2062 with respect to the wall section 2061 at a predetermined spacing with the wall section 2055 along the wall section 2055, and a wall section 2064 which extends from the opposite end of this wall section 2063 with respect to the wall section 2062 at a predetermined spacing with the wall section 2054 along the wall section 2054.

Furthermore, the main member 2012 has a wall section 2065 which extends from the opposite end of this wall section 2064 with respect to the wall section 2063 at a predetermined spacing with the wall section 2053 along the wall section 2053, a wall section 2066 which extends from the opposite end of this wall section 2065 with respect to the wall section 2064 at a predetermined spacing with the wall section 2052 along the wall section 2052, a wall section 2067 which extends from the opposite end of this wall section 2066 with respect to the wall section 2065 at a predetermined spacing with the wall section 2051 along the wall section 2051, and a wall section 2068 which extends from the opposite end of this wall section 2067 with respect to the wall section 2066 at a predetermined spacing with the wall section 2050 along the wall section 2050.

In addition, the main member 2012 has a wall section 2069 which extends from the opposite end of this wall section 2068 with respect to the wall section 2067 between the wall section 2049 and the wall section 2067 and along them, a wall section 2070 which extends from the opposite end of this wall section 2069 with respect to the wall section 2068 between the wall section 2048 and the wall section 2066 and along them, a wall section 2071 which extends from the opposite end of this wall section 2070 with respect to the wall section 2069 between the wall section 2047 and the wall section 2065 and along them, a wall section 2072 which extends from the opposite end of this wall section 2071 with respect to the wall section 2070 at a predetermined spacing with the wall section 2046 along the wall section 2046, and a wall section 2073 which extends from the opposite end of this wall section 2072 with respect to the wall section 2071 at a predetermined spacing with the wall section 2045 along the wall section 2045.

Furthermore, the main member 2012 has a wall section 2074 which extends from the opposite end of this wall section 2073 with respect to the wall section 2072 at a predetermined spacing with the wall section 2044 along the wall section 2044, a wall section 2075 which extends from the opposite end of this wall section 2074 with respect to the wall section 2073 at a predetermined spacing with the wall section 2043 along the wall section 2043, a wall section 2076 which extends from the opposite end of this wall section 2075 with respect to the wall section 2074 at a predetermined spacing with the wall section 2042 along the wall section 2042, and a wall section 2077 which extends from the opposite end of this wall section 2076 with respect to the wall section 2075 between the wall section 2041 and the wall section 2075 and along them.

In addition, the main member 2012 has a wall section 2078 which extends from the opposite end of this wall section 2077 with respect to the wall section 2076 at a predetermined spacing with the wall section 2040 along the wall section 2040, a wall section 2079 which extends from the opposite end of this wall section 2078 with respect to the wall section 2077 at a predetermined spacing with the wall section 2039 along the wall section 2039, a wall section 2080 which extends from the opposite end of this wall section 2079 with respect to the wall section 2078 at a predetermined spacing with the wall section 2038 along the wall section 2038, a wall section 2081 which extends from the opposite end of this wall section 2080 with respect to the wall section 2079 between the wall section 2037 and the wall section 2079 and along them, and a wall section 2082 which extends from the opposite end of this wall section 2081 with respect to the wall section 2080 at a predetermined spacing with the wall section 2036 along the wall section 2036.

Here, the abovementioned wall sections 2060 to 2082 are connected to form a wall group. The main member 2012 also has a similar wall group 2083 on the opposite side symmetric with respect to an imaginary line linking between centers in the circumferential direction of the wall sections 2031 and 2032. Moreover, the wall groups 2083 on both sides connect corresponding ends to each other. As a result, the wall groups 2083 on both sides are loop shaped.

The wall sections 2031, 2032 and 2033, both wall groups 2059 and both wall groups 2060 are all connected to the bottom section 2014 of the housing section 2016 over their whole length, and their heights in the axial direction coincide with the end on the opening 2015 side of the housing section 2016 over their whole length.

Moreover, the heat insulating space formation sections 2018 are respectively configured by a plurality of predetermined parts connected in a bottomed cylindrical shape, that is, a part on the inner surface side including the inner surface of the bottom section 2014, a part on the inner surface side including the inner surface of the cylindrical section 2013, a part on the outer surface side including the outer surface of the wall section 2035, a part on the outer surface side including the outer surface of the wall section 2031, a part on the outer surface side including the outer surface of the wall section 2032, and a part on the outer surface side including the outer surface of the wall section 2033. Inside of these plurality of (specifically, 8) heat insulating space formation sections 2018, heat insulating spaces 2017 for preventing radiation of heat are respectively formed.

In these heat insulating spaces 2017, heat insulators 2086 such as urethane are to be respectively filled. However, even if the heat insulating spaces 2017 are not filled with anything and left as spaces, air layers of these spaces prevent the radiation of heat. Polish treatment may be applied to the heat insulating space formation sections 2018 in order to further increase the thermal insulation performance. Here, in some cases, the heat insulating spaces 2017 and the heat insulating space formation sections 2018 are not formed.

Moreover, the heat storage material filling space formation sections 2023 are respectively configured by; a part on the inner surface side including the inner surface of one of the wall groups 2059 in a loop shape and a part on the inner surface side including the inner surface of the bottom section 2014 located on the inside, a part on the inner surface side including the inner surface of the other of the wall groups 2059 in a loop shape and a part on the inner surface side including the inner surface of the bottom section 2014 located on the inside, and a part on the inner surface side including the inner surface of both wall groups 2059 connected in a loop shape and a part on the inner surface side including the inner surface of the bottom section 2014 located on the inside. Inside of these plurality of (specifically, 3) heat storage material filling space formation sections 2023, heat storage material filling spaces 2022 for preventing radiation of heat are respectively formed.

Moreover, the fluid passage formation sections 2020 are configured by; a part on the outer surface side including the outer surface of a part excluding the wall section 2035 of one of the wall groups 2059, a part on the outer surface side including the outer surface of a part excluding the wall section 2035 of the other of the wall groups 2059, a part on the outer surface side including the outer surface of both wall groups 2083, and a part on the inner surface side including the inner surface of the bottom section 2014 between these. Inside of these fluid passage formation sections 2020, fluid passages 2019 are formed.

Here, the fluid passages 2019 are divided into a branch path 2019a formed by the one side of the wall group 2059 and the same side of the wall group 2083 and a branch path 2019a formed by the other side of the wall group 2059 and the same side of the wall group 2083. Regarding the respective branch paths 2019a, the respective ends are merged into one passage 2019b.

The main member 2012 has, in the end position on the opening 2015 side of the wall section 2032, a semicircular shape half inlet 2025 with the axis coinciding with the end of the opening 2015 and which is convex shaped to the bottom section 2014 side and protrudes to the outer diameter side from the cylindrical section 2013. This semicircular shaped half inlet 2025 lies along the radial direction of the cylindrical section 2013, and a half of a fluid introducing opening 2024 on the inside is communicated with a passage 2019b on the wall section 2032 side of the fluid passage 2019. Here, regarding the half inlet 2025, the height of the edges of both sides arranged on the half surface coincides with the end of the opening 2015 over the whole length.

Furthermore, the main member 2012 has, in the end position on the opening 2015 side of the wall section 2031, a semicircular shaped half outlet 2027 with the axis coinciding with the end of the opening 2015 and which is convex shaped to the bottom section 2014 side and protrudes to the outer diameter side from the cylindrical section 2013. This semicircular shaped half outlet 2027 is coaxial with the semicircular shaped half inlet 2025 and a half of a fluid outlet opening 2026 on the inside is communicated with a passage 2019b on the wall section 2031 side of the fluid passage 2019. Here, regarding the half outlet 2027 also, the height in the axial direction of the edges of both sides arranged on the half surface coincides with the end of the opening 2015 over the whole length.

In addition, regarding the main member 2012, in the center of the bottom section 2014, a plurality of (specifically, 3) heat storage material circulating port sections 2029 for forming thereinside heat storage material circulating openings 2028 which separately open respectively to the axial center side in the cylindrical section 2013 of the plurality of (specifically, 3) heat storage material filling spaces 2022, are provided protruding to the opposite side with respect to the cylindrical section 2013. Moreover, the heat storage material 2021 is respectively filled via the heat storage material circulating openings 2028 of these heat storage material circulating port sections 2029 into the respective heat storage material filling spaces 2022. Here, the heat storage material 2021 to be filled into the heat storage material filling spaces 2022 is a latent heat storage material, and a sugar alcohol system such as erythritol, xylitol, sorbitol, or $Mg(NO_3)$-$6H_2O$ is used.

The main member 2012 is left-right symmetrically shaped centered on a virtual plane including the center in the circumferential direction of the wall sections 2031 and 2032 and the axis of the cylindrical section 2013. Therefore, if the identically-shaped pair of main members 2012 are directly joined with the openings 2015 of the housing sections 2016 opposing each other, the cylindrical sections 2013, the half inlets 2025, the half outlets 2027, one of the wall groups 2059 on the same side with respect to the virtual plane when joined, the other of the wall groups 2059 on the same side with respect to the virtual plane when joined, one of the wall groups 2083 on the same side with respect to the virtual plane when joined, and the other of the wall groups 2083 on the same side with respect to the virtual plane when joined, are respectively completely overlapped.

As a result, if the pair of main members 2012 are joined to each other, the pair of main members 2012 communicate the fluid introducing openings 2024 with each other, communicate the fluid passages 2019 with each other, communicate the fluid outlet outlets 2026 with each other, and communicate the corresponding heat storage material filling spaces 2022 with each other. Moreover, the pair of half inlets 2025 form a cylindrical inlet 2088 with each other and the pair of half outlets 2027 form a cylindrical outlet 2089 with each other.

Here, the main members 2012 in the above shape are integrally formed by a resin such as polypropylene, polyamide, polyoxymethylene, polyethylene terephthalate or a metal such as aluminum, or a ceramic and the like. Furthermore, when integrally forming by a resin, they can be formed by injection molding. In the case of integrally forming by a metal, they can be formed by grinding, sintering, or the like.

Then, the pair of main members 2012 identically-shaped in this way, as mentioned above are positioned with the opening 2015 sides of the housing sections 2016 opposing each other, so that the cylindrical sections 2013, the half inlets 2025, the half outlets 2027, one of the wall groups 2059 on the same side with respect to the virtual plane when joined, the other of the wall groups 2059 on the same side with respect to the virtual plane when joined, one of the wall groups 2083 on the same side with respect to the virtual plane when joined, and the other of the wall groups 2083 on the same side with respect to the virtual plane when joined, are aligned with each other, and all of them are then bonded and integrated. At this time, they are bonded by a bonding method such as ultrasonic welding, brazing, or gluing, suitable for the material.

Then, regarding one main member of the pair of main members 2012 integrated in this way, the heat storage materials 2021 is filled in a fluid condition from all of the heat storage material circulating openings 2028 into all of the heat storage material filling spaces 2022 (at this time, air is vented from the heat storage material circulating openings 2028 of the other main member 2012), and the heat storage material 2021 is then solidified to form the heat storage unit 2011.

According to one embodiment in the second aspect above, the housing sections 2016, the fluid passage formation sections 2020 which form the fluid passages 2019 for circulating a heat containing fluid, on the inside of the housing sections 2016, and the heat storage material filling space formation sections 2023 which form the heat storage material filling spaces 2022 for filling with heat storage materials 2021, adjacent to the fluid passages 2019, on the inside of the housing sections 2016 are integrally formed in order to form the main member 2012. Thereafter, all that is necessary is to connect these pairs of main members 2012 with the opening 2015 sides of the housing sections 2016 opposing each other, and to fill the heat storage material 2021 into the heat storage material filling spaces.

Therefore, compared to an arrangement where the heat storage material is enclosed in the envelope to form the heat reservoir, and a crevice which becomes the fluid passage is formed with spacers intervening and this heat reservoir is wrapped around the core in a spiral shape, the number of parts is reduced and manufacture is simplified. Moreover, the housing sections 2016 of the main members 2012, the fluid passage formation sections 2020, and the heat storage material filling space formation sections 2023 are integrally formed so that the core becomes unnecessary, and the fluid passages 2019 and the heat storage sections can thus be enlarged by that amount.

Therefore, the number of parts can be reduced. Moreover, manufacture is simplified, manufacturing cost can be reduced, heat storage capacity can be sufficiently maintained and high performance can be attained.

Moreover, in the main members 2012, in addition to the abovementioned housing sections 2016, the fluid passage formation sections 2020, and the heat storage material filling space formation sections 2023, the heat insulating space formation sections 2018 which form the heat insulating spaces 2017 where the heat insulators 2086 are arranged or which are to be spaces, are further integrally formed. Consequently the number of parts is reduced and manufacture is simplified.

Therefore, even in the case where the heat insulating space formation sections 18 are provided, the number of parts can be reduced. Moreover manufacture is simplified, and manufacturing cost can be reduced.

Furthermore, when the pair of main members 2012 are connected with the opening 2015 sides of the housing sections 2016 opposing each other, the half inlets 2025 are connected to each other to form the inlet 2088 which communicates with the fluid passages 2019 on one side and the half outlets 2027 are connected to each other to form the outlet 2089 which communicates with the fluid passages 2019 on the other side. In this way, in the main members 2012, in addition to the abovementioned housing sections 2016, the fluid passage formation sections 2020, and the heat storage material filling space formation sections 2023, the half inlets 2025 and the half outlets 2027 are further integrally formed. Consequently; for the parts of the inlet 2088 and the outlet 2089 which communicate with the fluid passages 2029, the number of parts is reduced and manufacture is simplified.

Therefore, even in the case where the inlet 2088 and the outlet 2089 are provided, the number of parts can be reduced. Moreover, manufacture is simplified, and manufacturing cost can be greatly reduced.

Furthermore, in the main members 2012, in addition to the abovementioned housing sections 2016, the fluid passage formation sections 2020, and the heat storage material filling space formation sections 2023, the heat storage material circulation port sections 2029 which form heat storage material circulation openings 2028 which communicate with the heat storage material filling spaces 2022 at the bottom sections 2014 of the housing sections 2016, are further integrally formed. Consequently; for the part of these heat storage material circulation port sections 2029, the number of parts is reduced and manufacture is simplified.

Therefore, even in the case where the heat storage material circulation port sections 2029 are provided, the number of parts can be reduced. Moreover, manufacture is simplified, and manufacturing cost can be reduced.

Furthermore, since the main members 2012 are left-right symmetrically shaped centered on a virtual plane including the axis, then as mentioned above, the identically-shaped pair of the main members 2012 can be directly joined to each other.

Therefore, the identically-shaped main members 2012 can be formed even without using separators or the like between the main members 2012.

Moreover, since in this way the pair of main members 2012 are identically-shaped, a mold for integrated formation can be shared by the respective main members 2012.

Consequently, mold depreciation can be reduced.

Figure 5:
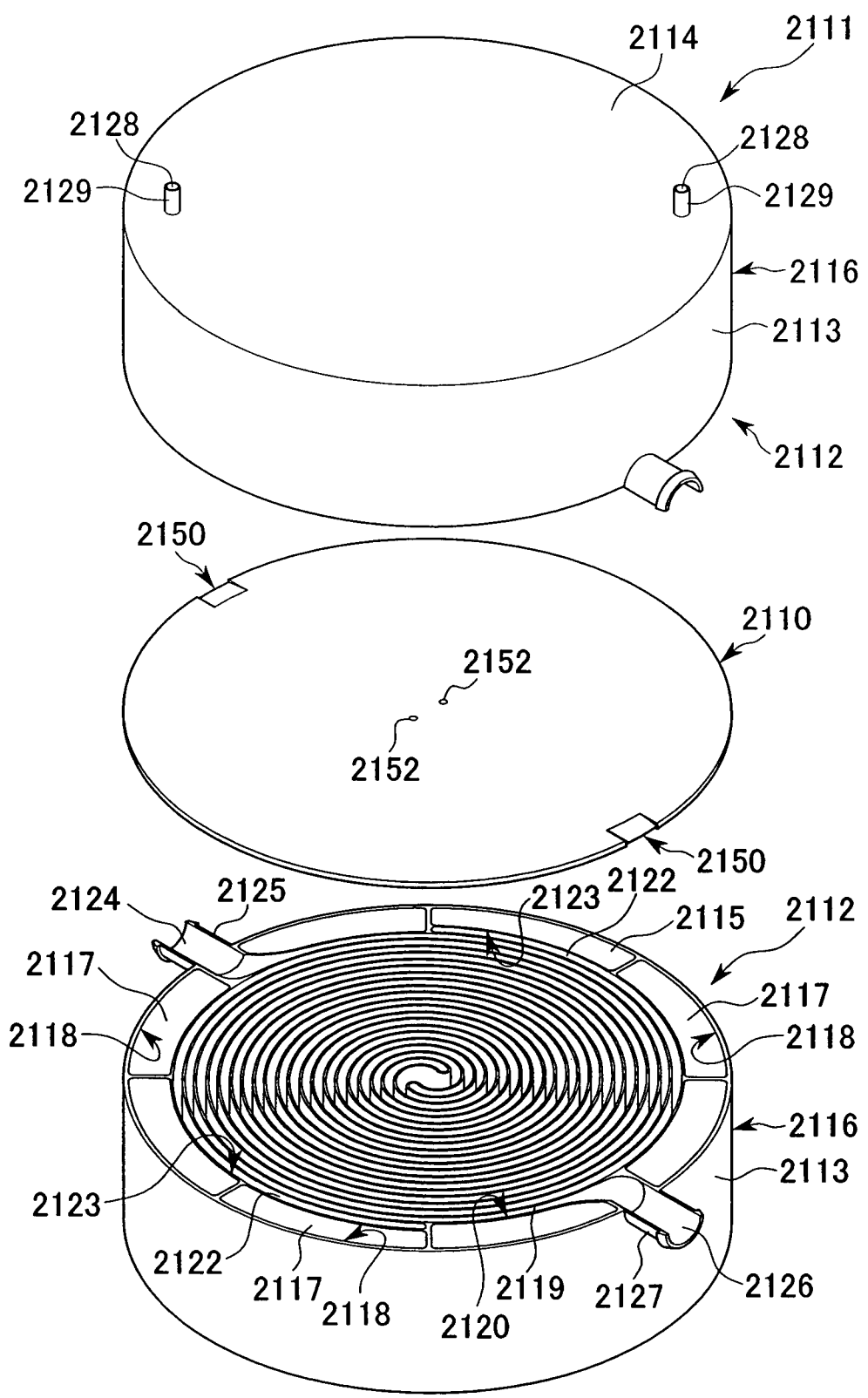
FIG. 5 is an exploded perspective view showing a heat storage unit of a second aspect of the present invention.
Figure 6:
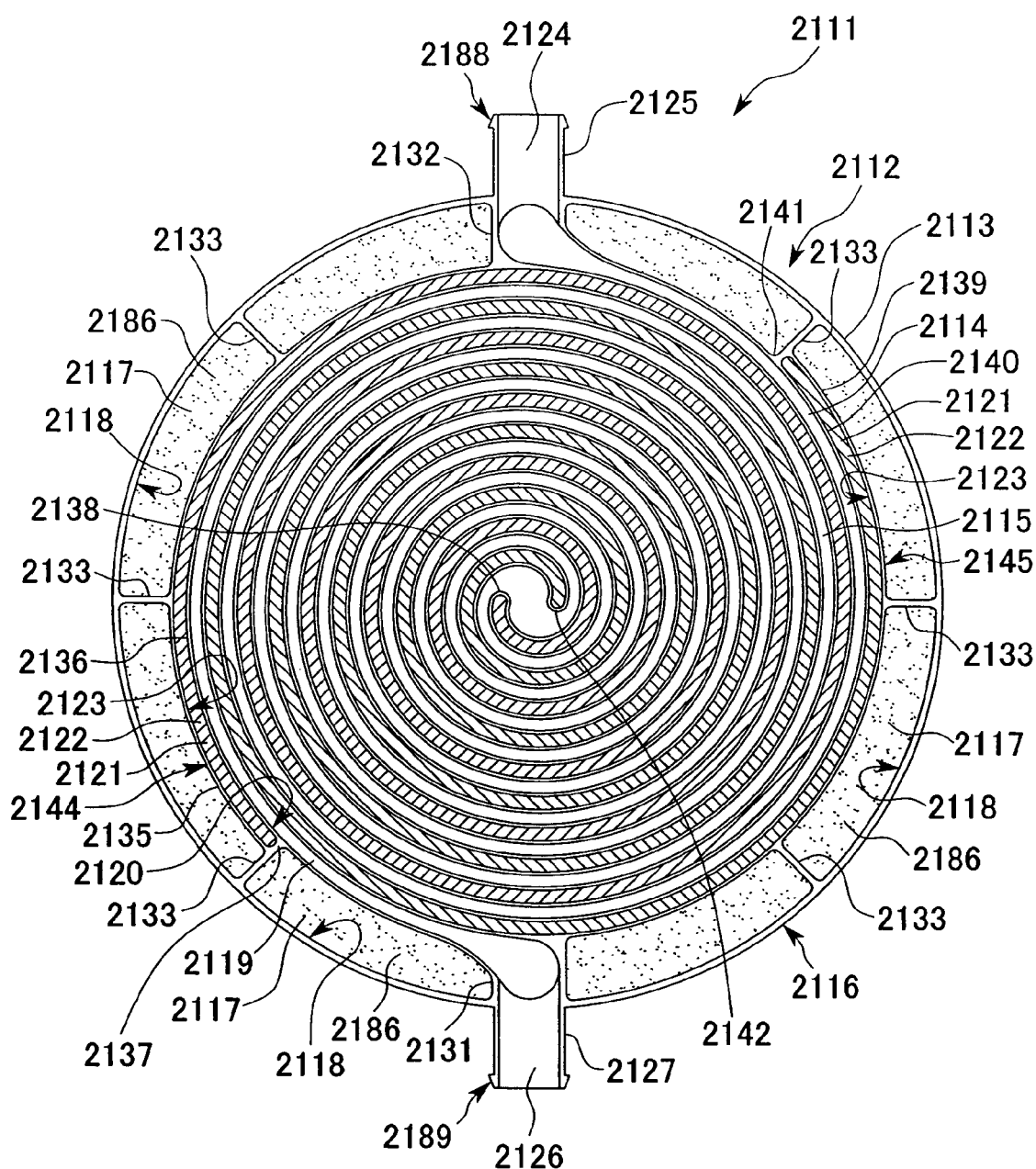
FIG. 6 is a cross-sectional view orthogonal to the axis, showing the heat storage unit of the second aspect of the present invention.
Figure 7:
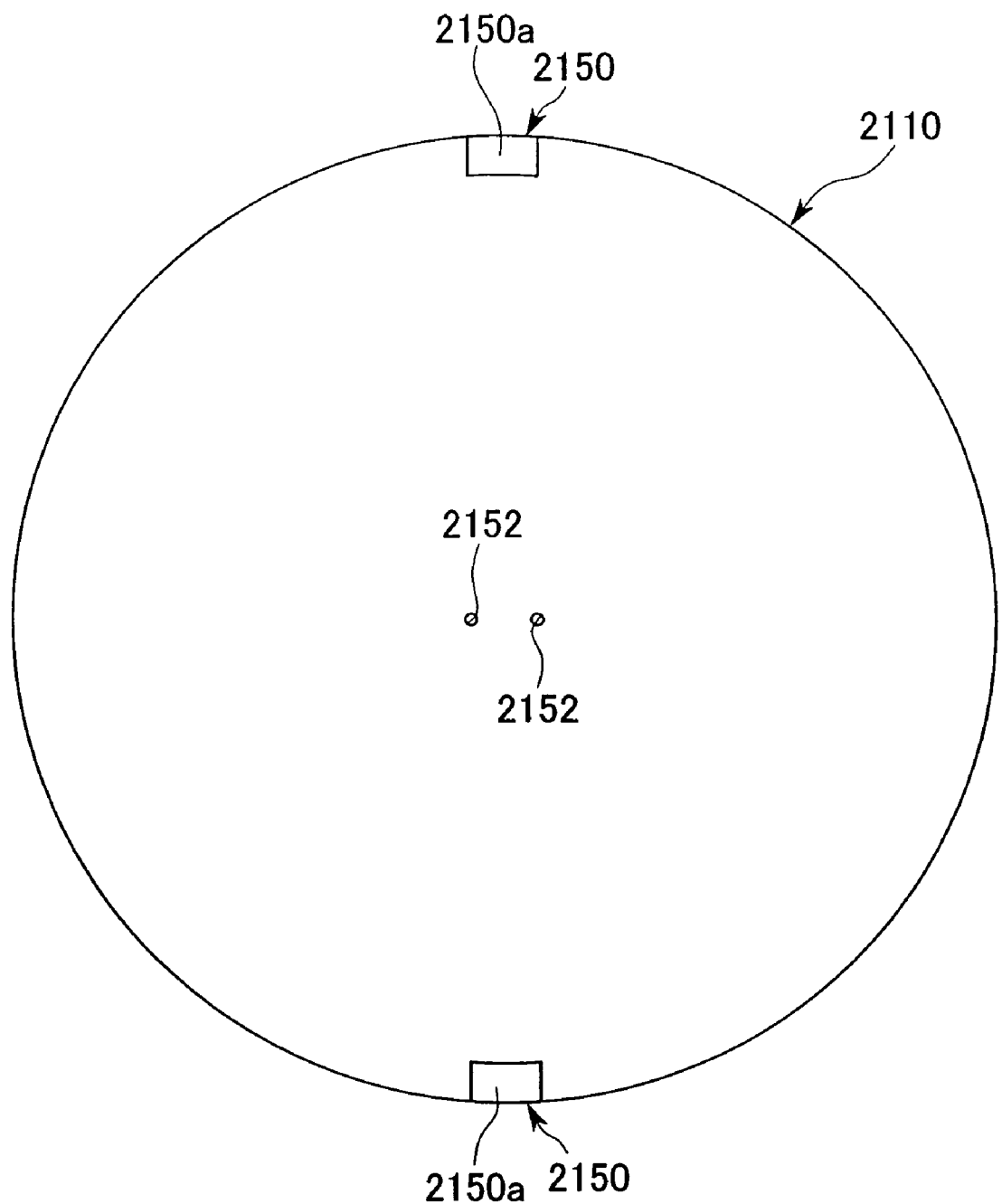
FIG. 7 is a plan view showing a separator of the heat storage unit of the second aspect of the present invention.

Hereunder is a description of another embodiment in the second aspect of the present invention, with reference to FIG. 5 to FIG. 7.

A heat storage unit 2111 of the second embodiment, as shown in FIG. 5, has a pair of main members 2112, and a separator 2110 which separates between these.

The main member 2112, as shown in FIG. 6, has: a bottomed cylindrical housing section 2116 having a cylindrical section 2113 and a bottom section 2114 which is perpendicular to the axis of this cylindrical section 2113 to close off one end in the direction of the axis, and is provided with an opening 2115 at the other end in the direction of the axis; a heat insulating space formation section 2118 which forms a heat insulating space 2117 for preventing radiation of heat, on the inside of the housing 2116; a fluid passage formation section 2120 which forms a fluid passage 2119 for circulating a heat containing fluid, on the inside of the heat insulating space 2117 (that is, on the inside of the housing 2116); and a heat storage material filling space formation section 2123 which forms a heat storage material filling space 2122 for filling with a heat storage material 2121, adjacent to the fluid passage 2119 on the inside of the heat insulating space 2017 (that is, on the inside of the housing 2116).

Moreover, each main member 2112 is integrally formed with, a semicircular shaped half inlet 2125 with an axis arranged on the opening 2115 side of the housing section 2116, for half forming on the inside a fluid introducing opening 2124 which communicates with one fluid passage 2119, and a semicircular shaped half outlet 2127 with an axis arranged on the opening 2115 side of the housing section 2116, for half forming on the inside a fluid outlet opening 2126 which communicates with the other fluid passage 2119, and a heat storage material circulation port section 2129 at the bottom section 2114 of the housing section 2116, which forms on the inside, a heat storage material circulation opening 2128 which communicates with the heat storage material filling space 2122. By means of the above, the heat insulating space formation section forms the heat insulating space 2117 between the housing section 2116, the fluid passage formation section 2120 and the heat storage material filling space formation section 2123.

Hereunder is a description of the main member 2112. In the description of the main member 2112 hereunder, while not particularly specified, the description of the axis direction, the circumferential direction, the center side, and the outer diameter side, denote the axis direction, the circumferential direction, the center side, and the outer diameter side all for the cylindrical section 2113 of the housing section 2116.

The main member 2112 has; a pair of wall sections 2131 and 2132 which protrude from the symmetrical positions of the housing section 2116 on the inner surface of the cylindrical section 2113 to the center side, and a plurality of wall sections 2133 arranged at equal intervals between these wall sections 2131 and 2132 and which extend from the inner surface of the cylindrical section 2113 to the center side.

Moreover, the main member 2112 has; a wall section 2135 which extends from the center side of the wall section 2133 which is adjacent to the one wall section 2131 on one side in the circumferential direction, in the opposite direction to this wall section 2131 approximately along the inner surface of the cylindrical section 2113, and further which is shaped to extend in a spiral shape (helix) towards the central position of the cylindrical section 2113 with a gradually reducing radius of curvature, a wall section 2136 which extends from the wall section 2131 on the inside of the wall section 2135 at a predetermined spacing with this, in the same spiral shape (helix), a wall section 2137 which connects the wall section 2135 and the wall section 2136 on the outer diameter side, and a semicircular wall section 2138 which connects the wall section 2135 and the wall section 2136 on the center side.

Here, regarding the wall section 2135, the outer most part is connected to the center side of the wall section 2132 and to the center sides of the wall sections 2133 which are arranged between the wall sections 2131 and 2132. Moreover, regarding the wall section 2136, the outermost part is connected to the wall section 2131 and to the end portion on the center side of the wall section 2133 where the wall section 2135 starts extending.

Moreover, the main member 2112 has; a wall section 2139 which extends from the center side of the wall section 2133 which is adjacent to the wall section 2132 on the opposite side to the one wall section 2131 in the circumferential direction (the same side in the circumferential direction with respect to the one wall section 2131, as the wall section 2133 where the wall section 2135 starts extending), in the opposite direction to this wall section 2132 approximately along the inner surface of the cylindrical section 2113, and further which is shaped to extend in a spiral shape (helix) towards the central position of the cylindrical section 2113 with a gradually reducing radius of curvature, a wall section 2140 which extends from the wall section 2132 on the inside of the wall section 2139 and the outside of the wall section 2135 at a predetermined spacing with this, in the same spiral shape (helix), a wall section 2141 which connects the wall section 2139 and the wall section 2140 on the outer diameter side, and a semicircular wall section 2142 which connects the wall section 2139 and the wall section 2140 on the center side.

Here, regarding the wall section 2139, the outermost part is connected to the center side of the wall section 2131 and the center sides of the wall sections 2133 which are arranged between the wall sections 2132 and 2131. Moreover, regarding the wall section 2140, the outermost part is connected to the wall section 2132 and to the end portion on the center side of the wall section 2133 where the wall section 2139 starts extending.

Then, the center of the wall section 2138 which connects the wall section 2135 and the wall section 2136 to each other on the center side, and the center of the wall section 2142 which connects the wall section 2139 and the wall section 2140 to each other on the center side are arranged in linear symmetrical positions with respect to an imaginary line linking the center in the circumferential direction of the wall section 2131 and the center in the circumferential direction of the wall section 2132.

Here, the abovementioned wall section 2135, a part excluding the predetermined outside region of the wall section 2136, and the wall sections 2137 and 2138 are connected in a loop shape to form a wall group 2144 as a whole. The wall section 2139, a part excluding the predetermined outside region of the wall section 2140, and the wall sections 2141 and 2142 are connected in a loop shape to form a wall group 2145 as a whole. Then, these wall groups 2144 and 2145 are arranged at point symmetrical positions centered on the axis, and also, the wall group 2145 is arranged between the spiral of the wall groups 2144. As a result, the wall groups 2144 and 2145 are double spiral shaped.

The wall sections 2131, 2132 and 2133, the wall group 2144 and the wall group 2145 are all connected to the bottom section 2114 of the housing section 2116 over their whole length, and their heights in the axial direction coincide with the end on the opening 2115 side of the housing section 2116 over their whole length.

Moreover, the heat insulating space formation sections 2118 are respectively configured by a plurality of predetermined parts connected in a bottomed cylindrical shape, that is, a part on the inner surface side including the inner surface of the bottom section 2114, a part on the inner surface side including the inner surface of the cylindrical section 2113, a part on the outer surface side including the outer surface of the wall section 2135, a part on the outer surface side including the outer surface of the wall section 2136, a part on the outer surface side including the outer surface of the wall section 2133, a part on the outer surface side including the outer surface of the wall section 2131, and a part on the outer surface side including the outer surface of the wall section 2132. Inside of these plurality of (specifically, 8) heat insulating space formation sections 2118, the heat insulating spaces 2117 for preventing radiation of heat are respectively formed.

In these heat insulating spaces 2117, a heat insulator 2186 such as urethane is to be respectively filled. However, even if the heat insulating spaces 2117 are not filled with anything and left as spaces, air layers of these spaces prevent the radiation of heat. Polish treatment may be applied to the heat insulating space formation sections 2118 in order to further increase the thermal insulation performance. Here, in some cases, the heat insulating spaces 2117 and the heat insulating space formation sections 2118 are not formed.

Moreover, the heat storage material filling space formation sections 2123 are respectively configured by; a part on the inner surface side including the inner surface of one of the wall groups 2144 in a loop shape and a part on the inner surface side including the inner surface of the bottom section 2144 located on the inside, and a part on the inner surface side including the inner surface of the other of the wall groups 2145 in a loop shape and a part on the inner surface side including the inner surface of the bottom section 2114 located on the inside. Inside of these plurality of (specifically, 2) heat storage material filling space formation sections 2123, the heat storage material filling spaces 2122 for preventing radiation of heat are respectively formed.

Here, since the wall group 2144 and the wall group 2145 are double spiral shaped as mentioned above, the heat storage material filling space formation sections 2123 and the heat storage material filling spaces 2122 thereinside are also double spiral shaped.

On the other hand, the fluid passage formation sections 2120 are configured by; a part on this surface side including the opposite surface with respect to the heat storage material filling space 2122 of the wall section 2136, a part on this surface side including the opposite surface with respect to the heat storage material filling space 2122 of the wall section 2135, a predetermined part on this surface side including the opposite surface with respect to the heat storage material filling space 2122 of the wall section 2139, a part on this surface side including the opposite surface with respect to the heat storage material filling space 2122 of the wall section 2140, and a part on the inner surface side including the inner surface of the bottom section 2114 between them. Inside of the fluid passage formation sections 2120 the fluid passages 2119 are formed.

Here, since the wall group 2144 and the wall group 2145 are double spiral shaped as mentioned above, the filling space formation sections 2122 and the fluid passages 2122, formed between the sides of these are double spiral shaped communicating with each other at the center.

The main member 2112 has, in the end position on the opening 2115 side of the wall section 2131, a semicircular shaped half inlet 2125 with the axis coinciding with the end of the opening 2115 and which is convex shaped to the bottom section 2114 side and protrudes to the outer diameter side from the cylindrical section 2113. This semicircular shaped half inlet 2125 lies along the radial direction of the cylindrical section 2113 and a half of the fluid introducing opening 2124 on the inside is communicated with a part on the wall section 2132 side of the fluid passage 2119. Here, regarding the half inlet 2125, the height of both side edges arranged on the half surface, and the axis, is set so as to be higher than the edge of the opening 2115 by an amount of half the thickness of the separator 2110, over the whole length.

Furthermore, the main member 2112 has, in the end position on the opening 2115 side of the wall section 2132, a semicircular shaped half outlet 2127 with the axis coinciding with the end of the opening 2115 and which is convex shaped to the bottom section 2114 side and protrudes to the outer diameter side from the cylindrical section 2113. This semicircular shaped half outlet 2127 lies along the radial direction of the cylindrical section 2113 and a half of the fluid outlet opening 2126 on the inside is communicated with a part on the wall section 2131 side of the fluid passage 2119. Here, regarding the half outlet 2127, the height of both side edges arranged on the half surface, and the axis, is set so as to be higher than the edge of the opening 2115 by an amount of half the thickness of the separator 2110, over the whole length.

In addition, regarding the main member 2112, on the outer diameter side of the bottom section 2114, a plurality of (specifically, 2) heat storage material circulating port sections 2129 for forming thereinside heat storage material circulating openings 2128 which separately open respectively to inside of the plurality of (specifically, 2) heat storage material filling spaces 2122, are provided protruding to the opposite side with respect to the cylindrical section 2113.

The separator 2110 is disc shaped, and ramps 2150 are formed at mutually symmetric positions on the outer diameter side of the outer diameter and are tapered so that the thickness becomes thinner on the outer diameter side. That is to say, these ramps 2150 are configured by a pair of ramp surfaces 2150a which are each mirror symmetrical shaped in the thickness direction of the separator 2110.

The separator 2110 is arranged in order to separate between the pair of main members 2112, and the positions of the ramps 2150 are adjusted to coincide with the half inlets 2125 and the half outlets 2127 of the main members 2112. Moreover, in the separator 2110, a plurality of communication holes 2152 which communicate in this condition, between the inner end sections of corresponding parts of the heat storage material filling spaces 2112 of the pair of main members 2112, are formed.

That is to say, one of the communication holes 2152 communicates between the inner end section of the one heat storage material filling space 2112 of the one main member 2112 and the inner end section of the one heat storage material filling space 2112 of the other main member 2112. The other communication hole 2152 communicates between the inner end section of the other heat storage material filling space 2112 of the one main member 2112 and the inner end section of the other heat storage material filling space 2112 of the other main member 2112.

Then, the heat storage material 2121 is respectively filled via the respective heat storage material circulation openings 2128 of the respective heat storage material circulation port sections 2129 of the one main member 2112 into the respective heat storage material filling spaces 2112 of the one main member 2112, and via the respective communication holes 2152 into the respective heat storage material filling spaces 2112 of the other main member 2112. Here, the heat storage material 2121 to be filled into the heat storage material filling spaces 2122 is similar to the first embodiment.

The main members 2112, in the case where this is divided to the left and right on the virtual plane including the center in the circumferential direction of the wall sections 2131 and 2132 and the axis 2113 of the cylindrical section 2113, are respectively point symmetrical shaped centered on the axis 2113 of the cylindrical section 2113. Then, in the condition where, regarding the pair of identical shaped main members 2112, the opening 2115 sides of the housing sections 2116 are opposed to each other and the separator 2110 intervenes between the cylindrical sections 2113, the half inlets 2125 and the half outlets 2127 are superposed on each other.

At this time, the opening 2115 sides of the parts inside the cylindrical section 2113 are all joined to the separator 2110. Moreover, at this time, regarding the pair of main members 2112, the fluid introducing openings 2124 are communicated with each other, the fluid outlet openings 2126 are communicated with each other, and the corresponding heat storage material filling space 2122 are communicated with each other by the communication hole 2152. Moreover, the cylindrical inlet 2188 is formed by the pair of half inlets 2125, and the cylindrical outlet 2189 is formed by the pair of half outlets 2127. At the same time, in the pair of the main members 2112, a fluid introduced from the one fluid introducing opening 2124 is branched into the mutual fluid passages 2119, and then merged at the fluid outlet openings 2126.

Here, the main members 2112 of the above shape are also integrally formed into identical shapes by a similar material and manufacturing method to the first embodiment. However, regarding the separator 2110, which is separately manufactured, the same material to the main member 2112 can be used.

Then, regarding the pair of the main members 2112 formed into identical shapes in this way, as mentioned above, the openings 2015 of the housing sections 2016 are opposed to each other, the half inlets 2125 and the half outlets 2127 are directly bonded to each other, and the cylindrical section 2113 and the wall sections 2144 and 2145, and the like of the parts inside are bonded to the separator 2110 and integrated. At this time, they are bonded by a bonding method such as ultrasonic welding, brazing, or gluing, suitable for the material.

Then, regarding one of the main members of the pair of main members 2112 integrated in this way, the heat storage material 2121 is filled in a fluid condition from all of the heat storage material circulating openings 2128 into the heat storage material filling spaces 2122, the communication hole 2152, and the heat storage material filling space 2122 of the other main member 2112, which are respectively communicated with these heat storage material circulating openings 2128 (at this time, air is vented from the heat storage material circulating openings 2128 of the other main member 2112), and the heat storage material 2121 is then solidified to form the heat storage unit 2111.

According to the above-described embodiment in the second aspect, the housing sections 2116, the fluid passage formation sections 2120 which form the fluid passages 2119 for circulating the heat containing fluid, on the inside of the housing sections 2116, and the heat storage material filling space formation sections 2123 which form the heat storage material filling spaces 2122 for filling with the heat storage material 2121, adjacent to the fluid passages 2119 on the inside of the housing sections 2116 are integrally formed, in order to form the main member 2112. Thereafter, all that is necessary is to connect these pairs of main members 2112 with the opening 2115 sides of the housing sections 2116 opposing each other with the separator 2110 intervening, and to fill the heat storage material 2121 into the heat storage material filling spaces.

Therefore, compared to an arrangement where the heat storage material is enclosed in the envelope to form the heat reservoir, and a crevice which becomes the fluid passage is formed with spacers intervening and this heat reservoir is wrapped around the core in a spiral shape, the number of parts is reduced and manufacture is simplified. Moreover, the housing sections 2116 of the main members 2112, the fluid passage formation sections 2120, and the heat storage material filling space formation sections 2123 are integrally formed so that the core becomes unnecessary, and the fluid passages 2119 and the heat storage sections can thus be enlarged by that amount.

Therefore, the number of parts can be reduced. Moreover, manufacture is simplified, manufacturing cost can be reduced, heat storage capacity can be amply maintained and high performance can be attained.

In this way, in the main members 2112, in addition to the abovementioned housing sections 2116, the fluid passage formation sections 2120, and the heat storage material filling space formation sections 2123, the heat insulating space formation sections 2118 which form the heat insulating spaces 2117 where the heat insulator 2186 is arranged or which are to be spaces, are further integrally formed. Consequently, the number of parts is reduced and manufacture is simplified.

Therefore, even in the case where the heat insulating space formation sections 2118 are provided, the number of parts can be reduced. Moreover manufacture is simplified, and manufacturing cost can be reduced.

Furthermore, when a pair of main members 2112 are connected with the opening 2115 sides of the housing sections 2116 opposing each other, the half inlets 2125 are connected to each other to form the inlet 2188 which communicates with the fluid passages 2119 on one side and the half outlets 2127 are connected to each other to form the outlet 2189 which communicates with the fluid passages 2119 on the other side. In this way, in the main members 2112, in addition to the abovementioned housing sections 2116, the fluid passage formation sections 2120, and the heat storage material filling space formation sections 2123, the half inlets 2125 and the half outlets 2127 are further integrally formed. Consequently; for the parts of the inlet 2188 and the outlet 2189 which communicate with the fluid passages 2129, the number of parts is reduced and manufacture is simplified.

Therefore, even in the case where the inlet 2188 and the outlet 2189 are provided, the number of parts can be reduced. Moreover, manufacture is simplified, and manufacturing cost can be greatly reduced.

Furthermore, in the main members 2112, in addition to the abovementioned housing sections 2116, the fluid passage formation sections 2120, and the heat storage material filling space formation sections 2123, the heat storage material circulation port sections 2129 which form the heat storage material circulation openings 2128 which communicate with the heat storage material filling spaces 2022 at the bottom sections 2114 of the housing sections 2116, are further integrally formed. Consequently, for the part of these heat storage material circulation port sections 2129, the number of parts is reduced and manufacture is simplified.

Therefore, even in the case where the heat storage material circulation port sections 2129 are provided, the number of parts can be reduced. Moreover, manufacture is simplified, and manufacturing cost can be reduced.

In addition, between the pair of main members 2112, the separator 2110 for separating between both of these main members 2112 is provided. Consequently, the respective fluid passages 2119 and the heat storage material filling spaces 2122 of the pair of main members 2112 are respectively close off by the separator 2110.

Therefore, the bonding is simplified compared to the case where the fluid passage formation sections 2120 and the heat storage material filling space formation sections 2123 are bonded to each other by the pair of the main members 2112 without providing the separator 2110.

Furthermore, in the separator 2110, the communication hole 2152 which communicates between the heat storage material filling spaces 2122 of the pair of main members 2112 is formed. Therefore, the heat storage material 2121 can be filled into the heat storage material filling spaces 2122 of the pair of main members 2112 at one time.

Consequently, the heat storage material 2121 can be easily filled. Moreover, in the case where a latent heat storage material is used for the heat storage material 2121, when a phase change is generated in the heat storage material 2121, the crystallization spreads out in both of the heat storage material filling spaces 2122 of the pair of the main members 2112. Therefore, the supercooling phenomenon is unlikely to occur.

In addition, the fluid passages 2119 are double spiral shaped communicating with each other at the center. Therefore, the inlet 2188 and the outlet 2189 for guiding the fluid passages 2119 to the outside can be arranged on the outer-most peripheral section, while keeping a large radius of curvature and a small number of windings of the fluid passages 2119.

Consequently, the passage resistance of the fluid passage 2119 can be reduced and the fluid can be easily guided to the inlets 2188 for introducing the fluid and the outlets 2189 for outlet the fluid.

Furthermore, since the heat storage material filling spaces 2122 are double spiral shaped, the radius of curvature of the heat storage material filling spaces 2122 can be enlarged.

Consequently, the passage resistance of the heat storage material filling spaces 2122 can be reduced, and hence the heat storage material 2121 can be filled easily.

In addition, since the pair of main members 2112 are identically-shaped, a mold for integrated formation can be shared by the respective main members 2112.

Consequently, mold depreciation can be reduced.

Figure 8:
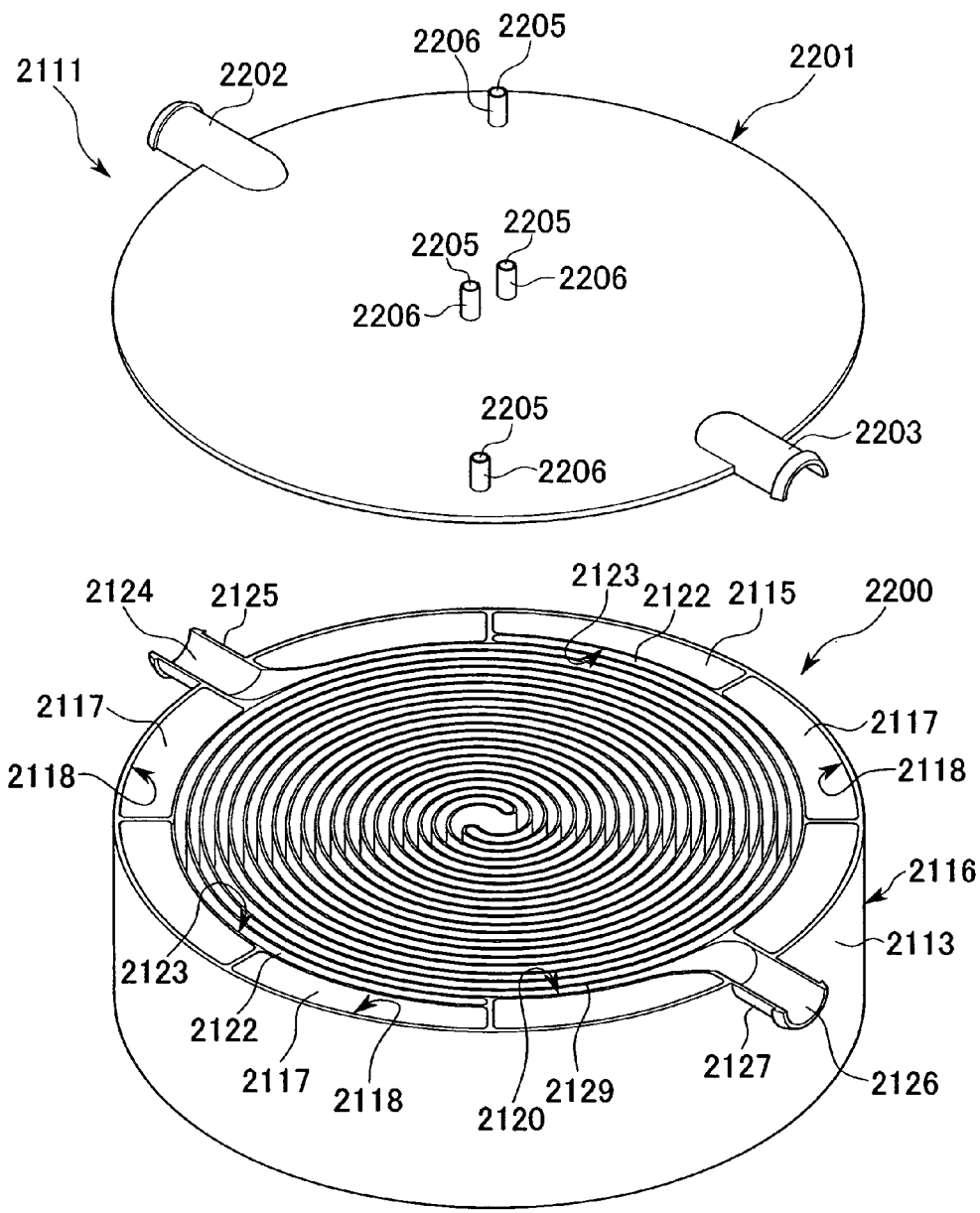
FIG. 8 is an exploded perspective view showing a heat storage unit of a second aspect of the present invention.
Figure 9:
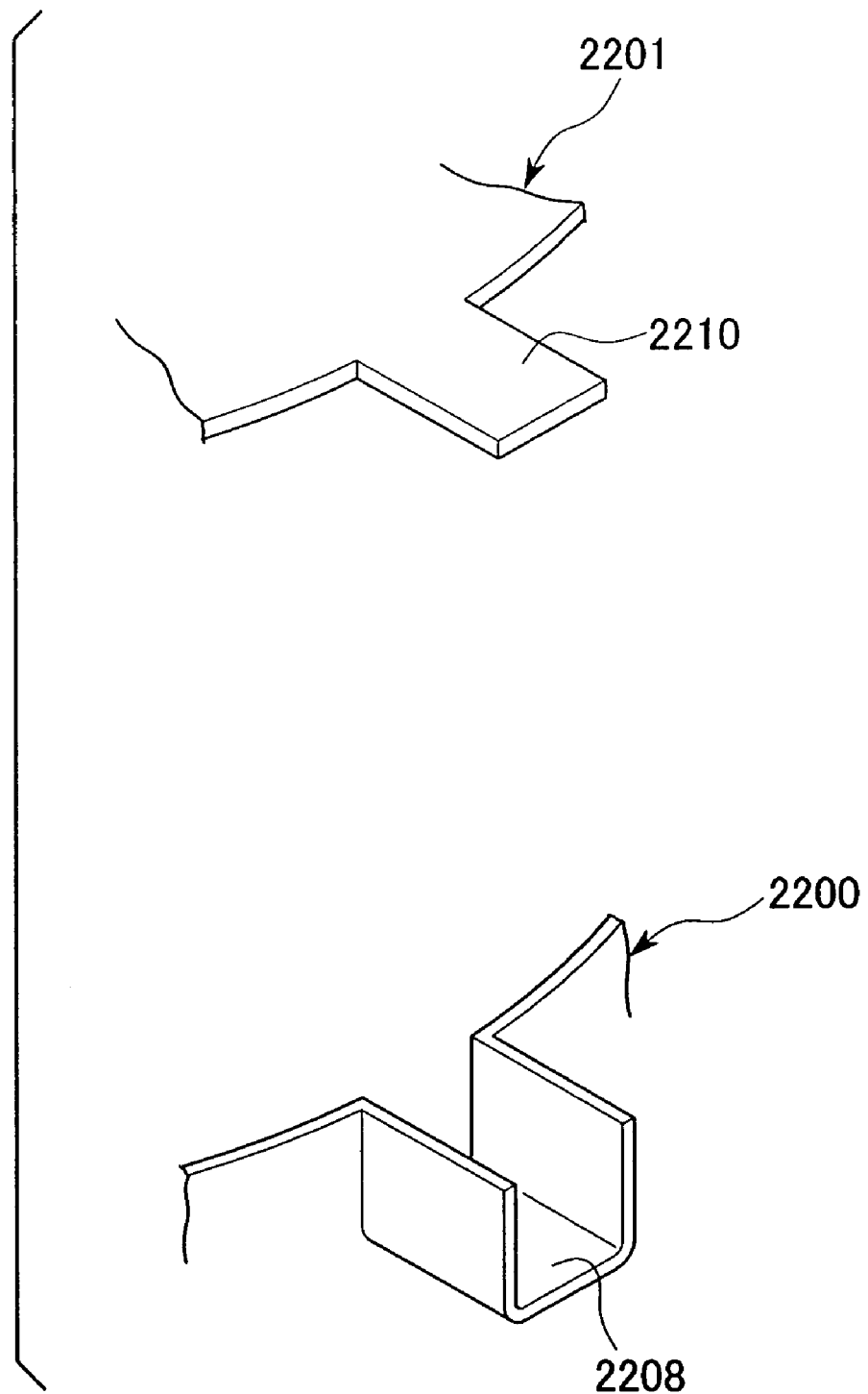
FIG. 9 is a perspective view showing an another example of an inlet of the heat storage unit of the second aspect of the present invention.

Hereunder is a description of a third embodiment in the second embodiment of the present invention, with reference to FIG. 8 to FIG. 9.

A heat storage unit 2111 of the third embodiment, as shown in FIG. 8, has; a main member 2200 of identical configuration to the main member 2112 of the second embodiment except that the heat storage material circulation port sections 2129 are not provided at the bottom section 2114, and a lid member 2201 which is opposed to the opening 2115 side of the housing section 2116 of the main member 2200.

The lid member 2201 is disc shaped. At mutually symmetrical positions on the outer diameter side, a semicircular shaped half inlet (cover section) 2202 with the axis arranged on the main member 2200 side and which half forms a fluid introducing opening on the inside, and a semicircular shaped half outlet (cover section) 2203 with the axis arranged on the main member 2112 side and which half forms a fluid outlet opening on the inside, are integrally formed.

This lid member 2201 is arranged opposing the opening 2115 side of the main member 2200 in order to close this off, and the position of the half inlet 2125 of the main member 2200 is coincided with the half inlet 2202 and the position of the half outlet 2127 is coincided with the half outlet 2203. Furthermore, in the lid member 2201, in the condition with the positions coincided in this way, a plurality of heat storage material circulation port sections 2206 which form the heat storage material circulation openings 2205 which communicate with the respective heat storage material filling spaces 2122 inside, are integrally formed. Here, the heat storage material circulation port sections 2206 communicate with the end sections respectively on the inner diameter side and on the outer diameter side of the respective heat storage material filling spaces 2121 of the main member 2200.

Then, the heat storage material is filled via the heat storage material circulation openings 2205 of any one of the inner or outer heat storage material circulation port sections 2206 of the lid member 2201, into the respective heat storage material filling spaces 2112 of the one main member 2112. Here, the heat storage material 2121 to be filled into the heat storage material filling space 2122 is similar to the first embodiment.

Regarding the above heat storage unit 2111, in the condition where the lid member is arranged so as to oppose to the opening 2115 of the housing section 2116 of the main member 2200 and in the condition where the pair of the half inlet 2125 of the main member 2200 and the half inlet 2202 of the lid member 2201, and the pair of the half outlet 2127 of the main member 2200 and the half outlet 2203 of the lid member 2201 are superposed, the main member 2200 and the lid member 2201 are joined.

At this time, the parts on the opening 2115 side of the main member 2200 are all joined to the lid member 2201 and integrated. Also at this time, they are bonded by a bonding method such as ultrasonic welding, brazing, or gluing, suitable for the material.

Here, the main member 2200 of the above shape is also integrally formed into an identical shape by a similar material and manufacturing method to the first embodiment. However, regarding the lid member 2201 which is separately manufactured, the same material to the main member 2200 can be used.

Then, when integrated in this way, the heat storage material 2121 is filled in a fluid condition from any one of the inner or outer heat storage material circulating openings 2128 of the lid member 2201 into the heat storage material filling spaces 2122 which are respectively communicated with these, and the heat storage material 2121 is then solidified to form the heat storage unit 2111.

According to the above third embodiment, the number of parts is further reduced than for with a separator, and the welding time is reduced when integrating by welding. Therefore the processing cost becomes less and reliability is improved. Furthermore, it becomes possible to arrange the inlet and outlet for the fluid on either one of the upper part or side face, so that the degree of freedom in design is improved.

As shown in FIG. 9, the arrangement may be such that a fluid inlet 2208 of a U-shaped cross-section is provided instead of the half inlet 2125 of the main member 2200 and a similar fluid outlet is provided instead of the half outlet 2127, and to coincide with these, a flat cover section 2210 is provided instead of the half inlet 2202 of the lid member 2201 and a similar cover section is provided instead of the half outlet 2203.

Hereunder is a description of embodiments in a third aspect of the present invention, with reference to FIG. 10 to FIG. 16.

Figure 10:
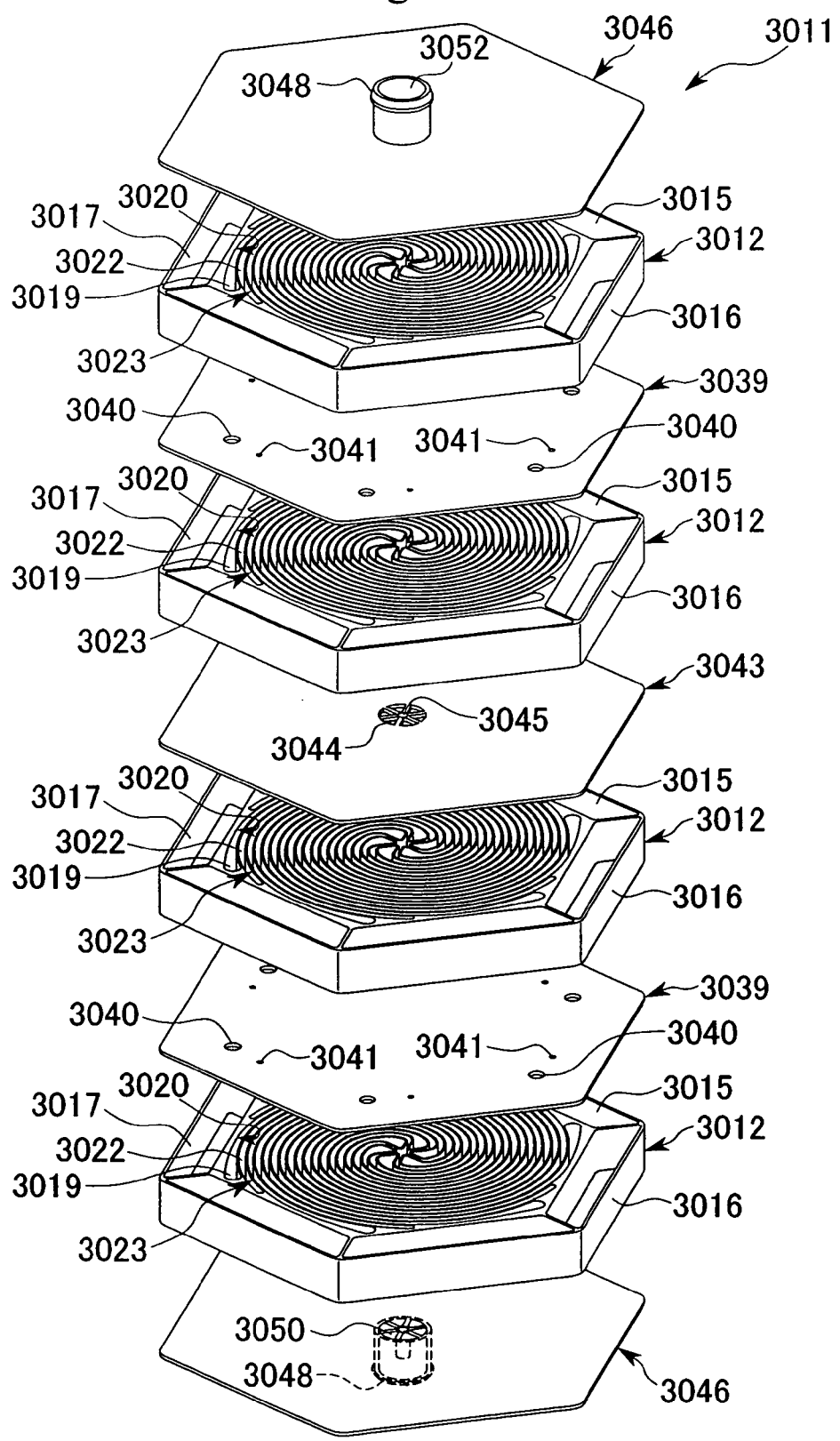
FIG. 10 is an exploded perspective view showing a heat storage unit of the third aspect of the present invention.

A heat storage unit 3011 of the present embodiment, as shown in FIG. 10, has a plurality of, specifically four, main members 3012 which are polygonal cylindrical shape, specifically hexagonal cylindrical shape.

Figure 11:
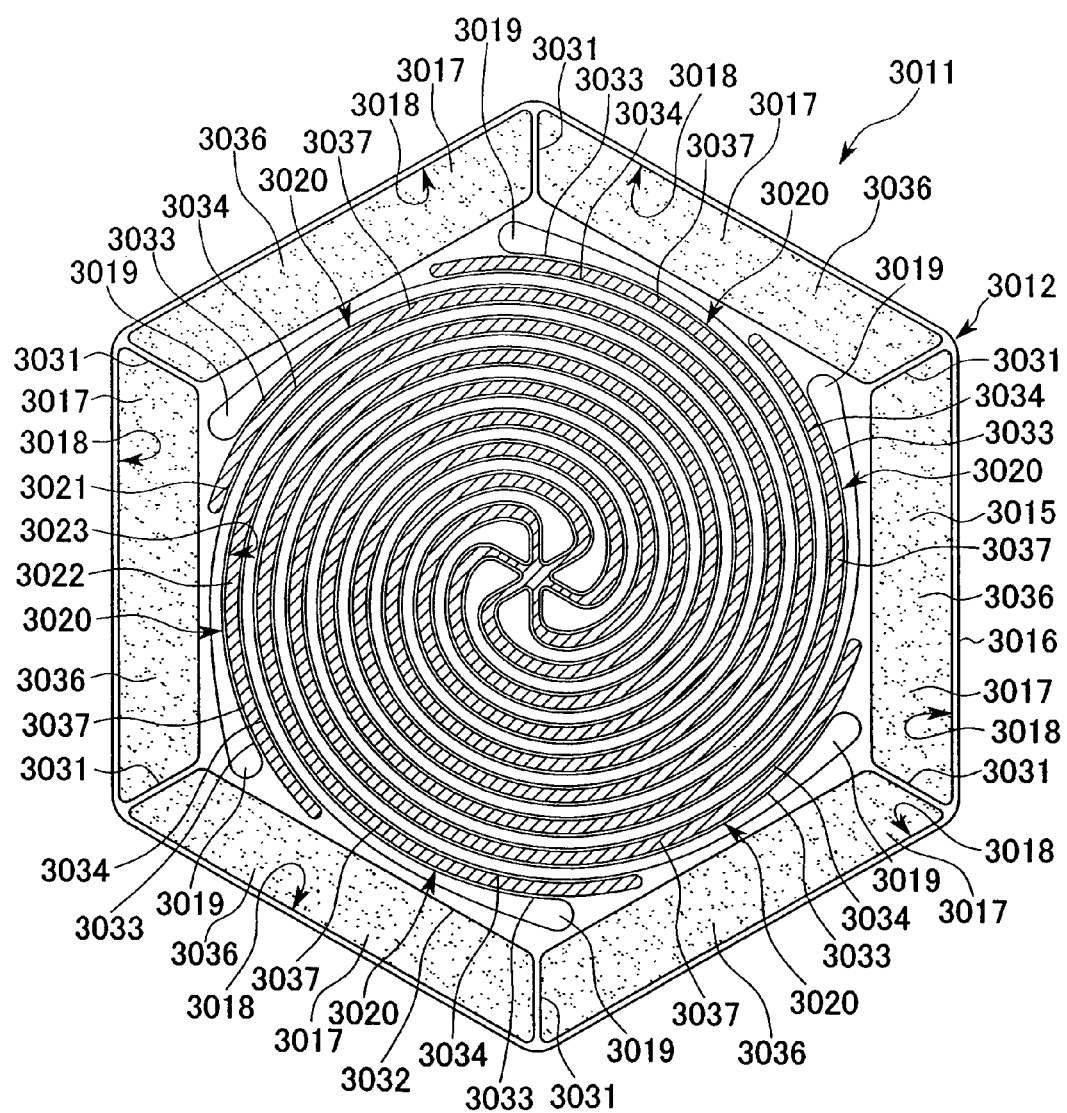
FIG. 11 is a cross-sectional view showing a main member of the heat storage unit of the third aspect of the present invention.

The main member 3012, as shown in FIG. 11, has outer wall sections 3016 which are hexagonal cylindrical shape and are provided with the openings 3015 at both ends, heat insulating space formation sections 3018 which form heat insulating spaces 3017 for preventing radiation of heat, on the inside of the outer wall sections 3016, fluid passage formation sections 3020 which form fluid passages 3019 for circulating a heat containing fluid, on the inside of the heat insulating spaces 3017 (that is, on the inside of the outer wall sections 3016), and heat storage material filling space formation sections 3023 which form heat storage material filling spaces 3022 for filling with heat storage material 3021, adjacent to the fluid passages 3019 on the inside of the heat insulating spaces 3017 (that is, on the inside of the outer wall sections 3016). By means of the above, the heat insulating space formation sections 3018 form the heat insulating spaces 3017 between the outer wall sections 3016, the fluid passage formation sections 3020 and the heat storage material filling space formation sections 3023.

Hereunder is a description of the main member 3012 mainly with reference to FIG. 11.

The main member 3012 has a plurality of, specifically six, wall sections 3031 which protrude from the inner surface of the respective corners of the outer wall section 3016 to the center side, and a wall section 3032 which is hexagonal shaped similarly to the outer wall section 3016 which connects the inner end sections of the wall sections 3031 to each other.

Moreover, the main member 3012 has a plurality of, specifically six, wall sections 3033 which extend in a spiral shape from near the respective wall sections 3031 of the wall section 3032 to the center side, and a plurality of, specifically six, wall sections 3034 on the inside of the respective wall sections 3033 which form a pair with the wall sections 3033 and extend in a spiral shape with a predetermined spacing. Regarding these wall sections 3033 and 3034, the ones adjacent those which do not form a pair are connected to each other on the center side.

Regarding the wall sections 3031, 3032 and 3033, their heights in the axial direction coincide with the ends on both opening 3015 sides of the outer wall section 3016 over their whole length.

Moreover, the heat insulating space formation sections 3018 are respectively configured by predetermined parts connected in a cylindrical shape, namely; a part on the inner surface side including the inner surface of the outer wall section 3016, a part on the wall surface side including the wall surface of the wall section 3031, and a part on the outer surface side including the outer surface of the wall section 3032. Inside of these plurality of (specifically, 6) heat insulating space formation sections 3018, the heat insulating spaces 3017 for preventing radiation of heat are respectively formed.

The main member 3012 is integrally formed into the above shape.

In the heat insulating spaces 3017, heat insulators 3086 such as urethane are to be respectively filled. However, even if the heat insulating spaces 3017 are not filled with anything and left as spaces, air layers of these spaces prevent the radiation of heat. Polish treatment may be applied to the heat insulating space formation sections 3018 in order to further increase the thermal insulation performance. Here, in some cases, the heat insulating spaces 3017 and the heat insulating space formation sections 3018 are not formed.

Moreover, the parts on the wall surface sides including the mutually opposed wall surfaces of the pair of wall section 3033 and 3034, are all connected on the center side to constitute the heat storage material filling space formation section 3023 in multiple spiral shapes. Inside this heat storage material filling space formation section 3023, the heat storage material filling space 3022 for preventing radiation of heat is formed. That is to say, this heat storage material filling space 3022 is constituted by a plurality of, specifically six, diverging sections 3037 of multiple spiral shape communicating with each other on the center side.

Furthermore, the heat storage material 3021 is filled into the heat storage material filling space 3022. Here, the heat storage material 3021 to be filled into the heat storage material filling space 3022 is a latent heat storage material, and a sugar alcohol system such as erythritol, xylitol, sorbitol, or $Mg(NO_3)\cdot 6H_2O$ is used.

Moreover, the part of the wall surface side including the mutually opposed wall surfaces of the wall section 3033 and 3034 which do not form a pair, and a part of the wall section 3032, constitute the plurality of, specifically six, fluid passage formation sections 3020 respectively and independently in multiple spiral shapes. Inside these fluid passage formation sections 3020, fluid passages 3019 are respectively formed.

Figure 12:
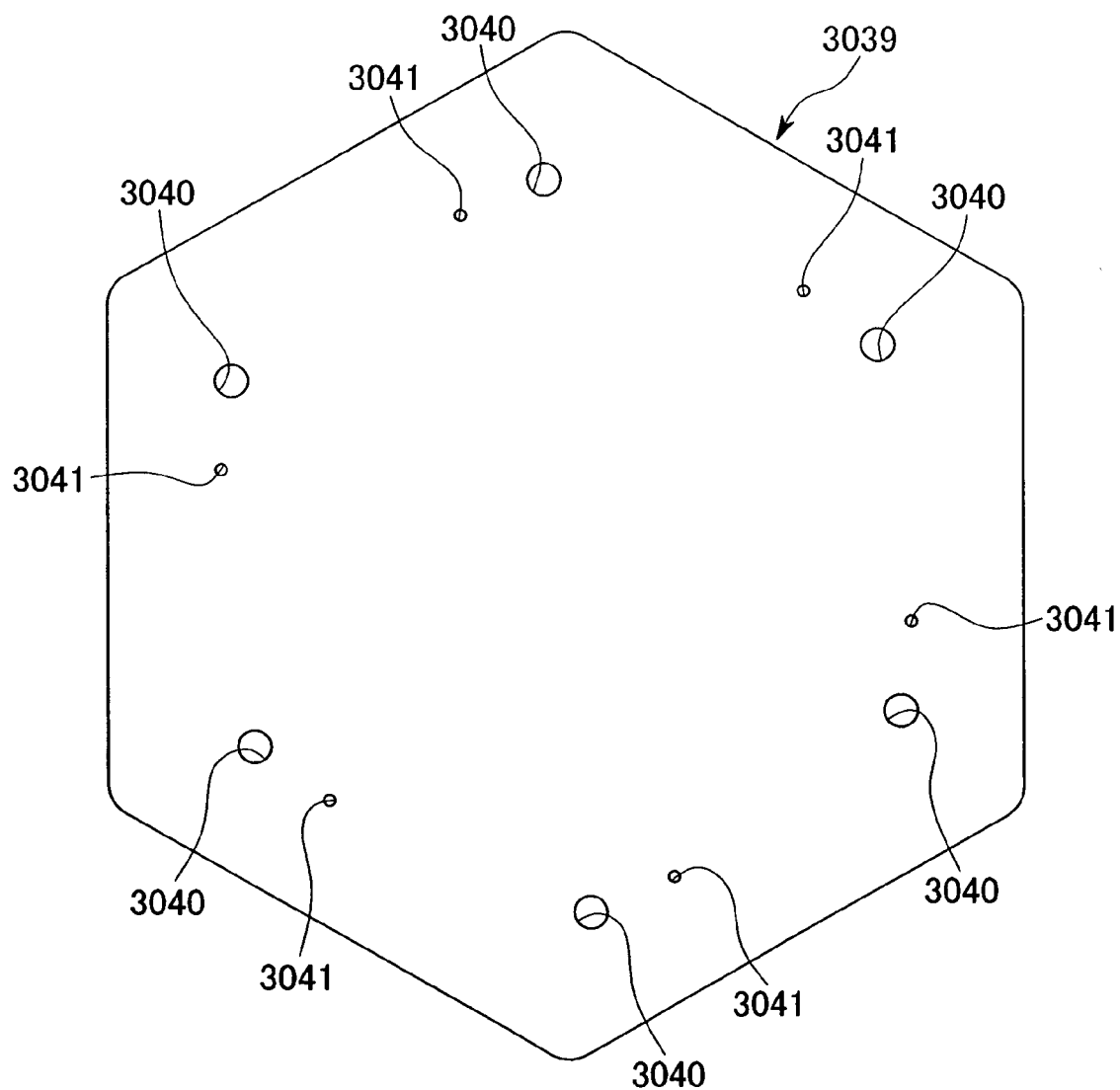
FIG. 12 is a plan view showing a first separator of the heat storage unit of the third aspect of the present invention.

The heat storage unit 3011 of the present embodiment, as shown in FIG. 10 and FIG. 12, has a plurality of first separators 3039 which are polygonal shape, specifically hexagonal shape. The first separators 3039 are arranged between pairs of main members 3012 adjacent at the front and rear. In the first separator 3039, a plurality of, specifically six, fluid passage communication holes 3040 which communicate between pairs of outer end sections corresponding to the fluid passages 3019 of pairs of main members 3012 which are arranged adjacent on both sides, and a plurality of, specifically six, heat storage material filling space communication holes 3041 which communicate between pairs of outer end sections corresponding to the diverging sections 3037 of the heat storage material filling spaces 3022 of the pair of main members 3012 which are arranged adjacent on both sides, are formed.

Figure 13:
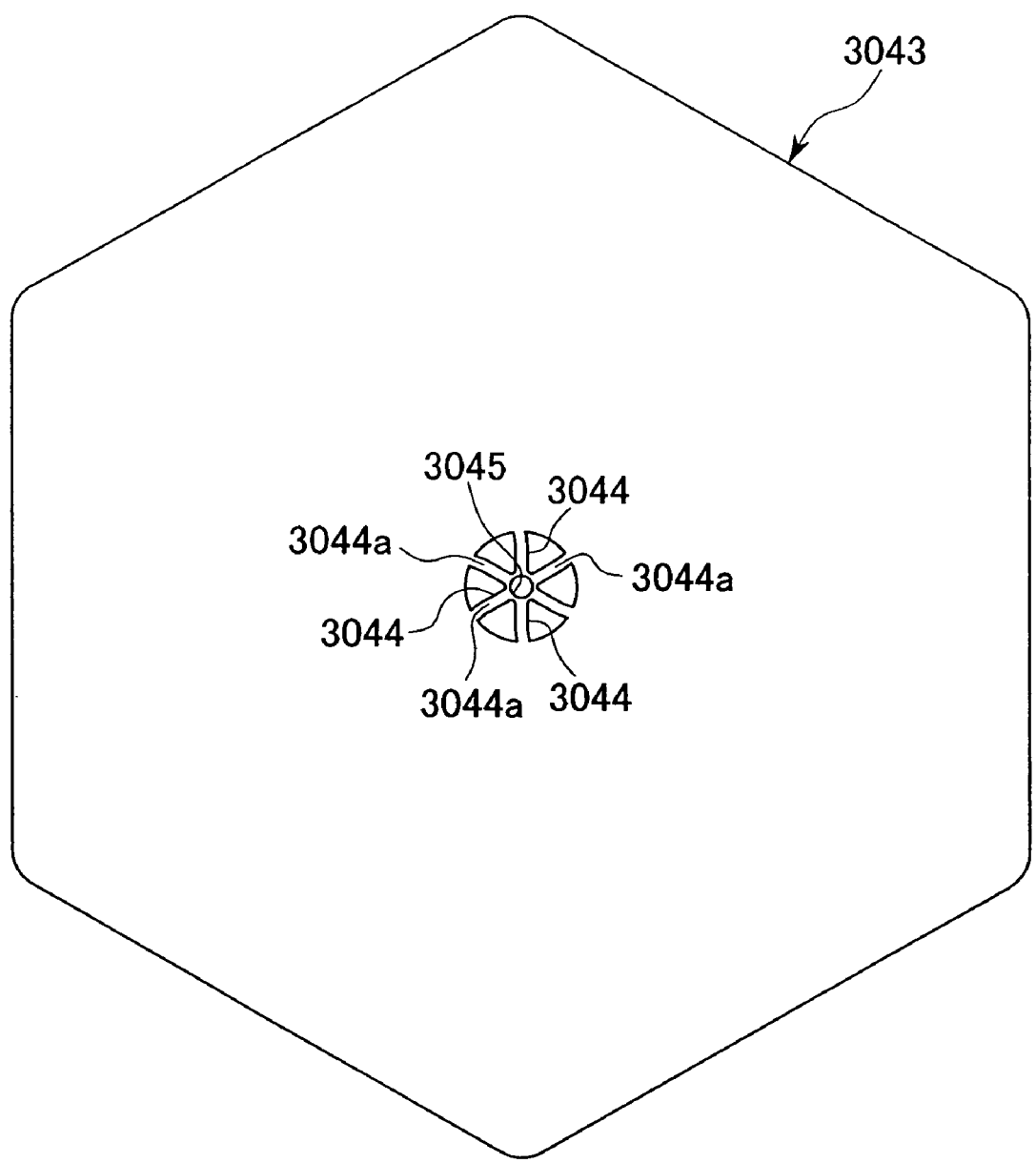
FIG. 13 is a plan view showing a second separator of the heat storage unit of the third aspect of the present invention.

Furthermore, the heat storage unit 3011 of the present embodiment, as shown in FIG. 10 and FIG. 13, has a second separator 3043 which is polygonal shape, specifically hexagonal shape. The second separator 3043 is arranged between pairs of main members 3012 adjacent at the front and rear. In the second separator 3043, a plurality of, specifically six, approximately sectorial fluid passage communication holes 3044 which communicate between pairs of inner end sections corresponding to the fluid passages 3019 of pairs of main members 3012 which are arranged adjacent on both sides, are radially formed. In the central position of these fluid passage communication holes 3044, a heat storage material filling space communication hole 3045 which communicate between a pair of central sections corresponding to the heat storage material filling spaces 3022 of pairs of main members 3012 which are arranged adjacent on both sides, is formed. Blockade sections 3044a between the pair of adjacent fluid passage communication holes 3044 are for blocking off a predetermined area outside of the central section of the heat storage material filling spaces 3022 of the adjacent main members 3012.

Figure 14:
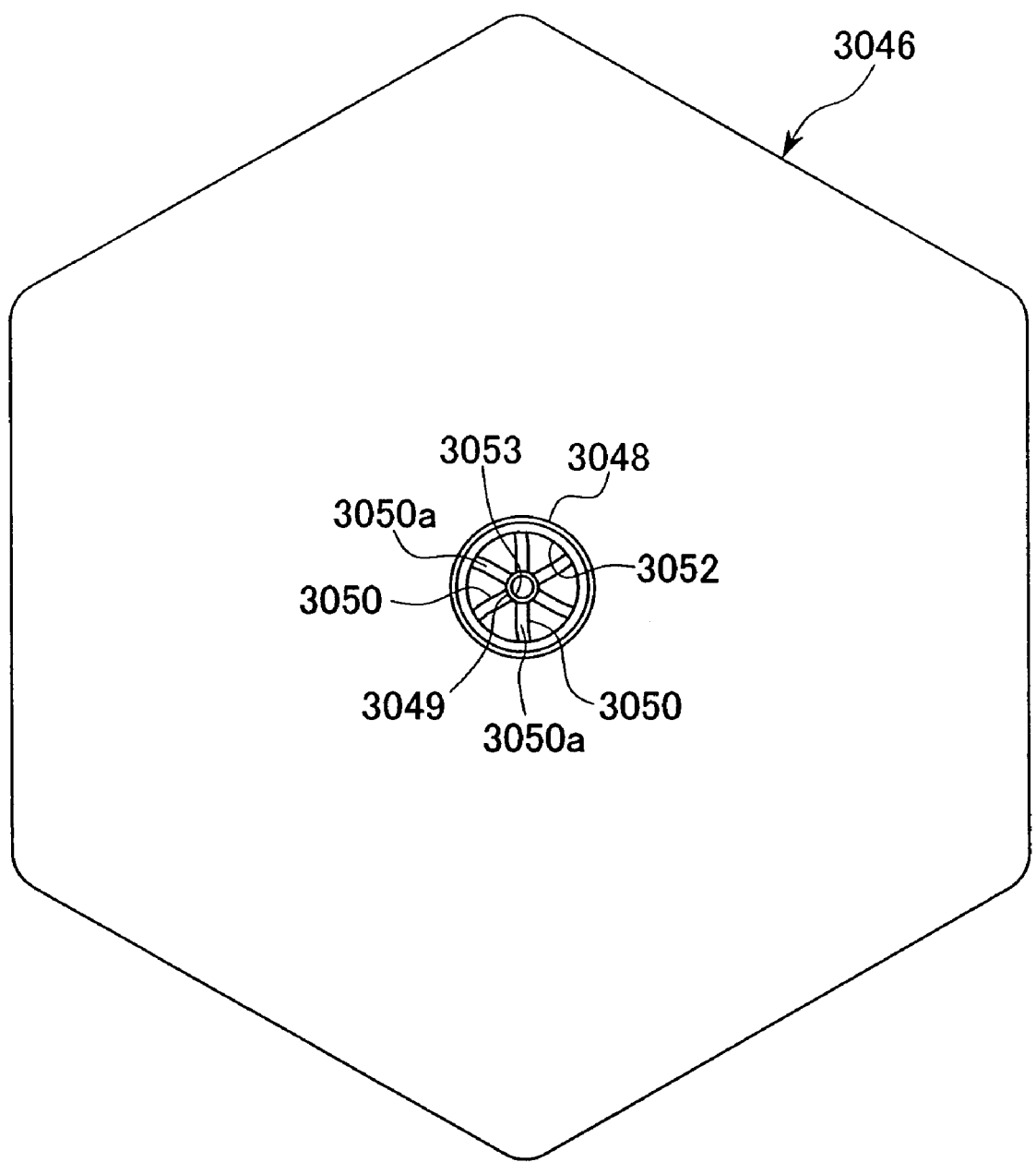
FIG. 14 is a plan view showing a lid member of the heat storage unit of the third aspect of the present invention.
Figure 15:
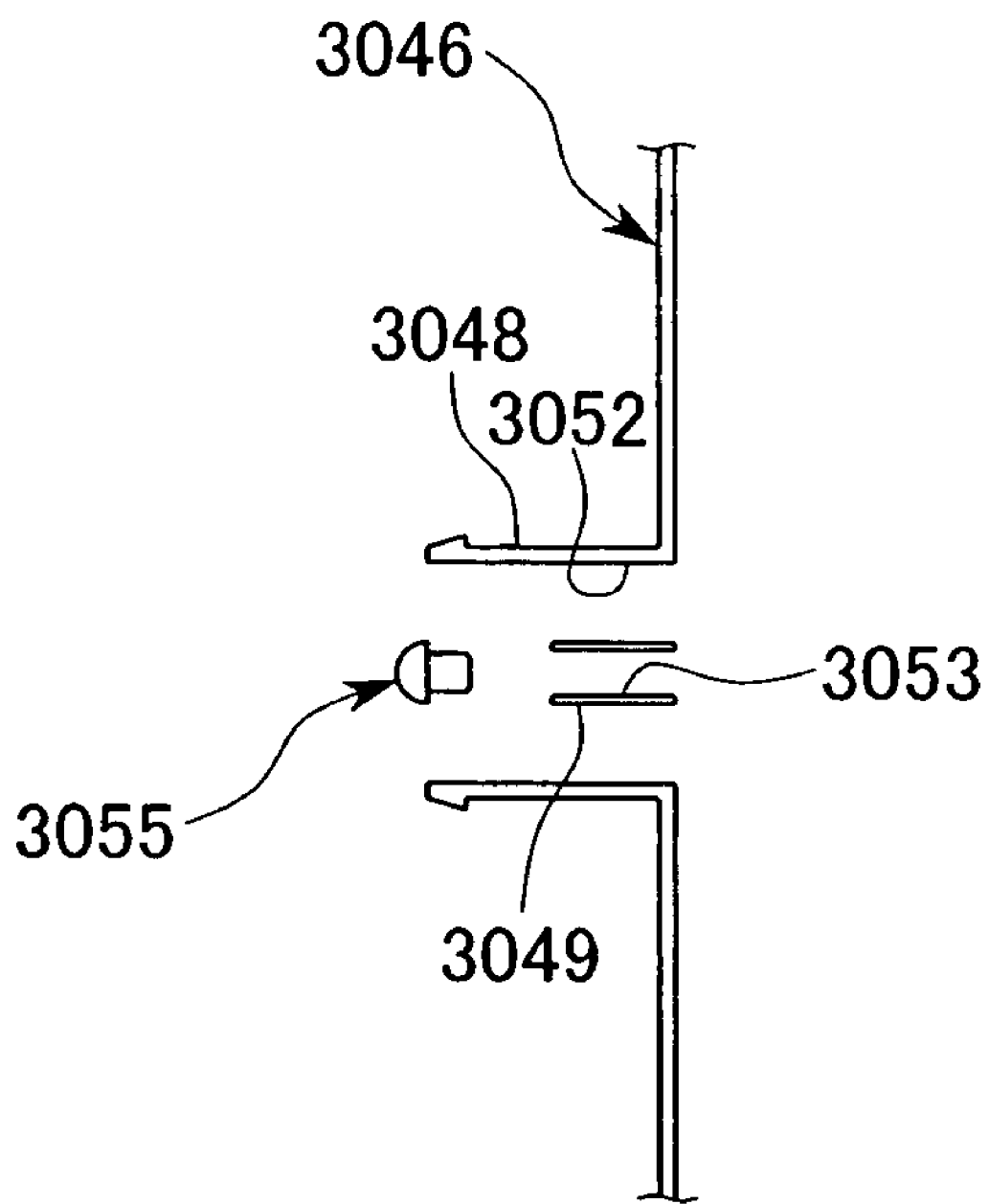
FIG. 15 is a partial cross-sectional view showing the lid member of the heat storage unit of the third aspect of the present invention.

In addition, the heat storage unit 3011 of the present embodiment, as shown in FIG. 10, FIG. 14 and FIG. 15, has a pair of lid members 3046 which are polygonal shapes, specifically hexagonal shapes. In the lid member 3046, a cylindrical fluid circulation port section 3048 which protrudes to one side in the thickness direction in the center, is formed. Inside of this fluid circulation port section 3048, a cylindrical heat storage material filling port section 3049 is formed coaxially. Between the fluid circulation port section 3048 and the heat storage material filling port section 3049, a plurality of sectorial fluid passage communication holes 3050 are radially formed. The lid member 3046 is integrally formed in such shape.

Here, a space between the fluid circulation port section 3048 and the heat storage material filling port section 3049 becomes a fluid circulation opening 3052 which is communicated with all of the inner end sections of the fluid passages 3019 of the adjacent main members 3012 and merges them. A space inside of the heat storage material filling port section 3049 becomes a heat storage material filling opening 3053 which communicates with the central section of the heat storage material filling spaces 3022 of the adjacent main members 3012. Moreover, this heat storage material filling opening 3053 is closed off by a stopper member 3055 which is installed in the heat storage material filling port section 3049. Furthermore, the blockade sections 3050a between the pair of fluid passage communication holes 3050 close off the part positioned in the fluid circulation opening 3052 of the heat storage material filling spaces 3022 of the adjacent main member 3012.

Here, the main members 3012 mentioned above are integrally formed by a resin such as polypropylene, polyamide, polyoxymethylene, polyethylene terephthalate or a metal such as aluminum, or a ceramic and the like. Furthermore, when integrally forming by a resin, they can be formed by extrusion molding or injection molding. When integrally forming by aluminum, they can be formed by extrusion molding or grinding. In the case of integrally forming by a metal other than aluminum, they can be formed by grinding, sintered, or the like.

Moreover, the abovementioned first separator 3039, the second separator 3043 and the lid member 3046, respectively, similarly to the abovementioned main members 3012 are integrally formed by a resin such as polypropylene, polyamide, polyoxymethylene, polyethylene terephthalate or a metal such as aluminum, or a ceramic and the like. Furthermore, regarding the first separator 3039, the second separator 3043 and the lid member 3046, when integrally forming by a resin, they can be formed by injection molding. When integrally forming by aluminum, they can be formed by grinding or the like. In the case of integrally forming by a metal other than aluminum, they can be formed by grinding, sintering, or the like.

Then, the pair of main members 3012 which are formed in identical shape, in a condition with the first separator 3039 intervened between, are superposed at the front and rear so that the openings 3015 oppose each other. Such two opposed pairs, in the condition with the second separator 3043 intervened between, are superposed at the front and rear so that the openings 3015 oppose each other. Furthermore, on the front side of the main member 3012 at the frond end, the lid member 3046 is arranged with the fluid circulation port section 3048 on the outside. On the rear side of the main member 3012 at the rear end, the lid member 3046 is arranged with the fluid circulation port section 3048 on the outside. They are then bonded and integrated with all of the hexagonal shapes aligned. That is to say, in the condition with the lid member 3046, the main member 3012, the first separator 3039, the main member 3012, the second separator 3043, the main member 3012, the first separator 3039, the main member 3012 and the lid member 3046 sequentially laminated, they are integrated. At this time, they are bonded by a bonding method such as ultrasonic welding, brazing, or gluing, suitable for the material.

In the condition integrated by bonding in this way, the heat storage material 3021 is filled from the heat storage material filling opening 3053 of one of the lid members 3046 in a fluid condition. As a result, the heat storage material 3021 is filled such that: in the main member 3012 adjacent to the lid member 3046 where the filling is started, it branches from the center of the heat storage material filling spaces 3022 into all of the diverging sections 3037, and travels toward the outside; then passes through the respective heat storage material filling space communication holes 3041 of the first separator 3039 immediately adjacent to this main member 3012, into the main member 3012 immediately adjacent to this first separator 3039, and travels toward the inside of all of the diverging sections 3037 of the heat storage material filling spaces 3022, and merges at the center; then passes through the heat storage material filling space communication hole 3045 of the second separator 3043 immediately adjacent to this main member 3012, into the main member 3012 immediately adjacent to this second separator 3043, and branches from the center of the heat storage material filling spaces 3022 into all of the diverging sections 3037 and travels toward the outside; and then passes through the respective heat storage material filling space communication holes 3041 of the first separator 3039 immediately adjacent to this main member 3012, into the main member 3012 immediately adjacent to this first separator 3039, and travels toward the inside of all of the diverging sections 3037 of the heat storage material filling spaces 3022, and merges at the center. At this time, air is vented from the heat storage material filling openings 3053 of the other lid member 3046 immediately adjacent to this main member 3012. Then, after the heat storage material 3021 is filled, the stopper members 3055 are driven into the respective heat storage material filling port sections 3049 in order to close off the respective heat storage material filling openings 3053. Then, the filled heat storage material 3021 is solidified to form the heat storage unit 3011.

For such a heat storage material 3011, a fluid introduced from the fluid circulation opening 3052 of the fluid circulation port section 3048 of the one lid member 3046, is diverged into the plurality of fluid passage communication holes 3050 of this lid member 3046, and flows into the plurality of fluid passages 3019 of the main member 3012 adjacent to this lid member 3046. After it travels through the respective fluid passages 3019 toward the outside of the spiral, it passes through the fluid passage communication holes 3040 of the first separator 3039 immediately adjacent to this main member 3012, and travels through the respective fluid passages 3019 of the next main member 3012 adjacent to this first separator 3039 toward the center side of the spiral. It then passes through the fluid passage communication holes 3044 of the second separator 3043 immediately adjacent to this main member 3012, and travel through the respective fluid passages 3019 of the next main member 3012 adjacent to this second separator 3043 toward the outside of the spiral. After that, it passes through the fluid passage communication holes 3040 of the first separator 3039 adjacent to this main member 3012, and travels through the respective fluid passages 3019 of the next main member 3012 adjacent to this first separator 3039 towards the center side of the spiral. Then after it passes through the plurality of fluid passage communication holes 3050 of the other lid member 3046 immediately adjacent to this main member 3012, it is merged at the fluid circulation opening 3052 of the fluid circulation port section 3048 of this lid member 3046 and delivered to the outside.

According to the above embodiment, the outer wall sections 3016, the fluid passage formation sections 3020 which form the fluid passages 3019 for circulating a heat containing fluid, on the inside of the outer wall sections 3016, and the heat storage material filling space formation sections 3023 which form the heat storage material filling spaces 3022 for filling with heat storage material 3021, adjacent to the fluid passages 3019, on the inside of the outer wall sections 3016, are integrally formed in order to form the main member 3012. Thereafter, all that is necessary is to connect between the pairs of main members 3012 via the first separators 3039, to connect sets of such pair of main members 12 and first separator 3039 to each other via the second separators 3043, and to connect the pair of lid members 3046 to the front side of the main member 3012 at the front end and to the rear side of the main member 3012 at the rear end, and fill the heat storage material 3031 into the heat storage material filling spaces 3022.

Therefore, compared to an arrangement where heat storage material is enclosed in the envelope to form the heat reservoir, and a crevice which becomes the fluid passage is formed with spacers intervening and this heat reservoir is wrapped around the core in a spiral shape, the number of parts is reduced and manufacture is simplified. Furthermore, the outer wall sections 3016 of the main members 3012, the fluid passage formation sections 3020, and the heat storage material filling space formation sections 3023 are integrally formed so that the core becomes unnecessary, and the fluid passages 3019 and the heat storage sections can thus be enlarged by that amount.

Therefore, the number of parts can be reduced. Moreover, manufacture is simplified, manufacturing cost can be reduced, heat storage capacity can be amply maintained and high performance can be attained.

Moreover, in the main members 3012, in addition to the abovementioned outer wall sections 3016, the fluid passage formation sections 3020, and the heat storage material filling space formation sections 3023, the heat insulating space formation sections 2018 which form the heat insulating spaces 3017 where the heat insulators 3086 are arranged or which are to be spaces, are further integrally formed. Consequently the number of parts is reduced and manufacture is simplified.

Therefore, even in the case where the heat insulating space formation sections 3018 are provided, the number of parts can be reduced. Moreover manufacture is simplified, and manufacturing cost can be reduced.

Furthermore, in the pair of lid members 3046, the fluid circulation port sections 3048 which form the fluid circulation openings 3052 which communicate with the fluid passages 3019 are integrally formed. Consequently; for the parts of the fluid circulation port sections 3048 which communicate with the fluid passages 3019, the number of parts is reduced and manufacture is simplified.

Therefore, even in the case where the fluid circulation port sections 3048 are provided, the number of parts can be reduced. Moreover, manufacture is simplified, and manufacturing cost can be reduced.

In addition, in the pair of lid members 3046, the heat storage material filling port sections 3049 which form the heat storage material filling openings 3053 which communicate with the heat storage material filling spaces 3022 are integrally formed. Consequently; for the parts of the heat storage material filling port sections 3049 which communicate with the heat storage material filling spaces 3022, the number of parts is reduced and manufacture is simplified.

Therefore, even in the case where the heat storage material filling port sections 3049 are provided, the number of parts can be reduced. Moreover, manufacture is simplified, and manufacturing cost can be reduced.

In addition, in the first separator 3039 and the second separator 3043, the fluid passage communication holes 3040 and 3044 which communicate between the fluid passages 3019 of the main members 3012 adjacent to each other are formed. Consequently, a fluid which is introduced from the one fluid circulation port section 3048 and delivered from the other fluid circulation port section 3048, can be passed to the fluid passages 3019 of all of the main members 3012.

Furthermore, in the first separator 3039 and the second separator 3043, the heat storage material filling space communication holes 3041 and 3045 which communicate between the heat storage material filling spaces 3022 of the main members 3012 adjacent to each other, are formed. Therefore, the heat storage material can be filled into the heat storage material filling spaces 3022 of all of the main members 3021 adjacent to each other at one time.

Therefore, the heat storage material 3021 can be easily filled. Moreover, in the case where a latent heat storage material is used for the heat storage material 3021, when a phase change is generated in the heat storage material 3021, the crystallization spreads out in both of the heat storage material filling spaces 3022 of all of the main members 3012. Therefore, the supercooling phenomenon is unlikely to occur.

Furthermore, the fluid passages 3019 and the heat storage material filling spaces 3022 are respectively multiple spiral shaped. Therefore, the heat transfer area of the heat storage material 3021 can be enlarged and the fluid passage resistance can be kept small., while keeping a small number of windings of the fluid passages 3019 and the heat storage material filling spaces 3022.

In addition, since all of the main members 3012 are identically-shaped, a mold for integrated formation can be shared by the respective main members 3012.

Therefore, mold depreciation can be reduced.

Furthermore, since the main members 3012 are formed by injection molding or extrusion molding, the main members 3012 can be formed easily and are resistant to heat contraction.

In the above, the case was explained as an example where, in a condition with the lid member 3046, the main member 3012, the first separator 3039, the main member 3012, the second separator 3043, the main member 3012, the first separator 3039, the main member 3012 and the lid member 3046 sequentially laminated, these are integrated. However as long as there are at least two main members 3012, these may be integrated in a condition for example with the lid member 3046, the main member 3012, the first separator 3039, the main member 3012 and the lid member 3046 sequentially laminated.

Figure 16:
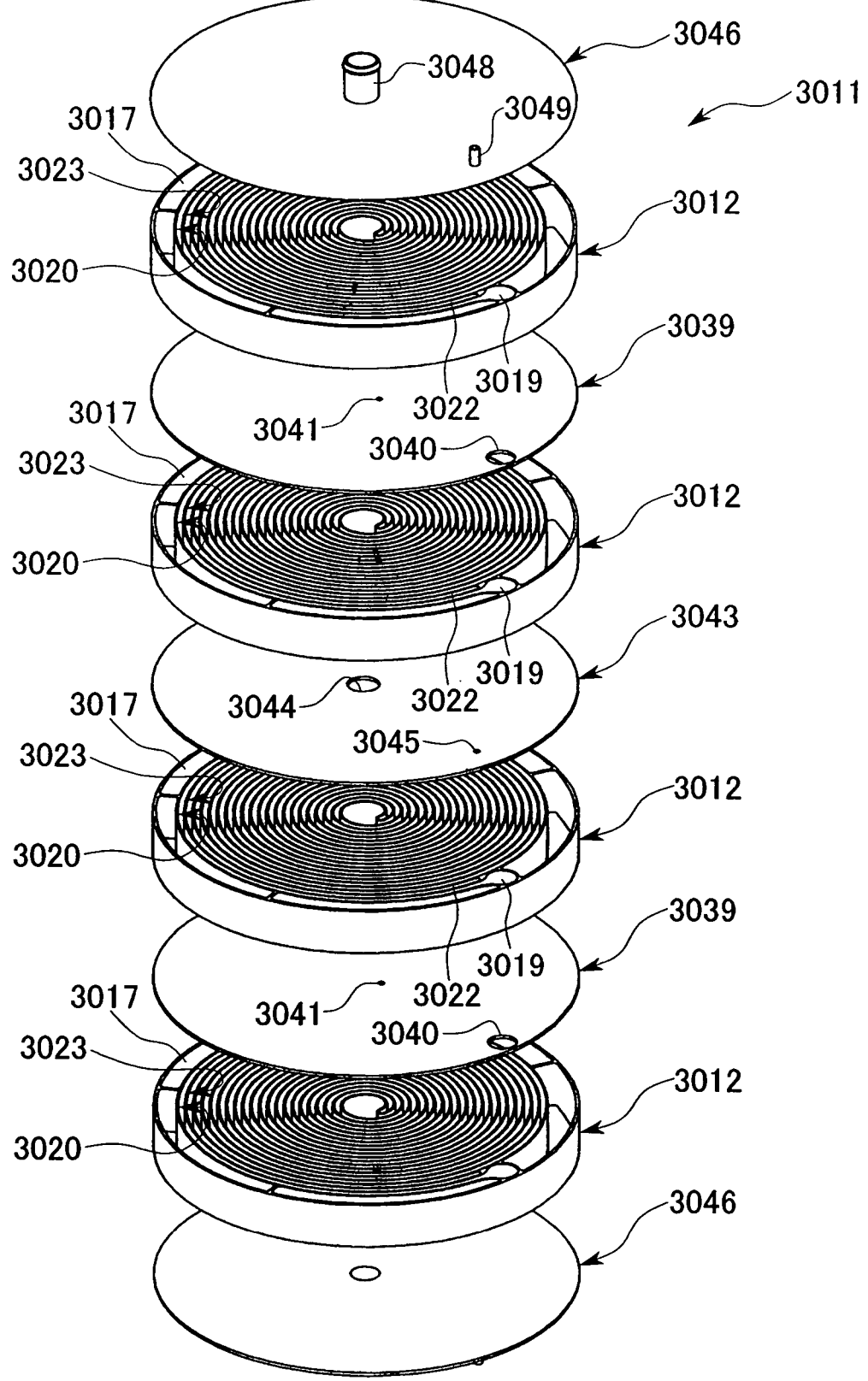
FIG. 16 is an exploded perspective view showing a modified example of the heat storage unit of the third aspect of the present invention.

Moreover, in the above, the case was explained as an example where the lid members 3046, the main members 3012, the first separator 3039, and the second separator 3043 are polygonal shaped. However, it is also possible to form these in a circular shape as shown in FIG. 16.

In addition, in the above, the case was explained as an example where the main member 3012 has the multi spiral shaped heat storage material filling space formation section 3023 and the multi spiral shaped fluid passage formation section 3020 so that it has the multi spiral shaped heat storage material filling space 3022 and the multi spiral shaped fluid passage 3019. However, as shown in FIG. 16, a configuration is possible where the main member 3012 has a single spiral shaped heat storage material filling space formation section 3023 and a single spiral shaped fluid passage formation section 3020 so that it has a single spiral shaped heat storage material filling space 3022 and a single spiral shaped fluid passage 3019. In this case, in the lid member 3046, the heat storage material filling port section 3049 is integrally formed in order to communicate with the outer end section of the spiral of the heat storage material filling space 3022. Moreover, in the first separator 3039, the fluid passage communication hole 3040 is formed in order to communicate with the outer end section of the spiral of the fluid passage 3019, and the heat storage material filling space communication hole 3041 is formed in order to communicate with the inner end section of the spiral of the heat storage material filling space 3022. Furthermore, in the second separator 3043, the fluid passage communication hole 3044 is formed in order to communicate with the inner end section of the spiral of the fluid passage 3019, and the heat storage material filling space communication hole 3045 is formed in order to communicate with the outer end section of the spiral of the heat storage material filling space 3022.

Hereunder is a description of an embodiment in a fourth aspect of the present invention, with reference to the drawings.

Figure 17:
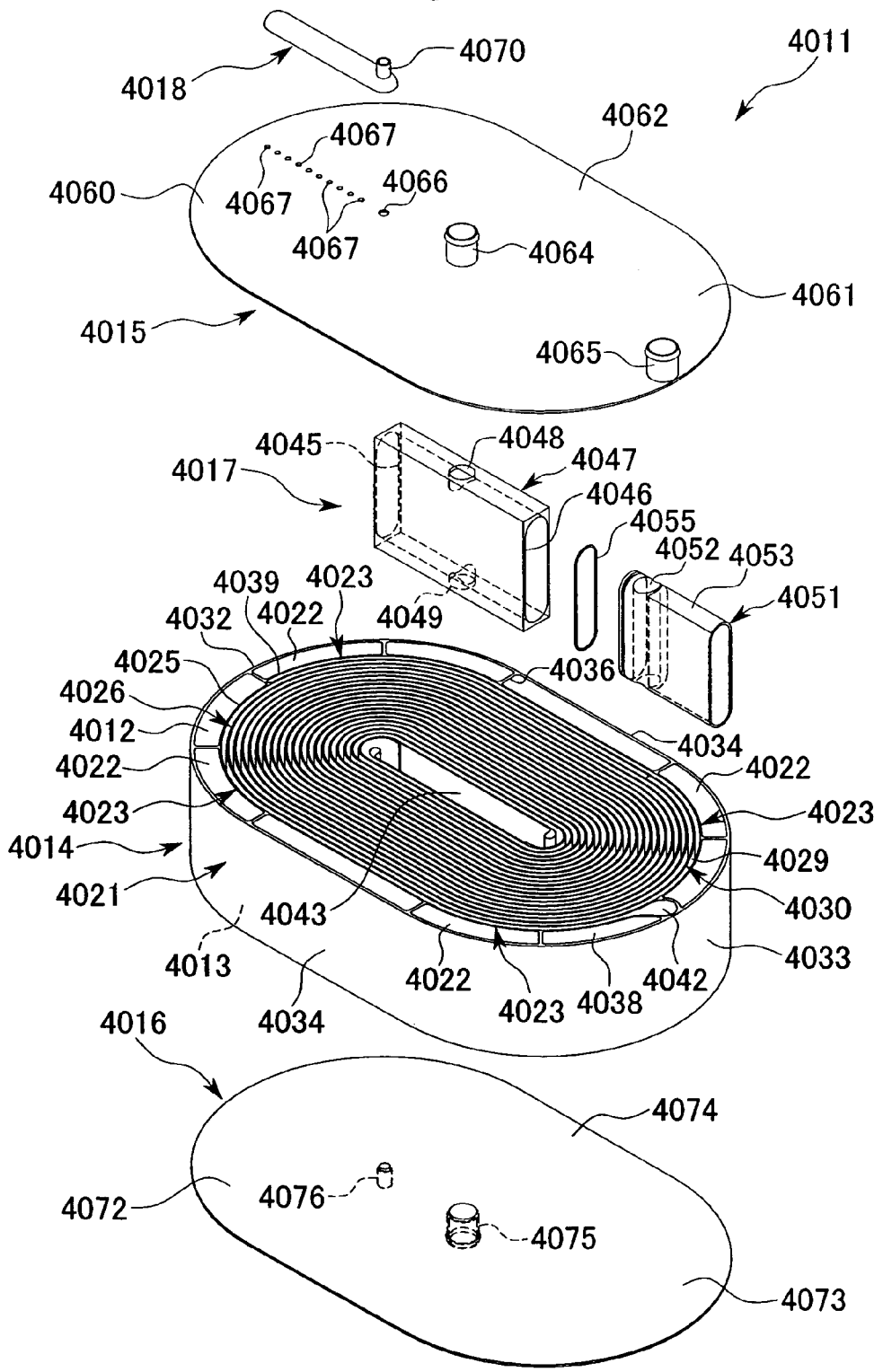
FIG. 17 is an exploded perspective view showing an overall configuration of a heat storage unit of the fourth aspect of the present invention with the heat storage material removed.
Figure 18:
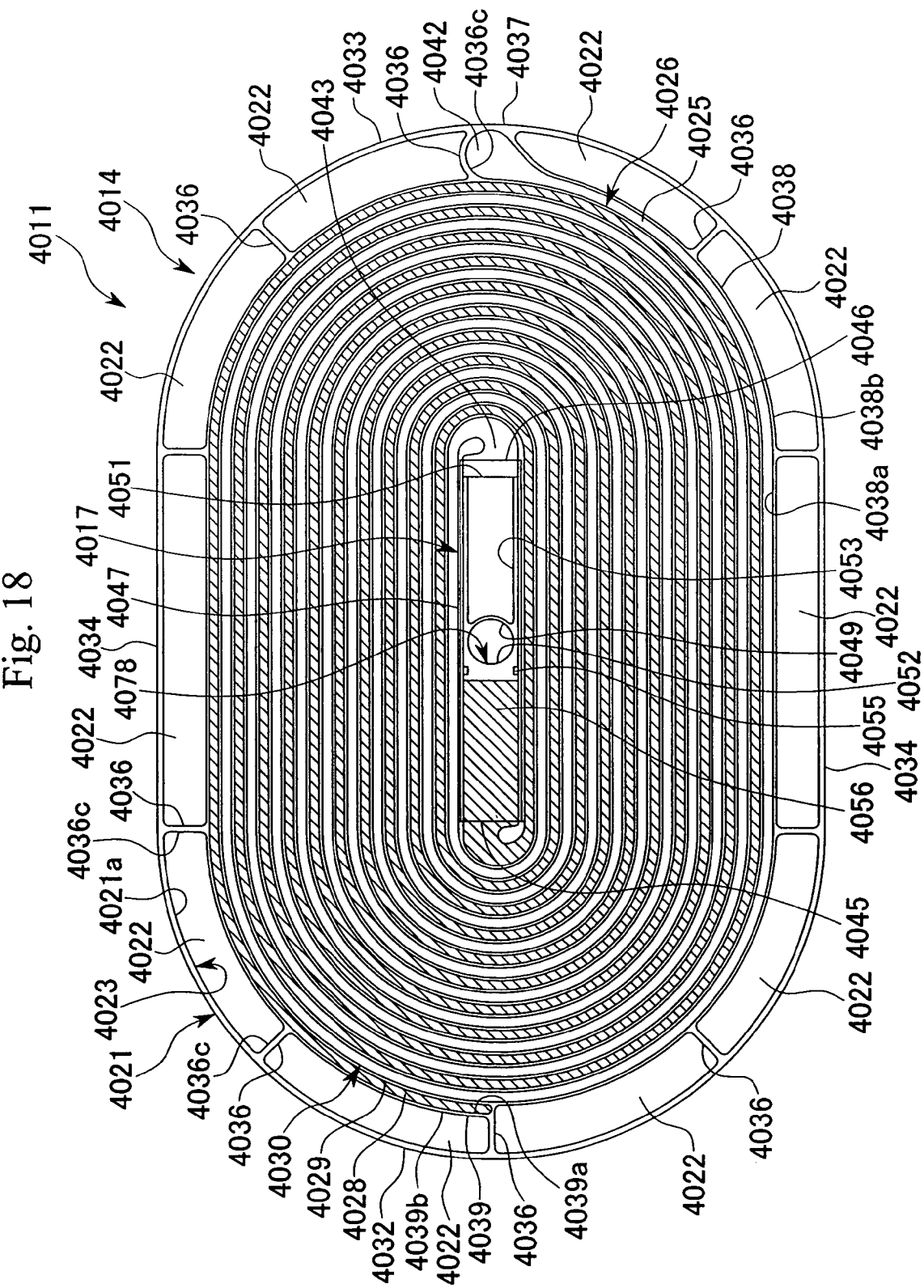
FIG. 18 is a plan cross-sectional view showing the heat storage unit of the fourth aspect of the present invention, showing one condition of a slider unit.
Figure 19:
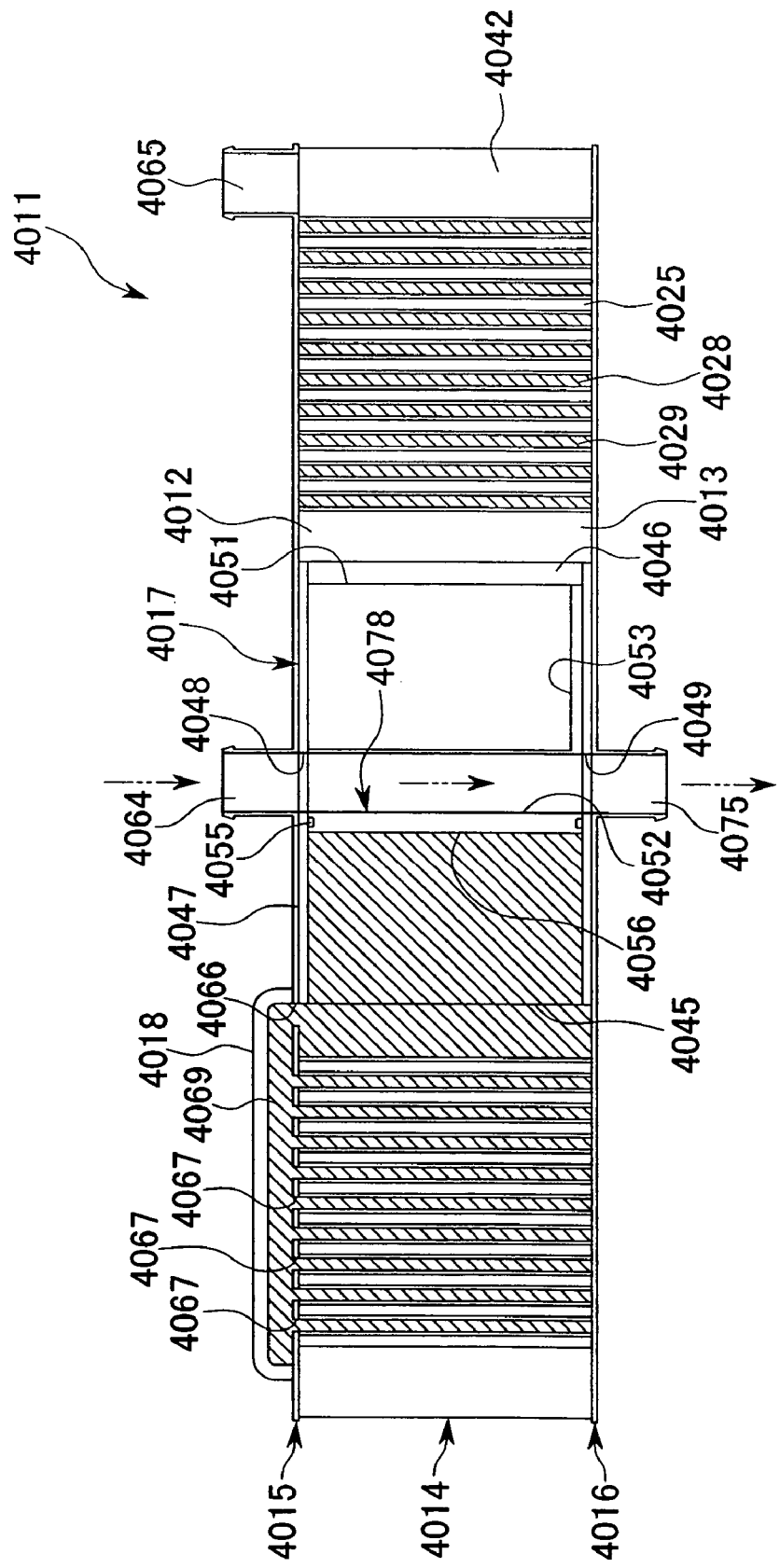
FIG. 19 is an elevation cross-sectional view showing the heat storage unit of the fourth aspect of the present invention, showing one condition of the slider unit.

A heat storage unit 4011 of this embodiment, as shown in FIG. 17 to FIG. 19, has a main member 4014 which is provided with openings 4012 and 4013 at both ends, a pair of lid members 4015 and 4016 which are installed on the opening 4012 and 4013 sides at both ends of the main member 4014, a slider unit (passage switching section) 4017 which is fitted into the center of the main member 4014, and a bridge member 4018 which is fitted to one lid member 4015.

The main member 4014 is provided with: a cylindrical housing 4021, a heat insulating space formation section 4023 which forms a heat insulating space 4022 for preventing radiation of heat, on the inside of the housing 4021, a fluid passage formation section 4026 which forms a fluid passage 4025 for circulating a heat containing fluid, on the inside of the heat insulating space 4022, and a heat storage material filling space formation section 4030 which forms a heat storage material filling space 4029 for filling with heat storage material 4028, adjacent to the fluid passage 4025 on the inside of the heat insulating space 4022.

That is to say, the main member 4014 has, as shown in FIG. 18: an oblong housing 4021 where grinding planes of a pair of semi cylindrical sections 4032 and 4033 where cylinders are cut by planes through the central axis, are connected by a pair of flat plate sections 4034 to each other; a plurality of wall sections 4036 which extend from an inner surface 4021a of the housing 4021 to the inside; a wall section 4038 which is shaped to extend from an extension starting position 4037 of the one semi cylindrical section 4033 of the housing 4021 which is the most separated from the other semi cylindrical section 4032, approximately along the inner surface 4021a of the housing 4021 in an oblong spiral shape (oblong helix) so that the circular arcs have gradually reducing radii of curvature; and a wall section 4039 which extends from an intermediate extension starting position of the wall section 4036 of the other semi cylindrical section 4032 which is in the most separated position from the one semi cylindrical section 4033, in a similar spiral shape at a predetermined spacing with an outer surface 4038b of the wall section 4038. The wall section 4038 and the wall section 4039 are double spiral shaped.

Here, to the wall section 4038 is connected the inner end sections of wall sections 4036, which are between the extension starting side on the extension side of the wall section 4038 from the extension starting position 4037 at the semicircular part of the extension starting side, to the position most separated from the extension starting position. Moreover, to the wall section 4039, is connected the remaining inner end sections of the wall sections 4036, at the outermost semicircular part. Furthermore, the inner end section of the wall section 4038 is positioned near the axis of the semicircular section 4032 on the opposite side to the semicircular section 4033 with the extension starting position 4037, and the inner end section of the wall section 4039 is positioned near the axis of the semicircular section 4033 on the opposite side.

Moreover, a heat insulating space formation section 4023 is configured by, a part on the inner surface side including the inner surface 4021a of the housing 4021, a part on the side surface 4036c side including the side surfaces 4036c corresponding to the respective wall sections 4036, and a part on the outer surface side 4038b including the outer surface 4038b connected to the wall section 4036 of the wall section 4038, or a part on the outer surface side 4039b including the outer surface 4039b connected to the wall section 4036 of the wall section 4039. Inside of the heat insulating space formation section 4023, a heat insulating space 4022 for preventing radiation of heat is formed. In the heat insulating space 4022, a heat insulator such as urethane is to be filled. However, even if the heat insulating space 4022 is not filled with anything and left as a space, an air layer of this space prevents the radiation of heat. Polish treatment may be applied to the heat insulating space formation section 4023 in order to further increase the thermal insulation performance. Here, in some cases, in the main member 4014, the heat insulating space 1017 and the heat insulating space formation section 1018 are not formed.

Moreover, mainly, the fluid passage formation section 4026 is configured by, a part on the inner surface 4038a side including the inner surface 4038a of the wall section 4038, a part on the outer surface 4039a side including the outer surface 4039a of the wall section 4039 opposing to this inner surface 4038a, and the side surface 4036c on the wall section 4038 side of the wall section 4036 which is adjacent to the extension starting position of the wall section 4038. As a result, this fluid passage formation section 4026 is an oblong spiral shape. Moreover, the inside of this fluid passage formation section 4026 becomes a spiral shaped fluid passage 4025 for circulating a heat containing fluid. The fluid passage 4025 has an approximately fixed width except for its both ends, and the outer end section becomes wider in an approximate cylindrical shape and becomes a communication port 4042.

In addition, mainly, the heat storage material filling space formation section 4030 is configured by, a part on the inner surface 4039a side including the inner surface 4039a of the wall section 4039, and a part on the outer surface 4038b side including outer surface 4038b of a part excluding the semicircular part on the extension starting position side of the wall section 4038. As a result, the heat storage material filling space formation section 4030 is an oblong spiral shape. Then, inside of this heat storage material filling space formation section 4030, the spiral shaped heat storage material filling space 4029 is formed filled with the heat storage material 4028. As a result of the above configuration, the spiral shaped fluid passage 4025 is spiral shaped adjacent to the spiral shaped heat storage material filling space 4029 via the wall section 4038 or the wall section 4039.

Moreover, between a part on the innermost side of the wall section 4038 and a part at the innermost side of the wall section 4039, is formed an oblong containing space 4043.

Here, the main member 4014 formed in the above shape is such that the cross-section orthogonal to a direction linking both opening sections 4012 and 4013 is identically-shaped over the whole length in the direction linking both opening sections 4012 and 4013, and is integrally formed by extrusion molding by extruding material in the direction linking both opening sections 4012 and 4013. That is to say, the housing 4021 of the main member 4014, the heat insulating space formation section 4023, the fluid passage formation section 4026 and the heat storage material filling space formation section 4030 are integrally formed by extrusion molding.

The main member 4014 is comprised of a metal such as aluminum or a synthetic resin such as polypropylene, polyamide, polyacetal, polyethylene terephthalate, and polyethylene which are suitable for extrusion molding.

Here, the main member 4014 may be formed by any method as long as the housing 4021, the heat insulating space formation section 4023, the fluid passage formation section 4026 and the heat storage material filling space formation section 4030 are integrally formed. For example, it may be formed by injection molding of a synthetic resin, grinding of a metal such as aluminum, casting of a metal such as aluminum, sintering of a ceramic or the like. However, since the main member 4012 is formed such that the cross-section orthogonal to the direction linking both openings 4012 and 4013, is identically-shaped at any position, it is more preferable to form by extrusion molding from the viewpoint of improving production efficiency, and low cost. This also applies in the case where the heat insulating space formation section 4023 is not formed.

The fluid passage formation section 4026 and the heat storage material filling space formation section 4030 may be any shape as long as they are a circulating shape. Besides the spiral shape which circulates in a circular arc form, for example, these may be shaped for circulating in a zigzag form, or shaped for circulating while meandering at random.

Figure 20:
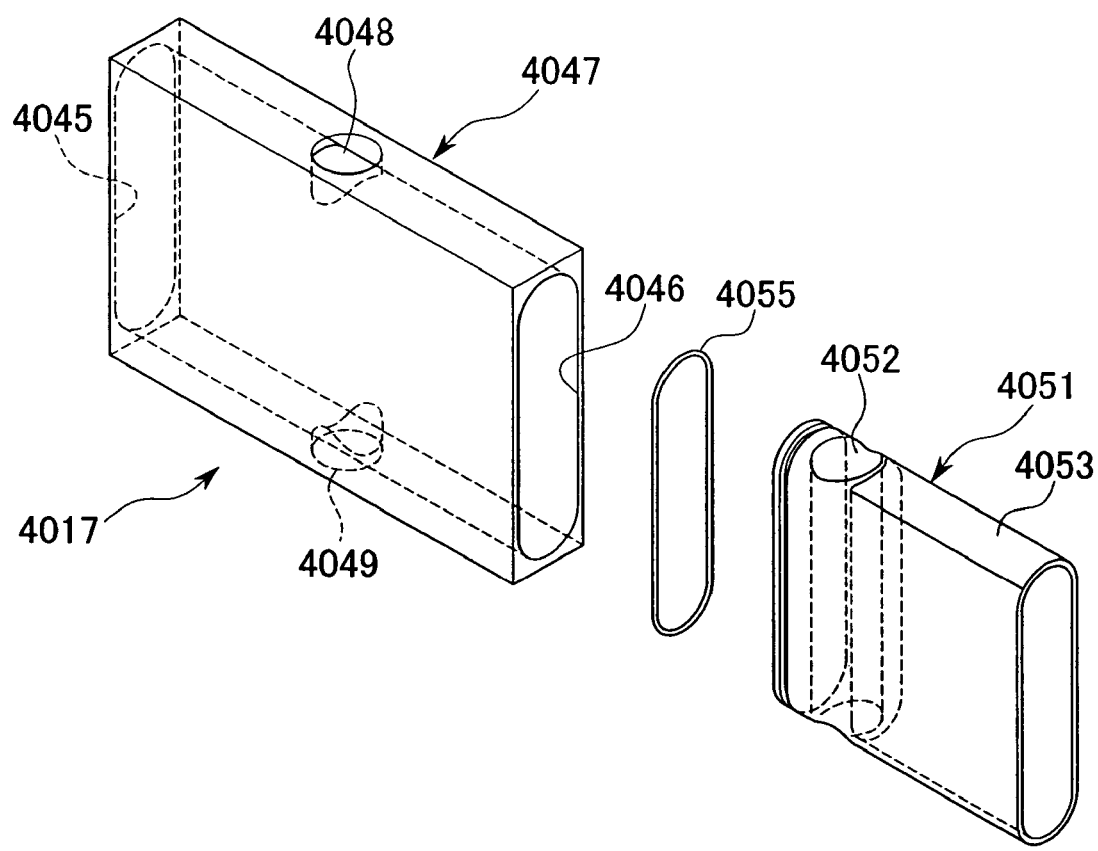
FIG. 20 is an exploded perspective view showing the slider unit used for the heat storage unit of the fourth aspect of the present invention.

In the oblong storage containing space 4043 of the main member 4014, is fitted a slider unit 4017 of a different shape. This slider unit 4017, as shown in FIG. 20, has a cylindrical guide member 4047 with openings 4045 and 4046 formed at both ends. In this guide member 4047, in the central position in the direction linking both openings 4045 and 4046, a pair of the circular cross-section hole sections 4048 and 4049 are formed on the same axis orthogonal to the direction linking both openings 4045 and 4046.

Moreover, the slider unit 4017 has a slider (travelling member) 4051 which is inserted and fitted so as to be slidable in the direction linking both openings 4045 and 4046. In this slider 4051, on the one end side in the slide direction, a communicating hole 4052 is formed straight through to enable communication of the pair of hole sections 4048 and 4049 of the guide member 4037 with each other, and has the same diameter as these hole sections 4048 and 4049. On the other end side in the slide direction, an L-shaped communicating hole 4053 is formed to enable communication with one hole section 4048, but not allow communication with the other hole section 4049, and to open to the opposite side with respect to the communicating hole 4052. The hole section 4048 side of this communicating hole 4053 is slot shaped long in the slide direction of the slider 4051. On the end surface 4056 side of the slider 4051 which becomes the opposite side to the communicating hole 4053 of the communicating hole 4052, a seal ring 4055 for sealing the gap between the guide member 4047 is fitted.

This slider unit 4017 also, at least the guide member 4047, is formed by a similar material to the main member 4014.

Then, in a condition with the slider 4051 fitted with the seal ring 4055 and inserted into the guide member 4047, the slider unit 4017 is fitted into the containing space 4043 of the main member 4014. At this time, regarding the slide unit 4047, as shown in FIG. 18 and FIG. 19, the end surface 4056 side of the slider 4051 is arranged on the internal end section side of the wall section 4038, and the communicating hole 4053 side is arranged on the internal end section side of the wall section 4039. As a result, a space surrounded by the end surface 4056 of the slider 4051 and the opening section 4045 side of the guide member 4047, constitutes the inner end section of the above mentioned spiral heat storage material filling space 4029 (in other word, the end surface 4056 of the slider 4051 constitutes the heat storage material filling space 4029). Conversely, a space surrounded by the communicating hole 4053 of the slider 4051 and the inner circular surface on the opening section 4046 side of the guide member 4047, constitutes the inner end section of the above mentioned spiral fluid passage 4025.

Here, the abovementioned heat storage material filling space 4029 continues from the outer end section to the inner end section in the slider unit 4017. As a result, the heat storage material 4028 to be filled into this heat storage material filling space 4029 becomes one continuous cell.

The heat storage material 4028 to be filled into this heat storage material filling space 4029 is, for example, a PCM (Phase Change Material), specifically, a sugar alcohol system such as erythritol, a paraffin system such as n-Tetratriacontane, or a salt hydrate such as $Mg(NO_3)\text{-}6H_2O$. Of these, a material where the density of the liquid phase is smaller than that of the solid phase, and furthermore, the volume is increased when the heat is stored and it melts, while the volume is decreased when the heat is irradiated and it solidifies, are used.

The one lid member 4015 is, as shown in FIG. 17, an oblong shape with the grinding planes of a pair of semicircular disc sections 4060 and 4061 that cut the disc by a plane through the central axis, connected by a rectangular flat plate section 4062. In the lid member 4015, an approximately cylindrical inlet 4064 for introducing a fluid from the outside is formed in the center. At a predetermined position on the outer diameter side of the semicircular disc section 4061, an approximately cylindrical outlet 4065 for discharging a fluid outside is formed. Furthermore, on the semicircular disc section 4060 side of the inlet 4064, a communication hole 4066 is formed and on the outside of this head hole 4066, a plurality of communication holes 4067 with smaller diameters than that of this communication hole 4066 arrayed in a line at equal intervals, are formed.

This lid member 4015, in the condition with the inlet 4064 and the outlet 4065 on the opposite side to the main member 4014, is connected to the main member 4014 in order to close off the one end opening section 4012 of the main member 4014. At this time, to the lid member 4015 is joined without any gap, the housing 4021 on the one end opening section 4012 side of the main member 4014, all of the wall section 4036, the wall section 4038 and the wall section 4039, and the guide member 4047 of the slider unit 4017. In addition, in the joined condition, the inlet 4064 of the lid member 4015 is aligned and communicated with the position of the hole section 4048 of the guide member 4047, and the outlet 4065 is aligned and communicated with the outside communication port 42 of the fluid passage 4025. Furthermore, in the joined condition, the large diameter communication hole 4066 of the lid member 4015 is at the wide part on the inner end side of the heat storage material filling space 4029 and opens to the position adjacent to the slider unit 4017. The plurality of communication holes 4067 of small diameter respectively open to each one revolution of the spiral of the heat storage material filling space 4029. The communication hole 4067 at the outermost opens to the outer end section of the heat storage material filling space 4029. This lid member 4015 is comprised of the same material to that of the main member 4014.

Moreover, in order to cover the large diameter communication hole 4066 and the plurality of small diameter communication holes 4067 on the outside, an approximate half cylinder bridge member 4018 is joined to the outside of the lid member 4015 on the inlet 4064 side. This bridge member 4018 forms a casing of a communication space 4069 with the lid member 4015, which communicates between the large diameter communication hole 4066 and the plurality of small diameter communication holes 4067. In the bridge member 4018, only one approximately cylindrical outlet port 4070 which communicates between the communication space 4069 and the outside of the heat storage unit 4011, is formed to coincide with the position of communication hole 4066. This bridge member 4018 is also comprised of the same material to that of the main member 4014.

The other lid member 4016 is, as shown in FIG. 17, an oblong shape with the grinding planes of a pair of semicircular disc sections 4072 and 4073 that cut the disc by a plane through the central axis, connected by a rectangular flat plate section 4074. In the center, an approximately cylindrical outlet 4075 for discharging a fluid to the outside is formed. Moreover, on the semicircular disc section 4072 side of the outlet 4075, an approximately cylindrical introducing port 4076 is formed.

This lid member 4016, in the condition with the outlet 4075 and the introducing port 4076 on the opposite side to the main member 4014, is connected to the main member 4014 in order to close off the other end opening section 4013 of the main member 4014. At this time, to the lid member 4016 is joined without any gap, the housing 4021 on the other end opening section 4013 side of the main member 4014, all of the wall section 4036, the wall section 4038 and the wall section 4039, and the guide member 4047 of the slider unit 4017. In addition, in the joined condition, the outlet 4075 of the lid member 4016 is aligned with the position of the hole section 4049 of the guide member 4047 and communicated therewith, and the introducing port 4076 is aligned with the position of the communication hole 4066 to the wide part on the inner end side of the heat storage material filling space 4029 and opened. This lid member 4016 is comprised of the same material to that of the main member 4014.

In the case where the main member 4014, the lid members 4015 and 4016, the bridge member 4018 and the guide member 4047 are comprised of a metal such as aluminum, they are bonded by, for example, brazing. Moreover, in the case where the main member 4014, the lid members 4015 and 4016, the bridge member 4018 and the guide member 4047 are comprised of a synthetic resin such as polypropylene, polyamide, polyacetal, polyethylene terephthalate, and polyethylene, they are bonded by, for example, ultrasonic welding. Of course, in either case of a metal or a synthetic resin, it is possible to bond by an adhesive.

Figure 21A:
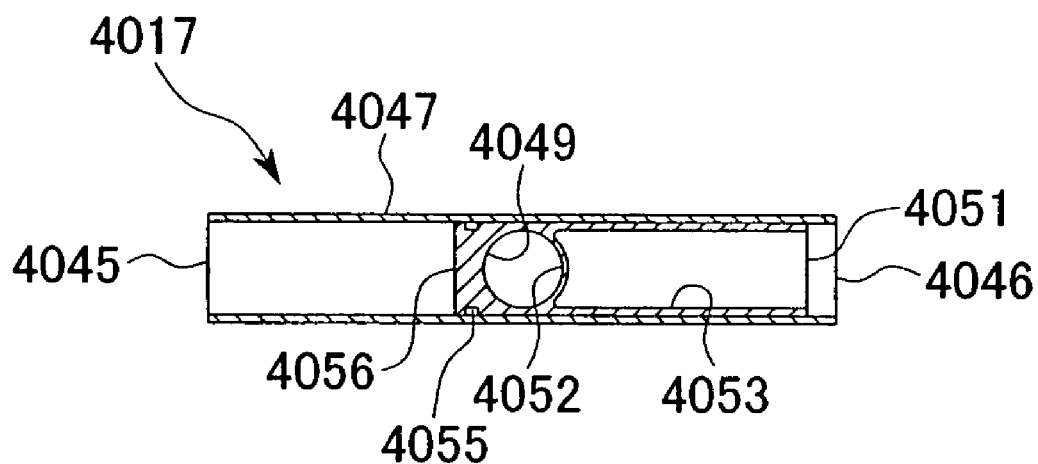
FIG. 21 shows one condition of the slider unit used for the heat storage unit of the fourth aspect of the present invention, (a) being a plan cross-sectional view and (b) being an elevation cross-sectional view.
Figure 21B:
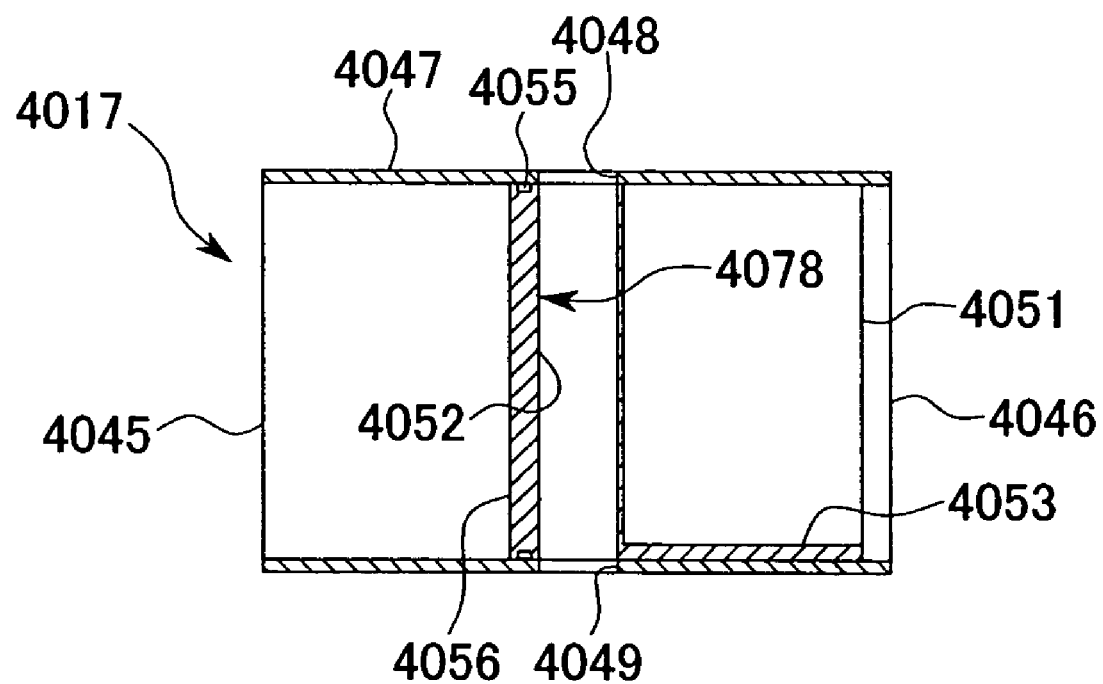

Here, regarding the above heat storage unit 4011, for example, in a condition where the positions of the pair of hole sections 4048 and 4049 and the communication hole 4052 are adjusted by positioning the slider 4051 fitted with the seal ring 4055, on the opening section 4046 side in the guide member 4047 as shown in FIG. 21, the slider unit 4017 is fitted into the containing space 4043 of the main member 4014. Next, the one lid member 4015 is bonded in a positioning condition to the main member 4014 and the guide member 4047 of the slider unit 4017, and the other lid member 4016 is bonded in a positioning condition to the main member 4014 and the guide member 4047 of the slider unit 4017. Furthermore, the bridge member 4018 is bonded to the lid member 4015.

In the condition with the lid members 4015 and 4016, the main member 4014, the guide member 4047, and the bridge member integrated in the above manner, then from the introducing port 4076 of the lower side lid member 4016, the heat storage material 4028 is introduced in a liquid condition. As a results the liquid heat storage material 4028 flows mainly from the inner end side of the heat storage material filling space 4029 to the outer end side and is gradually filled from the lower side to the upper side by the gravity. At this time, the air is adequately vented from the communication hole 4066 and the plurality of communication holes 4067 via the outlet port 4070 to the outside. Finally, the heat storage material 4028 overflows from the communication hole 4066 and the plurality of communication holes 4067 to the communication space 4069 on the inside of the bridge member 4018 and fills this communication space 4069, and then overflows from the outlet port 4070. At this time, the condition becomes such that the heat storage material 4028 is filled into the heat storage material filling space 4029 from between the introducing port 4076 to the outlet port 4070 without any gap, and in this condition, the introducing port 4076 and the outlet port 4070 are sealed by driving a plug or the like (not shown) into them. From the above, the heat storage unit 4011 is completed.

Here, regarding the heat storage material 4028, as mentioned above the volume varies corresponding to the heat storage condition, specifically, the volume is increased when the heat is stored and it melts while the volume is decreased when the heat is irradiated and it solidifies. Therefore, in the condition where, similarly to the above case when filled, the heat storage material 4028 is all in liquid form, that is, the density is the smallest, the slider 4051, as shown in FIG. 21, communicates between the hole section 4048, the communication hole 4051 and the hole section 4049. (it does not communicate between the hole section 4048 and communication hole 4053.) As a result, the heat storage unit 4011 becomes the overall condition shown in FIG. 18 and FIG. 19. The inlet 4046 and the hole section 4048 are communicated with the communication hole 4052, the hole section 4049 and the outlet 4075. Then as shown by two-dot chain line arrow in FIG. 19, a fluid introduced from the inlet 4064 does not pass through, but bypasses the fluid passage 4025 and is discharged to outside of the heat storage unit 4011. At this time, the communication hole 4052, the hole section 4049 and the outlet 4075 constitute a bypass passage 4078.

Figure 22A:
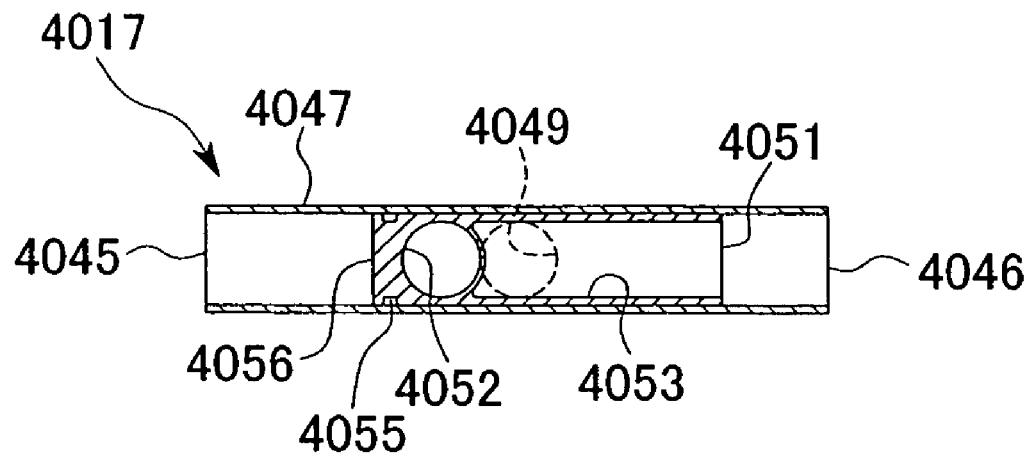
FIG. 22 shows another condition of the slider unit used for the heat storage unit of the fourth aspect of the present invention, (a) being a plan cross-sectional view and (b) being an elevation cross-sectional view.

On the other hand, in the condition where the heat storage material 4028 is partially in solid form, that is, the density is large, the volume is decreased. Therefore, the slider which is arranged so that the end surface 4056 faces to the heat storage material filling space 4049, slightly travels in the direction to decrease the heat storage material filling space 4029. Then, the slider 4051, as shown in FIGS. 22A and B, communicates between the hole section 4048 of the guide member 4047 and the communication hole 4053. (it does not communicate between the hole section 4048 and the communication hole 4052.) As a result, the heat storage unit 4011 becomes the overall condition shown in FIG. 23 and FIG. 24. The inlet 4046 and the hole section 4048 are communicated via the communication hole 4053 with the fluid passage 4052 and the outlet 4065. Then as shown by the two-dot chain line arrow in FIG. 24, a heat containing fluid introduced from the inlet 4064 flows by the fluid passage 4025 along the heat storage material filling space 4029 filled with the heat storage material 4028 and is discharged from the outlet 4065 (at this time, the outlet 4075 is close off).

Figure 25A:
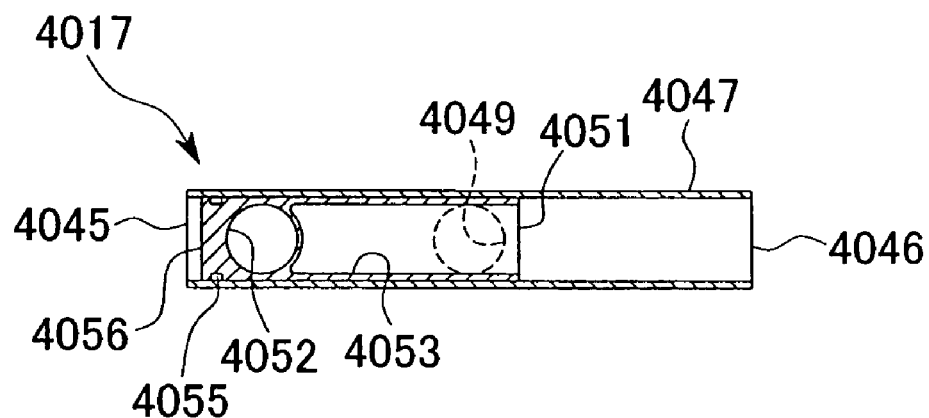
FIG. 25 shows yet another condition of the slider unit used for the heat storage unit of the fourth aspect of the present invention (a) being a plan cross-sectional view and (b) being an elevation cross-sectional view.
Figure 25B:
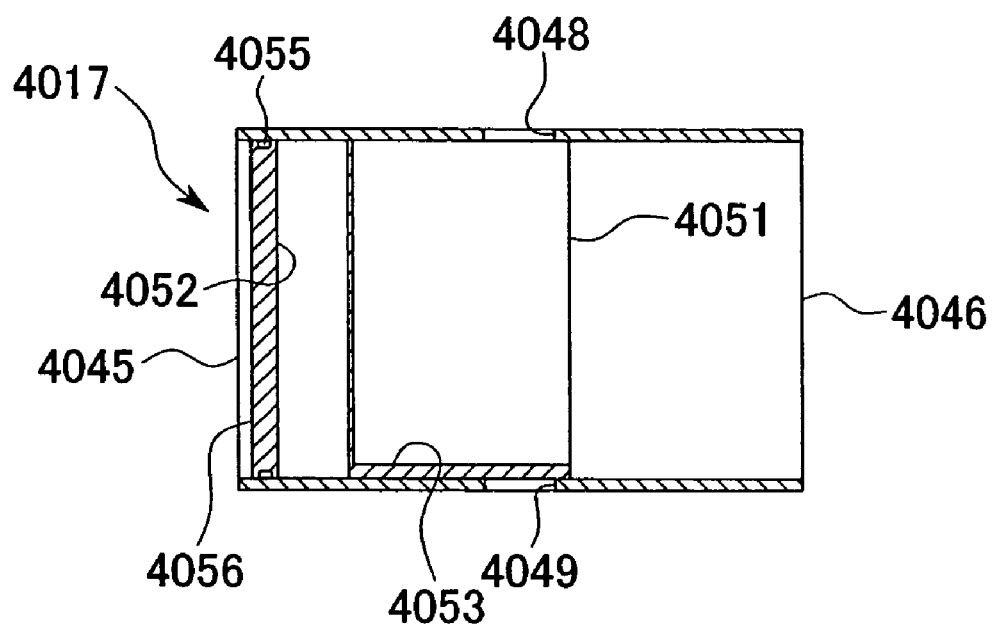

Furthermore, in the condition where the heat storage material 4028 is all in solid form, that is, the density is the largest, the volume is decreased. Therefore, the slider which is arranged so that the end surface 4056 faces to the heat storage material filling space 4049, travels the farthest in the direction to decrease the heat storage material filling space 4029. Even in this condition, since the communication hole 4053 is slot shaped long in the slide direction, the slider 4051, as shown in FIG. 25, communicates between the hole section 4048 of the guide member 4047 and the communication hole 4053 (it does not communicate between the hole section 4048 and the communication hole 4052.) As a result, the heat storage unit 4011 becomes the overall condition shown in FIG. 26 and FIG. 27. The inlet 4046 and the hole section 4048 are communicated via the communication hole 4053 with the fluid passage 4052 and the outlet 4065. Then as shown by two-dot chain line arrow in FIG. 27, a heat containing fluid introduced from the inlet 4064 flows by the fluid passage 4025 along the heat storage material filling space 4029 filled with the heat storage material 4028 and is discharged from the outlet 4065 (at this time, the outlet 4075 is close off). That is to say, the slider unit 4017 selectively switches the flow-in destination of the fluid introduced from the inlet 4064, to the fluid passage 4025 or the bypass passage 4078, according to the position of the slider 4051 which travels due to the volume variation of the heat storage material 4028.

Such a heat storage unit 4011 is provided in the circulation path of a fluid (cooling water) for water cooling an internal combustion engine. The fluid which has passed through the internal combustion engine is introduced from the inlet 4064, and the fluid discharged from the outlet 4065 and the outlet 4075 is returned to the internal combustion engine side.

The operation of the heat storage unit 4011 of the above configuration, is described.

First of all, in the condition where the heat storage unit 4011 is sufficiently warmed by the waste heat generated by the previous operation of the internal combustion engine, the heat storage material 4028 stores the heat and becomes liquid form. As shown in FIG. 18, FIG. 19 and FIG. 21, the condition becomes such that the communication hole 4052 of the slider 4051 of the slider unit 4017 is communicated with the pair of hole sections 4048 and 4049, that is, the condition such that the inlet 4064 is communicated with the bypass passage 4078.

Figure 22B:
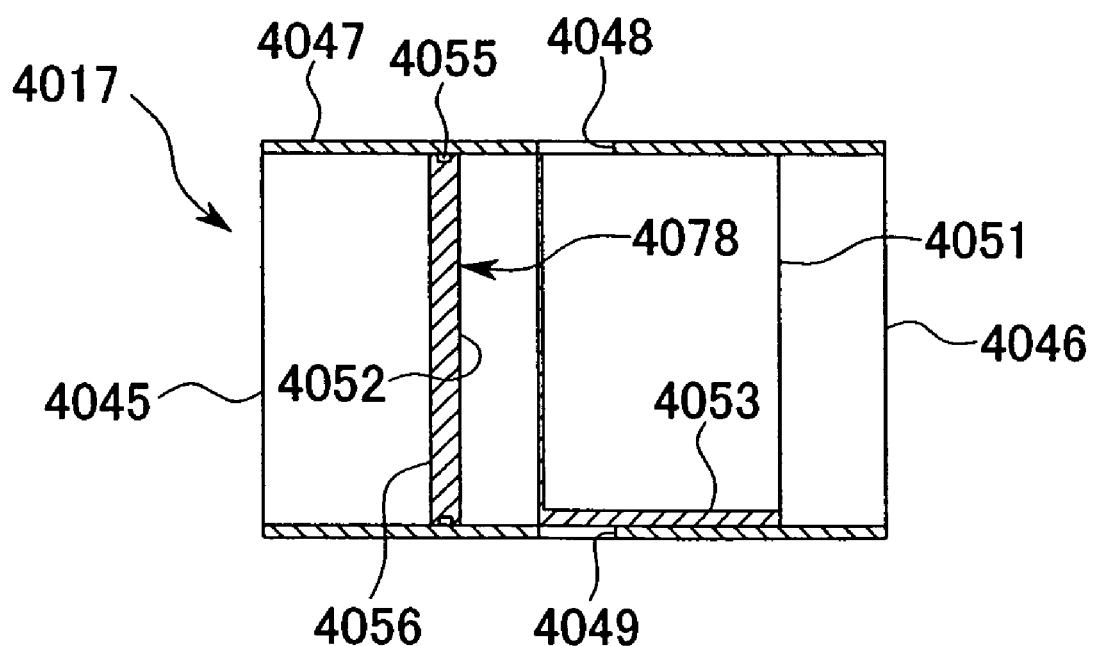
Figure 23:
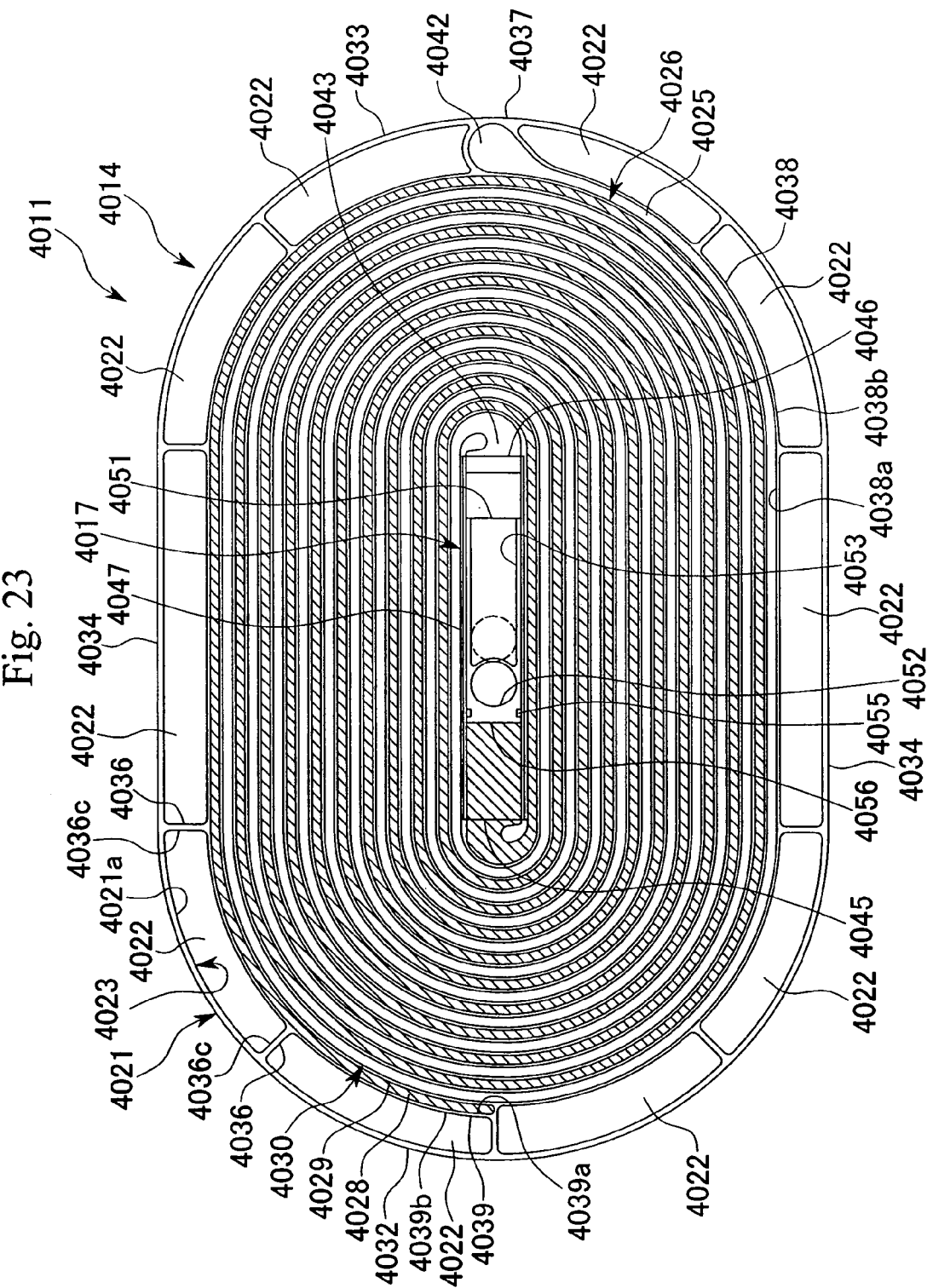
FIG. 23 is a plan cross-sectional view showing the heat storage unit of the fourth aspect of the present invention, showing another condition of the slider unit.
Figure 24:
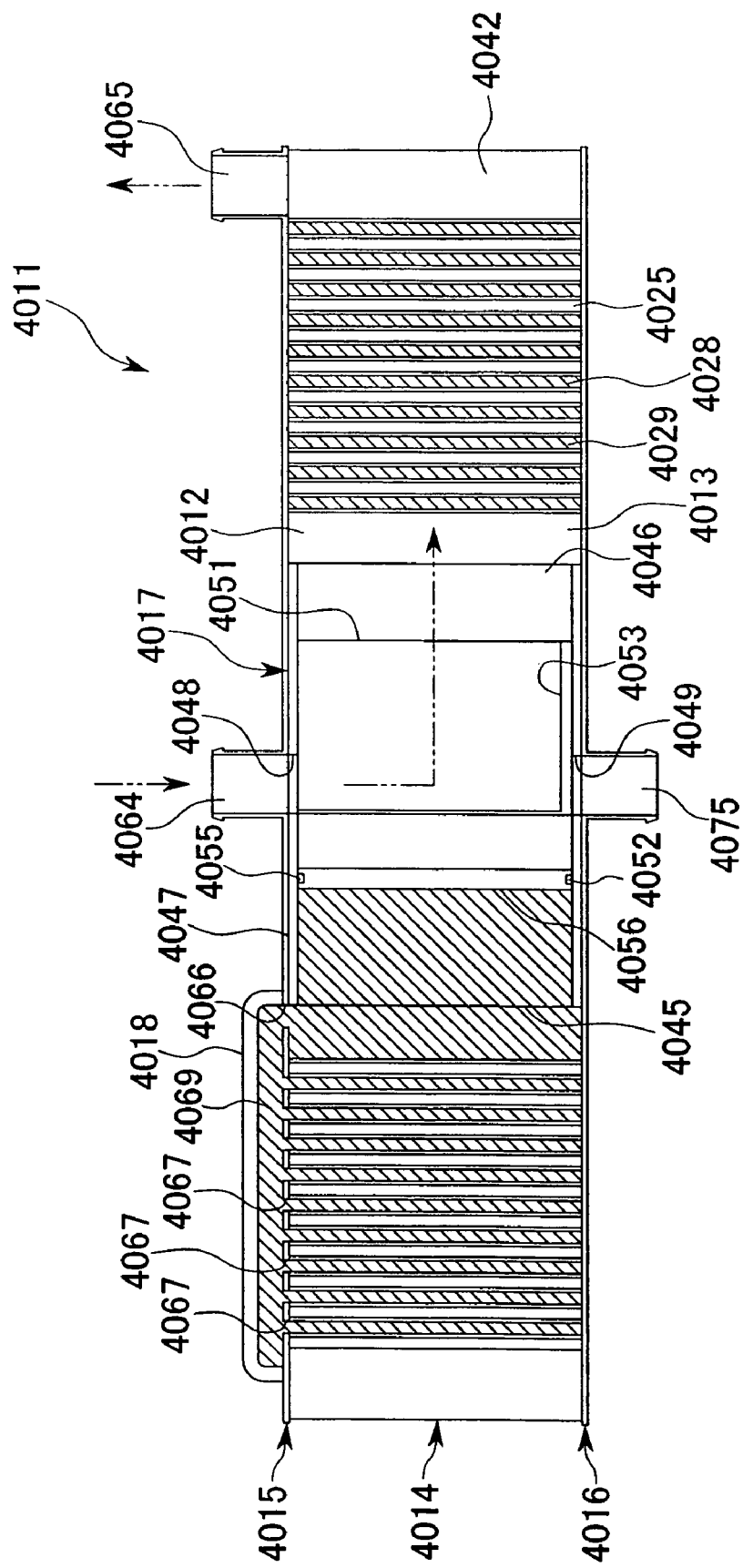
FIG. 24 is an elevation cross-sectional view showing the heat storage unit of the fourth aspect of the present invention, showing another condition of the slider unit.

Then, when the operation of the internal combustion engine is stopped in this condition and a fixed time passes, the heat storage material 4028 is partially solidified and the volume is a little decreased, and as shown in FIG. 22 to FIG. 24, the slider 4051 travels for a predetermined amount to the opening section 4045 side, that is, in the direction to decrease the heat storage material filling space 4029. At this time, the slider 4051 becomes the condition such that the hole section 4048 and the communication hole 4053 are communicated, and the inlet 4064 is communicated via the hole section 4048 and the communication hole 4053 with the fluid passage 4025 and the outlet 4065. That is to say, in the condition where the heat storage material 4028 is at least partially solidified, in the slider unit 4017, the flow-in destination of the fluid introduced from the inlet 4064 is to the fluid passage 4025.

Then, when the internal combustion engine is operated in this condition and the heat containing fluid is introduced to the inlet 4064, the fluid flows via the hole section 4048 and the communication hole 4053 through the fluid passage 4025 in the spiral shape from the inside to the outside. Here it receives heat from the heat storage material 4028 in the heat storage material filling space 4029 which is gradually phase changed from the liquid form into the solid form and radiates heat, so that the temperature rises. In this condition, the heat containing fluid is introduced from the outlet 4064 to the internal combustion engine, and the heat is passed to the cooled internal combustion engine to give good startability.

Figure 26:
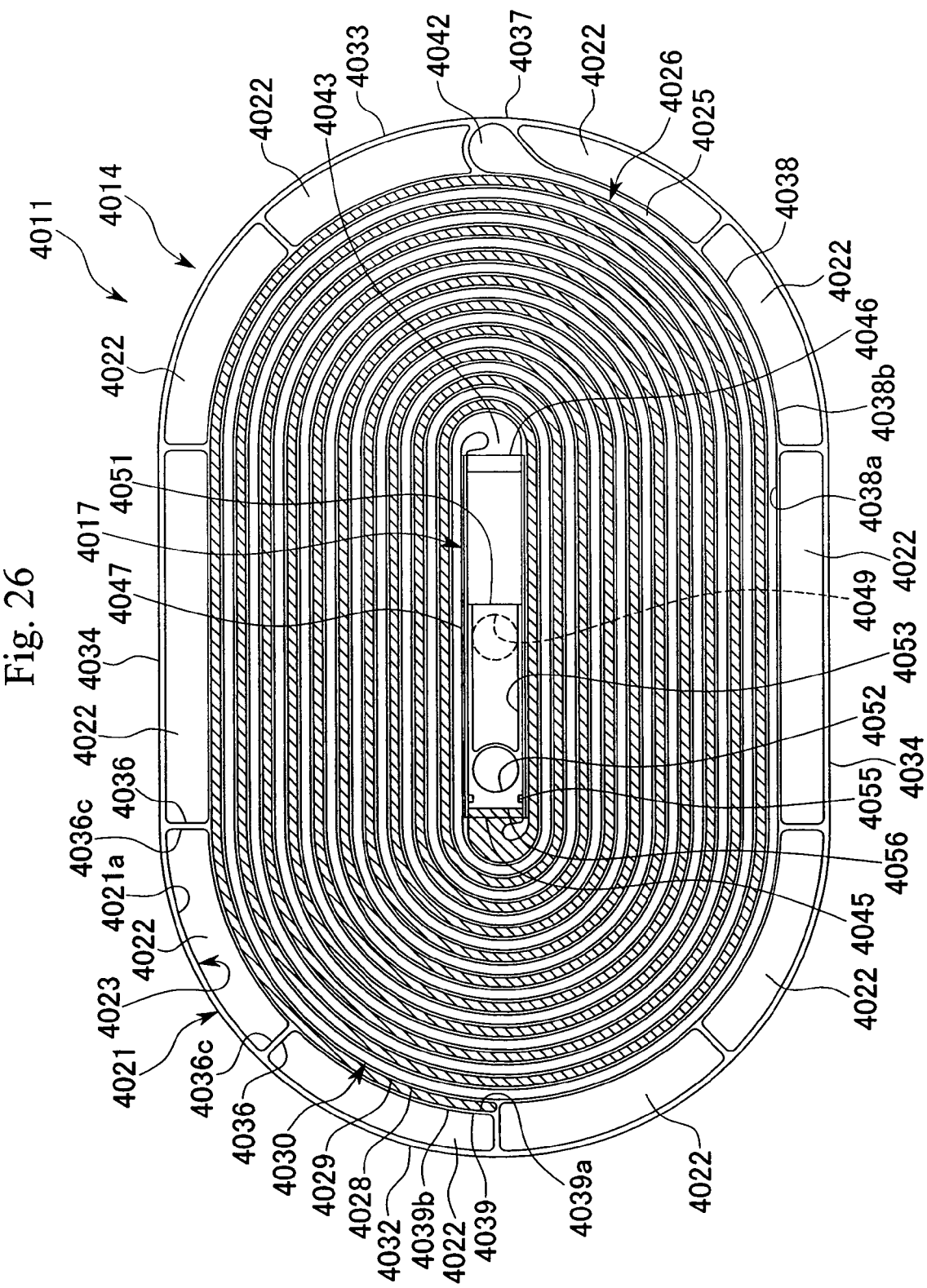
FIG. 26 is a plan cross-sectional view showing the heat storage unit of the fourth aspect of the present invention, showing yet another condition of the slider unit.
Figure 27:
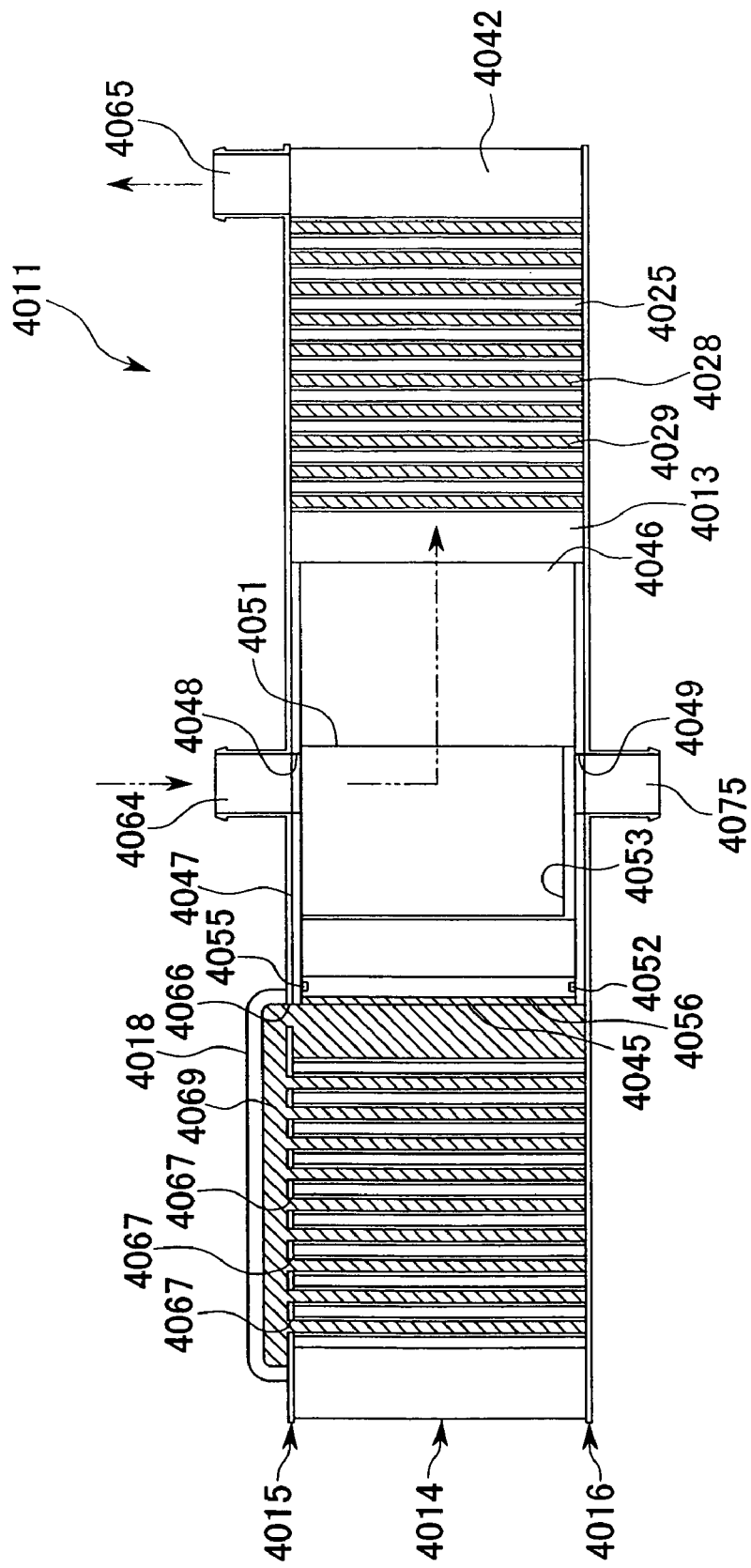
FIG. 27 is an elevation cross-sectional view showing the heat storage unit of the fourth aspect of the present invention, showing yet another condition of the slider unit.

When the heat is radiated as above, the heat storage material 4028 is gradually phase changed from the liquid form into the solid form, and the solid form with the large density is precipitated to the lower section of the heat storage unit 4011 by gravity and the volume is decreased. Consequently, the liquid heat storage material 4028 is aspirated via the communication space 4069 of the bridge member 4018 from the communication hole 4066, and introduced into the plurality of communication holes 4067. As a result, the slider 4051 travels in the direction to decrease the heat storage material filling space 4029. Finally, as shown in FIG. 25 to FIG. 27, it attains the condition where the hole section 4048 is adjusted to near the end section on the opposite side with respect to the communication hole 4052 of the communication hole 4053, and the heat radiation process is terminated.

Subsequently, when the temperature of the internal combustion engine rises and the temperature of the liquid for cooling the engine is sufficiently raised above the melting point of the heat storage material 4028, then in reverse to the above, the heat storage material 4028 is phase changed from the solid form into the liquid form so that heat is stored. At this time, regarding the heat storage material 4028, the density becomes smaller and the volume is increased, congregating to the top of the heat storage unit 4011. Consequently, the liquid heat storage material 4028 which overflows from the plurality of communication holes 4067 congregates via the communication space 4069 of the bridge member 4018 from the communication hole 4066 to the inner end section side of the heat storage material filling space 4029, and the slider 4051 travels in the direction to increase the heat storage material filling space 4029.

Then, when the heat storage material 4028 becomes all liquid form, as shown in FIG. 18, FIG. 19 and FIG. 21, the slider 4051 attains the condition where the pair of hole sections 4048 and 4049 are communicated with the communication hole 4052. The heat containing fluid introduced from the inlet 4064 and the hole section 4048, is then discharged from the communication hole 4052, the hole section 4049 and the outlet 4075, that is, the bypass passage 4078 to the internal combustion engine side. That is to say, in the condition where the heat storage material 4028 is completely melted, then regarding the slider unit 4017, the flow-in destination of the fluid introduced from the inlet 4064 is to the bypass passage 4078. Accordingly, since the fluid does not pass through the spiral shaped fluid passage 4025 with the narrow passage cross-section area, the passage resistance is greatly decreased.

The travel amount of the slider 4051 at this time is set equal to the volume variation of the heat storage material 4028 before and after the phase change. That is, it becomes "the overall slide length of the slider 4051×the cross-section area=mass of heat storage material/(density of heat storage material in the solid condition−density of heat storage material in the liquid condition)."

According to the above embodiment, if the volume of the heat storage material 4028 varies according to the heat storage condition, the slider 4051 which is arranged so that a part faces to the heat storage material filling space 4029 travels so that the volume variation is absorbed. Therefore, it becomes unnecessary to enclose air for absorbing the volume variation of the heat storage material 4028, in heat storage material filling space 4029, and a sufficient amount of heat storage material 4028 can be filled into the heat storage material filling space 4029.

Consequently, the volume variation of the heat storage material 4028 can be absorbed without the accompanying decrease in heat capacity, decrease in heat transfer coefficient, and oxidation and deterioration of the heat storage material 4028 due to the oxygen in the air, so that the heat storage capacity can be adequately maintained and high performance can be attained.

Furthermore, the slide unit 4017 utilizes the travel of the slider 4051 corresponding to the volume variation of this heat storage material 4028. In the condition where at least a part of the heat storage material 4028 solidifies, the flow-in destination of the fluid introduced from the inlet 4064 is to the fluid passage 4025. Therefore, the fluid which receives heat from the heat storage material 4028 in the fluid passage 4025 is discharged to the internal combustion engine side, so that the heat is applied to the internal combustion engine side and the start-up becomes smooth. On the other hand, in the condition where the internal combustion engine side generates heat and the heat storage material 4028 completely melts, the flow-in destination of the fluid introduced from the inlet 4064 is to the bypass passage 4078. Therefore the fluid passes through the bypass passage 4078 to avoid passing through the fluid passage 4025, thereby preventing the occurrence of wasteful passage resistance.

Consequently, components such as a sensor, three way valve, control unit and actuator become unnecessary, and the number of parts and the cost can be greatly reduced.

It is also possible to form the fluid passage formation section 4026 and the heat storage material filling space formation section 4030 into other shapes besides the spiral shape.

Hereunder is a description of an embodiment in the fifth aspect of the present invention, with reference to the drawings.

Figure 28:
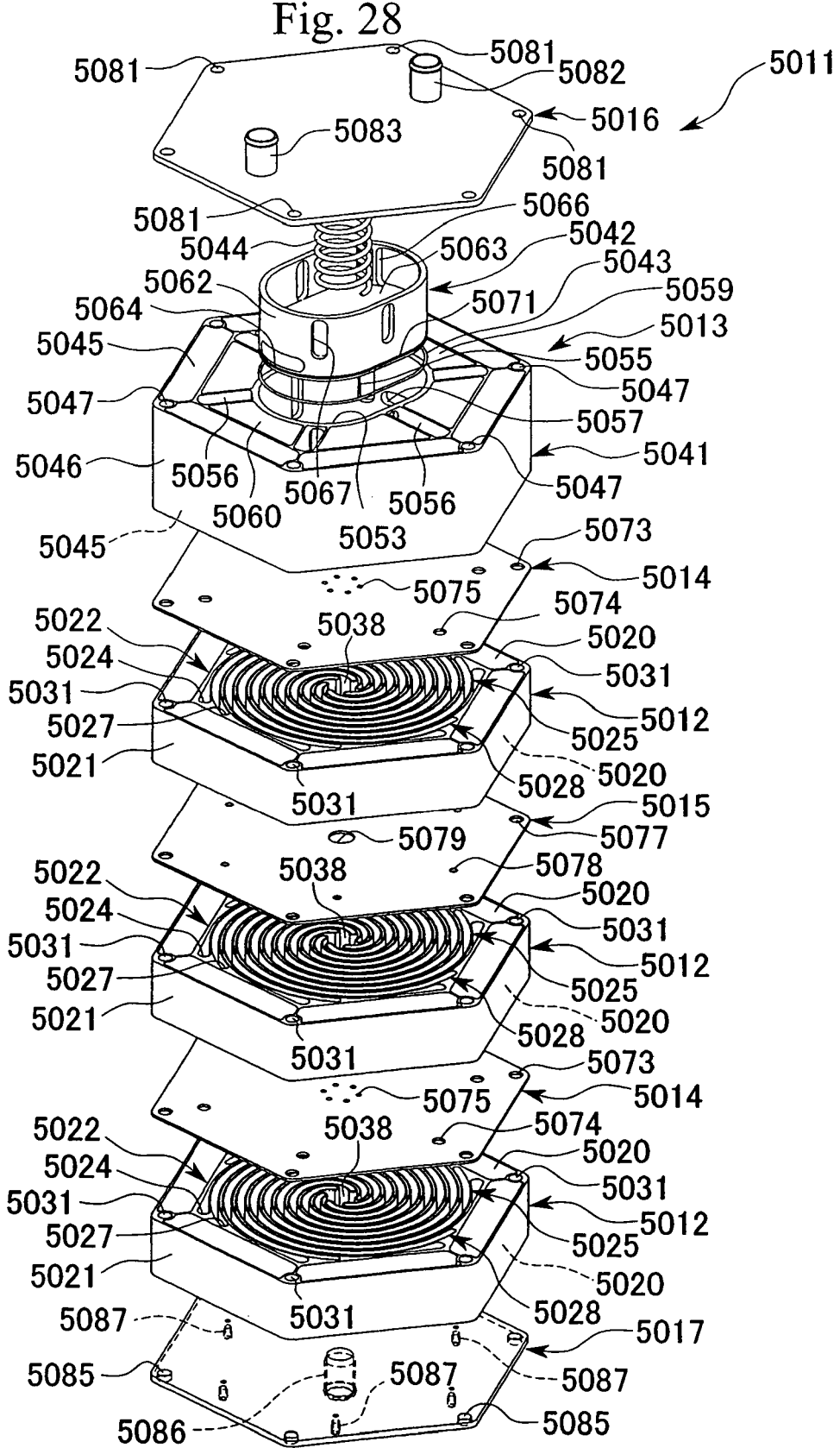
FIG. 28 is an exploded perspective view showing an overall configuration with the heat storage material removed in a heat storage unit of the fifth aspect of the present invention.

A heat storage unit 5011 of the present embodiment, as shown in FIG. 28, has a plurality of, specifically three, main members 5012 which have the appearance of a polygonal cylindrical shape, specifically a hexagonal cylindrical shape, and a slider unit (passage switching section) 5013 which has the appearance of a polygonal cylindrical shape, specifically a hexagonal cylindrical shape. The slider unit 5013 is arranged so as to be stacked on top of the stacked three main members 5012.

The heat storage unit 5011 of the present embodiment has the slider unit 5013, first separators 5014 which are respectively arranged between the slider unit 5013 and the nearest main member 5012 and between a pair of two main members 5012 farthest from the slider unit 5013 and which are polygonal plate shape, specifically hexagonal plate shape, and a second separator 5015 which is arranged between the main member 5012 nearest to the slider unit 5013 and the main member 5012 nearest to this and which polygonal plate shape, specifically hexagonal plate shape.

Furthermore, the heat storage unit 5011 of the present embodiment has an approximately hexagonal plate shape first lid member 5016 which is provided on the opposite side with respect to the main member 5012 of the slider unit 5013, and an approximately hexagonal plate shape second lid member 5017 which is provided on the outside of the main member 5012 on the most opposite side to the slider unit 5013.

Figure 29:
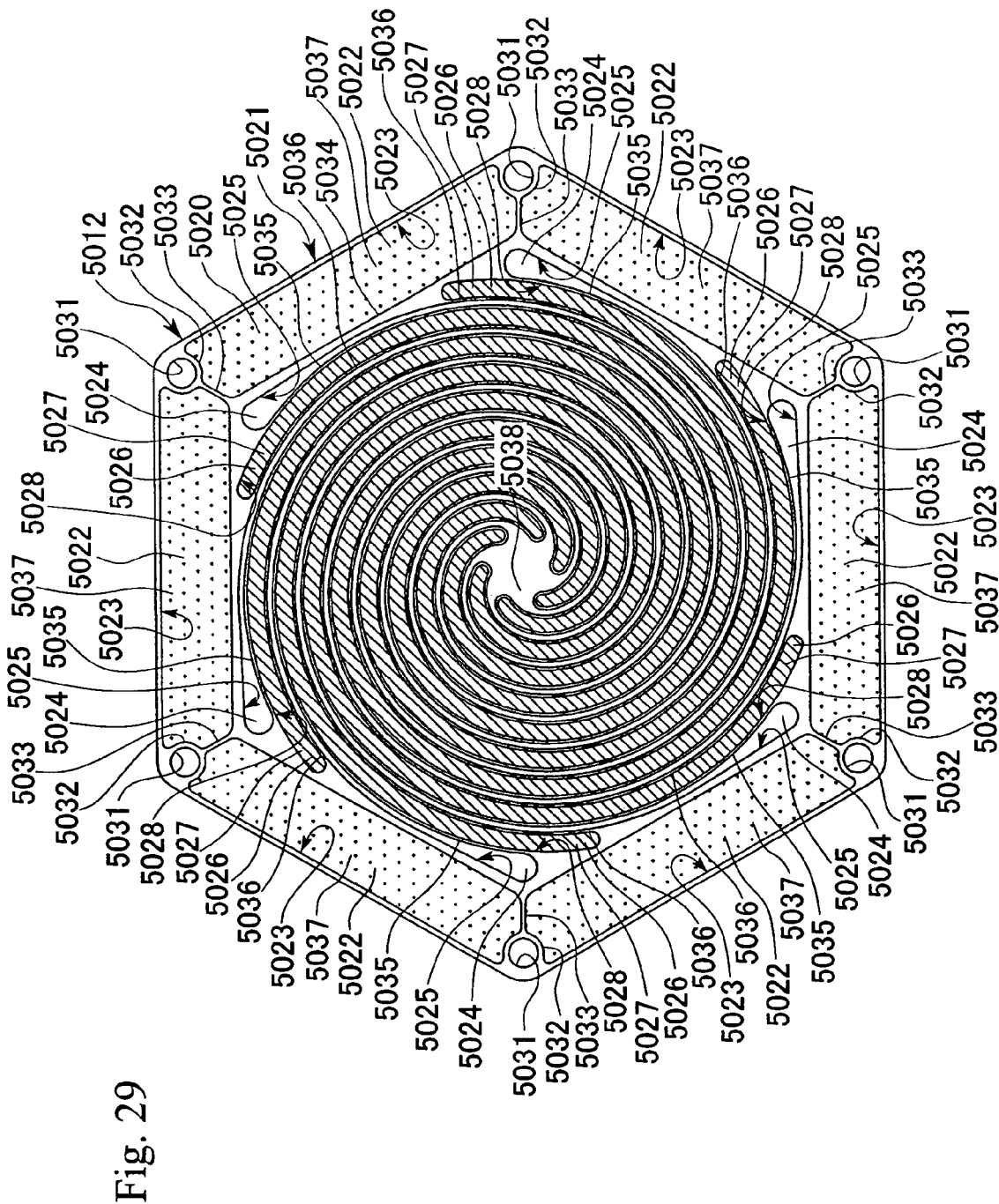
FIG. 29 is a plan cross-sectional view showing a main member filled with the heat storage material in the heat storage unit of the fifth aspect of the present invention.

The main member 5012, as shown in FIG. 28 and FIG. 29, has outer wall sections 5021 which are hexagonal cylindrical shape and provided with openings 5020 at both ends, heat insulating space formation sections 5023 which form heat insulating spaces 5022 for preventing radiation of heat, on the inside of the outer wall sections 5021, fluid passage formation sections 5025 which form fluid passages 5024 for circulating a heat containing fluid, on the inside of the heat insulating spaces 5022 (that is, on the inside of the outer wall sections 5021), and heat storage material filling space formation sections 5028 which form heat storage material filling spaces 5027 for filling with heat storage material 5026, adjacent to the fluid passages 5024 on the inside of the heat insulating spaces 5022 (that is, on the inside of the outer wall sections 5021).

By means of the above, the heat insulating space formation sections 5023 form the heat insulating spaces 5022 between the outer wall sections 5021, the fluid passage formation sections 5025 and the heat storage material filling space formation sections 5028.

Hereunder is a description of the main member 5012 mainly with reference to FIG. 29.

The main member 5012 has a plurality of, specifically six, through hole formation sections 5032 which protrude from the inner surface of the respective corners of the outer wall section 5021 to the center side and where through holes 5031 are formed in the direction linking both opening sections 5020, a plurality of, specifically six, through hole formation sections 5033 which protrude from the respective through hole formation sections 5032 to the center side of the main member 5012, and a wall section 5034 which is a hexagonal cylindrical shape smaller than the outer wall section 5021.

Moreover, the main member 5012 has a plurality of, specifically six, wall sections 5035 which extend from near the respective wall sections 5033 of the wall section 5034 in a spiral shape centered on the axis in the direction linking both opening sections 5020, and a plurality of, specifically six, wall sections 5036 on the inside of the respective wall sections 5035 which form a pair with the wall sections 5035 and extend in a spiral shape with a predetermined spacing. Regarding these wall sections 5035 and 5036, the ones which form pairs are connected to each other on the center side.

Regarding the wall sections 5033 to 5036 and the through hole formation sections 5032, their heights in the direction linking both opening sections 5020 of the outer wall section 5021, with respect to the outer wall section 5021, coincide all over their whole length.

Moreover, the heat insulating space formation sections 5023 are respectively configured by the predetermined parts connected in a cylindrical shape, namely; a part on the inner surface side including the inner surface of the outer wall section 5021, a part on the wall surface side including the wall surface of the through hole formation section 5032, a part on the wall surface side including the wall surface of the wall section 5033, and a part on the outer surface side including the outer surface of the wall section 5034. Inside of these plurality of (specifically, 6) heat insulating space formation sections 5023, heat insulating spaces 5022 for preventing radiation of heat are respectively formed.

In the heat insulating spaces 5022, heat insulators 5037 such as urethane are to be respectively filled. However, even if the heat insulating spaces 5022 are not filled with anything and left as spaces, air layers of these spaces prevent the radiation of heat. Polish treatment may be applied to the heat insulating space formation sections 5023 in order to further increase the thermal insulation performance. Here, in some cases, the heat insulating spaces 5022 and the heat insulating space formation sections 5023 are not formed.

The part on the wall surface side including the mutually opposed wall surfaces of the wall sections 5035 and 5036 adjacent to each other and which form pairs in order to connect on the center side, constitutes the heat storage material filling space formation section 5028. The respective heat storage material filling space formation sections 5028 formed by the respective pairs of the wall sections 5036 and 5036 are double or more spiral shaped, specifically sextuple spiral shaped, centered on the axis in the direction linking both opening sections 5020 of the main member 5012.

Moreover, inside these respective heat storage material filling space formation sections 5028, the heat storage material filling spaces 5027 are formed. As a result, these heat storage material filling spaces 5027 are double or more layered spiral shape, specifically sextuple spiral shape in a plane orthogonal to the direction linking both opening sections 5020 of the main member 5012.

Then, the heat storage material 5026 is filled into the respective heat storage material filling spaces 5027 Here, the heat storage material 5026 to be filled into the respective heat storage material filling spaces 5027 is, for example, a PCM (Phase Change Materials), specifically, a sugar alcohol system such as erythritol, a paraffin system such as n-Tetratriacontane, or a salt hydrate such as $Mg(NO_3)-6H_2O$. Of these, a material where the density of liquid phase is smaller than that of the solid phase, and furthermore, the volume is increased when the heat is stored and it melts, while the volume is decreased when the heat is irradiated and it solidifies, are used.

On the other hand, a part on the wall surface side including the mutually opposed wall surfaces of the wall sections 5035 and 5036 adjacent to each other and which form pairs which are not connected on the center side, and a part of the wall section 5034 respectively constitute the plurality of, specifically six, fluid passage formation sections 5025 which are double or more spiral shaped, specifically sextuple spiral shaped, centered on the axis in the direction linking both opening sections 5020 of the main member 5012. Moreover, inside the respective fluid passage formation sections 5025, the fluid passages 5024 are formed. As a result, the fluid passages 5024 are double or more spiral shape, specifically sextuple spiral shape, centered on the axis in the direction linking both opening sections 5020 of the main member 5012. Furthermore, all of the fluid passages 5024 are mutually merged on the center side of the spiral, that is, in the merge section 5038 in the center of the main member 5012.

Here, as mentioned above, in the main member 5012, all the components are equal in height in the direction linking both opening sections 5020. As a result, the cross-section orthogonal to the direction linking both opening sections 5020 is identically-shaped over the whole length in the direction linking both opening sections 5020. Such a main member 5012 is integrally formed by extrusion molding by extruding material in the direction linking both opening sections 5020. That is to say, the outer wall section 5021 of the main member 5012, the heat insulating space formation section 5023, the fluid passage formation section 5025 and the heat storage material filling space formation section 5028 are integrally formed by extrusion molding.

The main member 5012 is comprised of a metal such as aluminum or a synthetic resin such as polypropylene, polyamide, polyacetal, polyethylene terephthalate, and polyethylene which are suitable for extrusion molding.

Here, the main member 5012 may be formed by any method as long as the outer wall section 5021, the heat insulating space formation section 5023, the fluid passage formation section 5025 and the heat storage material filling space formation section 5028 are integrally formed. For example, it may be formed by injection molding of a synthetic resin, grinding of a metal such as aluminum, casting of a metal such as aluminum, sintering of a ceramic or the like. However, since the main member 5012 is formed such that a cross-section orthogonal to the direction linking both opening sections 5020, is identically-shaped at any position, it is more preferable to form by extrusion molding from the viewpoint of improving production efficiency, and low cost. This also applies in the case where the heat insulating space formation section 5023 is not formed.

The fluid passage formation section 5025 and the heat storage material filling space formation section 5028 may be any shape as long as they are a circulating shape. Besides the spiral shape which circulates in a circular arc form, for example, these may be shaped for circulating in a zigzag form, or shaped for circulating while meandering at random.

The slider unit 5013, as shown in FIG. 28, has a guide case 5041 having an appearance of a multi side cylindrical shape, specifically a hexagonal cylindrical shape, a slider (traveling member) 5042 which is provided so as to be able to slide in this guide case 5041, a seal ring 5043 which is fitted to the slider 5042, and a spring 5044 for urging the slider 5042.

Figure 30:
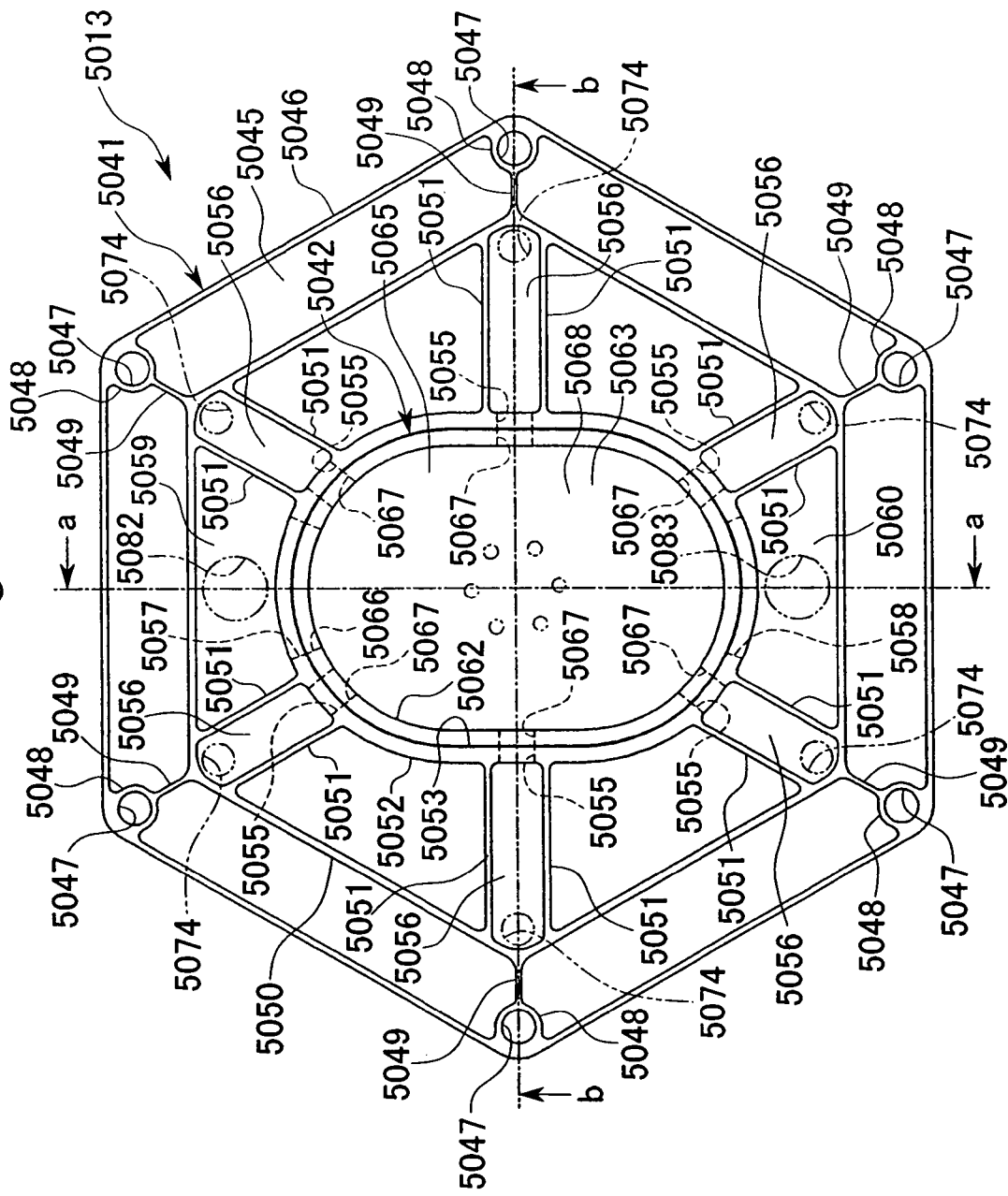
FIG. 30 shows a slider unit with the spring removed in the heat storage unit of the fifth aspect of the present invention.
Figure 31:
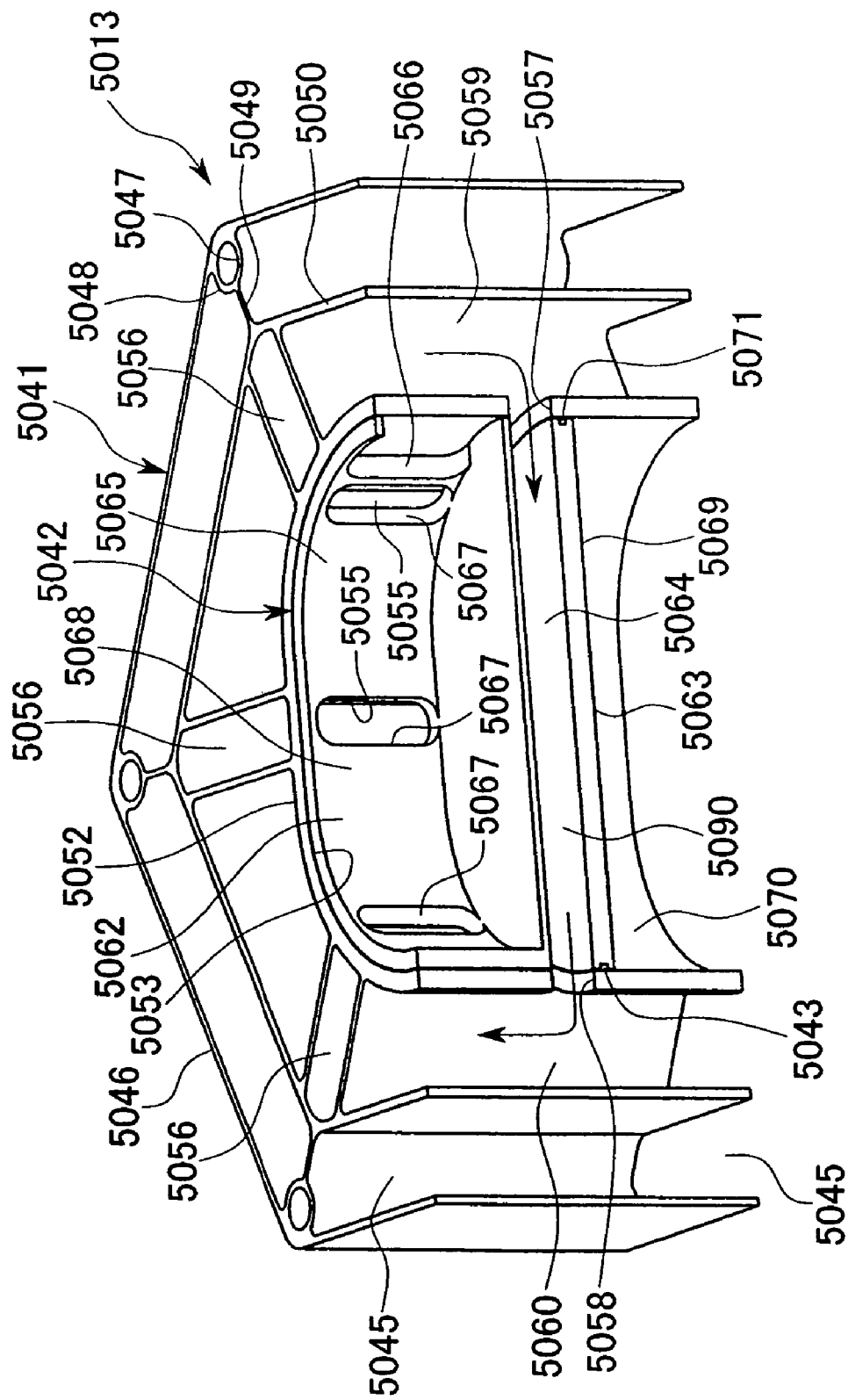
FIG. 31 is a perspective view, partially cross-sectioned, showing the slider unit with the spring removed in the heat storage unit of the fifth aspect of the present invention, showing a bypass condition.

The guide case 5041, as shown in FIG. 30 and FIG. 31, has a multi side cylindrical shape, specifically a hexagonal cylindrical shape outer wall section 5046 with both ends as opening sections 5045, a plurality of, specifically six, through hole formation sections 5048 which extend from the inner surface of the respective corners of the outer wall section 5046 to the center side and where through holes 5047 are formed in the direction linking both opening sections 5045, a plurality of, specifically six, wall sections 5049 which extend from the respective through holes formation section 5048 to the center side of the main member 5012, and a hexagonal cylindrical wall section 5050 for linking the inner end sections in these wall sections 5049 and which is smaller than the outer wall section 5046.

Furthermore, the guide case 5041 has a plurality of, specifically six, wall sections 5051 of parallel pairs spaced apart and which extend from the inner surface of the respective corners of the wall section 5050 to the center side, and an oblong cylindrical guide wall section 5052 for linking the inner end sections of these wall sections 5051. Regarding the guide wall section 5052, the inner peripheral side in an oblong shape is a guide hole 5053 of a shape passing through the guide case 5041 in the direction linking both opening sections 5045.

In the guide wall section 5052 in the position between the paired wall sections 5051, oblong first introductory guide holes 5055 which are long in the direction linking both opening sections 5045, are respectively pierced orthogonal to the direction linking both opening sections 5045. Here, between the paired wall sections 5051 are respectively made introductory guide passages 5056 which pass through in the direction linking both opening sections 5045. These introductory guide passages 5056 can communicate via the respective first introductory guide holes 5055 with inside of the guide wall section 5052.

In addition, regarding the guide case 5041, in the two most separated positions of the oblong cylindrical shaped guide wall section 5052, orthogonal to the direction linking both opening sections 5045, an introducing hole 5057 and a discharging hole 5058 are formed. Furthermore, a part on the outside of the guide wall section 5052 open to the introducing hole 5057, and surrounded by the guide wall section 5052, the wall section 5050 and the wall sections 5051, is an introducing passage 5059. Moreover, a part on the outside of the guide wall section 5052 open to the discharging hole 5058, and surrounded by the guide wall section 5052, the wall section 5052 and the wall sections 5051, is a bypass discharging passage 5060.

The slider 5042 has an oblong cylindrical slide wall section 5062 which is fitted so as to be slidable in the guide hole 5053 on the inside of the guide wall section 5052 of the guide case 5041, and a bottom plate section 5063 for closing off one side of this slide wall section 5062 and which is comparably thick. In the middle in the thickness direction of the bottom plate section 5063, is formed a bypass passage hole 5064 which passes through in the direction linking the most separated two positions of the oblong cylindrical shaped slide wall section 5062.

Furthermore, on the opening section 5065 side from the bottom plate section 5063 of the slide wall section 5062 of the slider 5042, is formed an introductory switching hole 5066 in the slide wall section 5062 at only one of the two most separated positions of the slide wall section 5062. Moreover, at positions which can always communicate with the first introductory guide holes 5055 of the guide case 5041, a plurality of, specifically six, oblong second introductory guide holes 5067 which are long in the direction linking the opening section 5065 and the bottom plate section 5063, are formed orthogonal to the direction linking the opening section 5065 and the bottom plate section 5063. Here, the opening section 5065 side from the bottom plate section 5063 on the inside of the slide wall section 5062 of the slider 5042 is an intermediate guide passage 5068. Moreover, an end surface 5069 of the slider 5042 on the opposite side of the bottom plate section 5063 to the opening section 5065, and the guide hole 5053 form the heat storage material filling space 5070 to be filled with heat storage material 5026.

Furthermore, a seal ring groove 5071 into which the seal ring 5043 is fitted is formed in the outer peripheral surface of the slider 5042 on the end surface 5069 side from the bypass passage hole 5064, so as to go around in a plane orthogonal to the direction linking the opening section 5065 and the bottom plate section 5063. This seal ring 5043 is for sealing the gap between the guide hole 5053 and the outer peripheral surface of the slider 5042 and for sealing the heat storage material filling space 5070.

Figure 34:
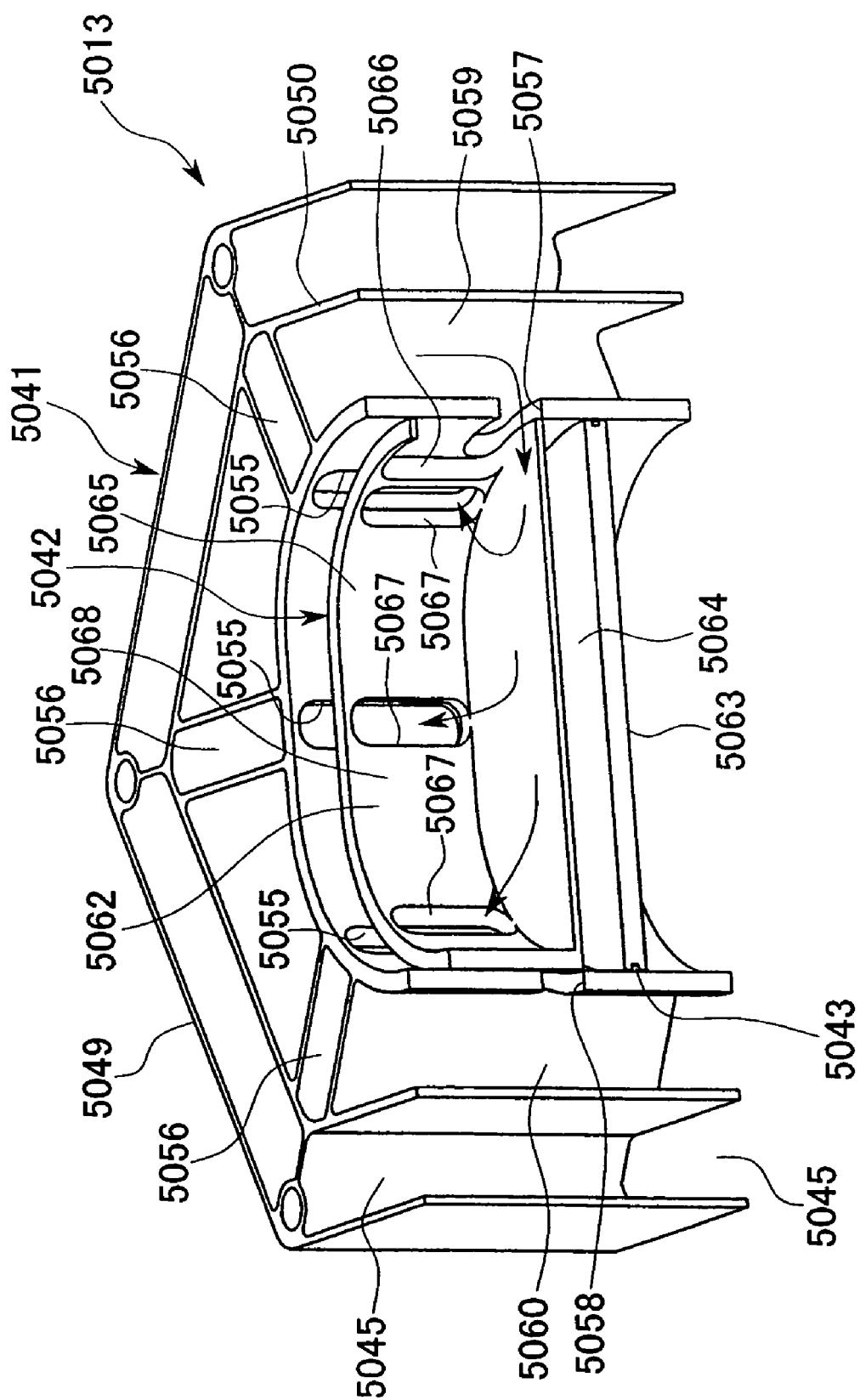
FIG. 34 is a perspective view, partially cross-sectioned, showing the slider unit with the spring removed in the heat storage unit of the fifth aspect of the present invention, showing a first fluid introducing condition.
Figure 35:
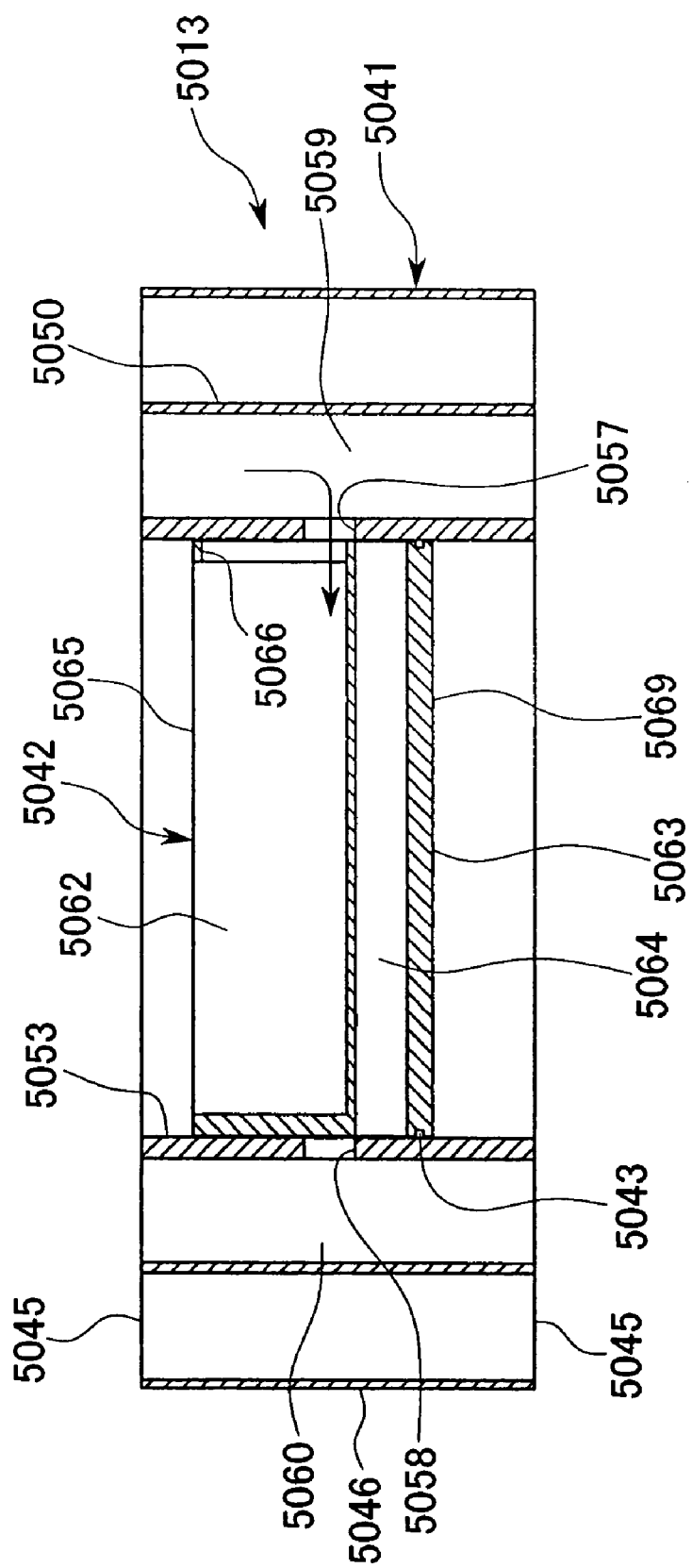
FIG. 35 is a side cross-sectional view taken along the line a—a of FIG. 3 showing the slider unit with the spring removed in the heat storage unit of the fifth aspect of the present invention, showing the first fluid introducing condition.

This slider 5042, in the condition with the seal ring 5043 fitted to the seal ring groove 5071, is fitted into the guide hole 5053 of the guide case 5041 in a predetermined direction, and in this condition, it is possible to slide in the direction linking both opening sections 5045 of the guide case 5041. Moreover, the slider 5042 changes due to this sliding from: a bypass condition as shown in FIG. 31 to 33 where the introductory switching hole 5066 does not communicate with the introducing hole 5057 of the guide case 5041 and the bypass passage hole 5064 communicates with the introducing hole 5057 and the discharging hole 5058 of the guide case 5041; via a first fluid introductory condition as shown in FIG. 34 to FIG. 36 where the bypass passage hole 5064 does not communicate with the introducing hole 5057 and the discharging hole 5058 of the guide case 5041 and the introductory switching hole 5066 communicates with the introducing hole 5057 of the guide case 5041 on the bottom plate section 5063 side; to a second fluid introductory condition as shown in FIG. 37 to FIG. 3 where the bypass passage hole 5064 does not communicate with the introducing hole 5057 and the discharging hole 5058 of the guide case 5041 and the introductory switching hole 5066 communicates with the introducing hole 5057 of the guide case 5041 on the opening section 5065 side.

Figure 32:
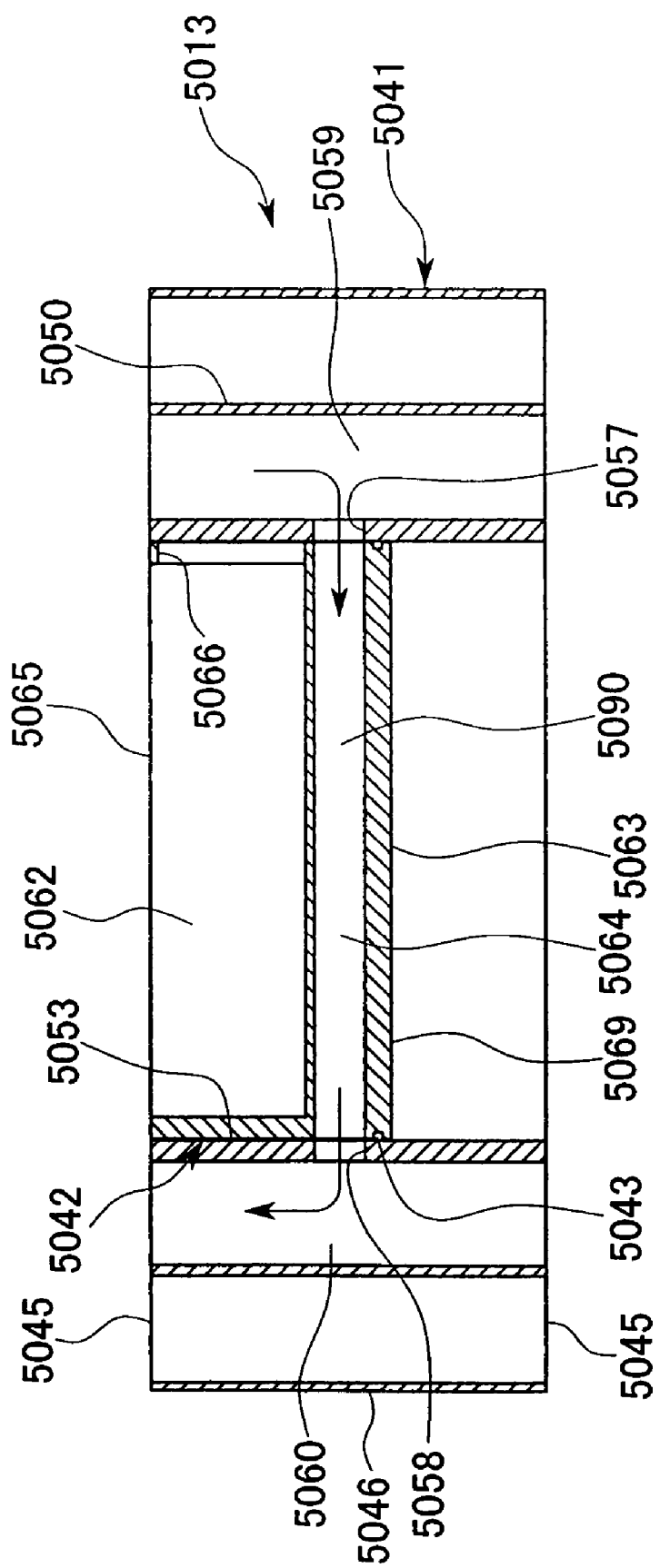
FIG. 32 is a side cross-sectional view taken along the line a—a in FIG. 30 showing the slider unit with the spring removed in the heat storage unit of the fifth aspect of the present invention, showing the bypass condition.
Figure 33:
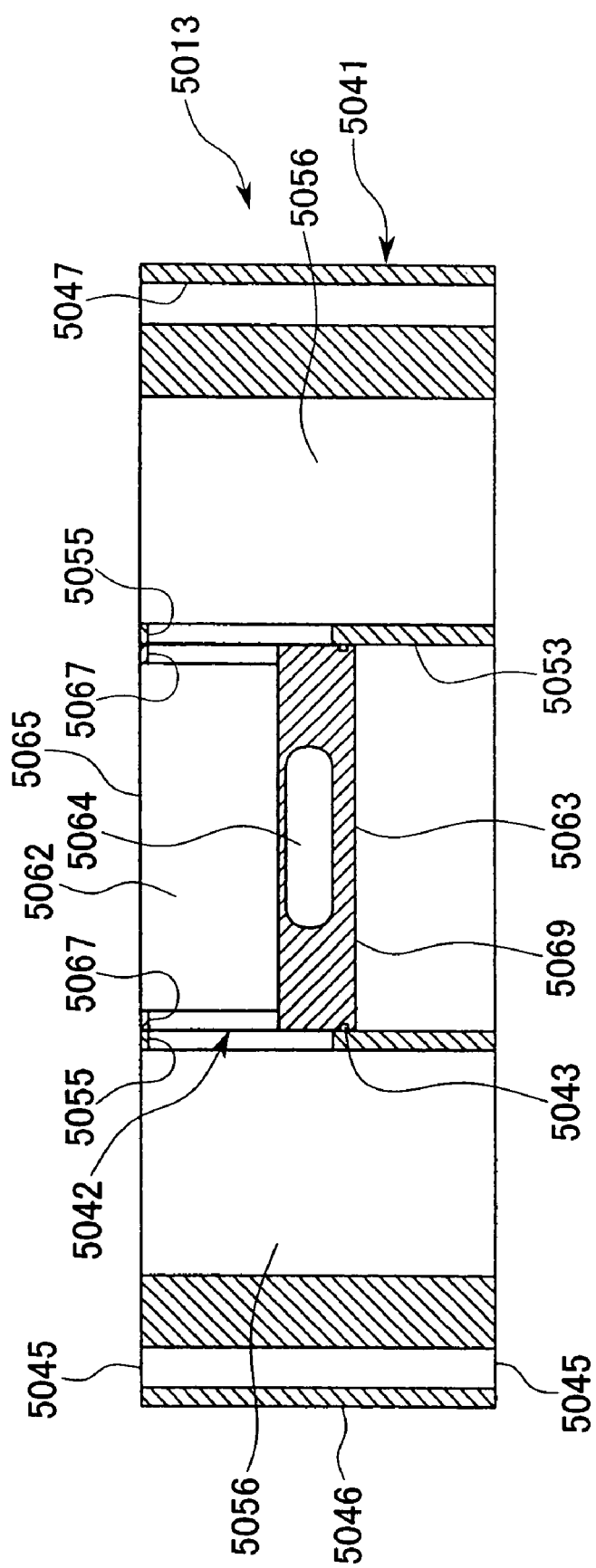
FIG. 33 is a side cross-sectional view taken along the line b—b of FIG. 3 showing the slider unit with the spring removed in the heat storage unit of the fifth aspect of the present invention, showing the bypass condition.

Here, in the bypass condition shown in FIG. 31 to FIG. 33, the bypass passage hole 5064 communicates with the introducing hole 5057 and the discharging hole 5058. Therefore, the introducing passage 5059, the introducing hole 5057, the bypass passage hole 5064, the discharging hole 5058 and the bypass discharging passage 5060 are communicated, and a fluid introduced to the introducing passage 5059 is introduced to the bypass discharging passage 5060 as shown by the arrow in FIG. 31 and FIG. 32.

Figure 36:
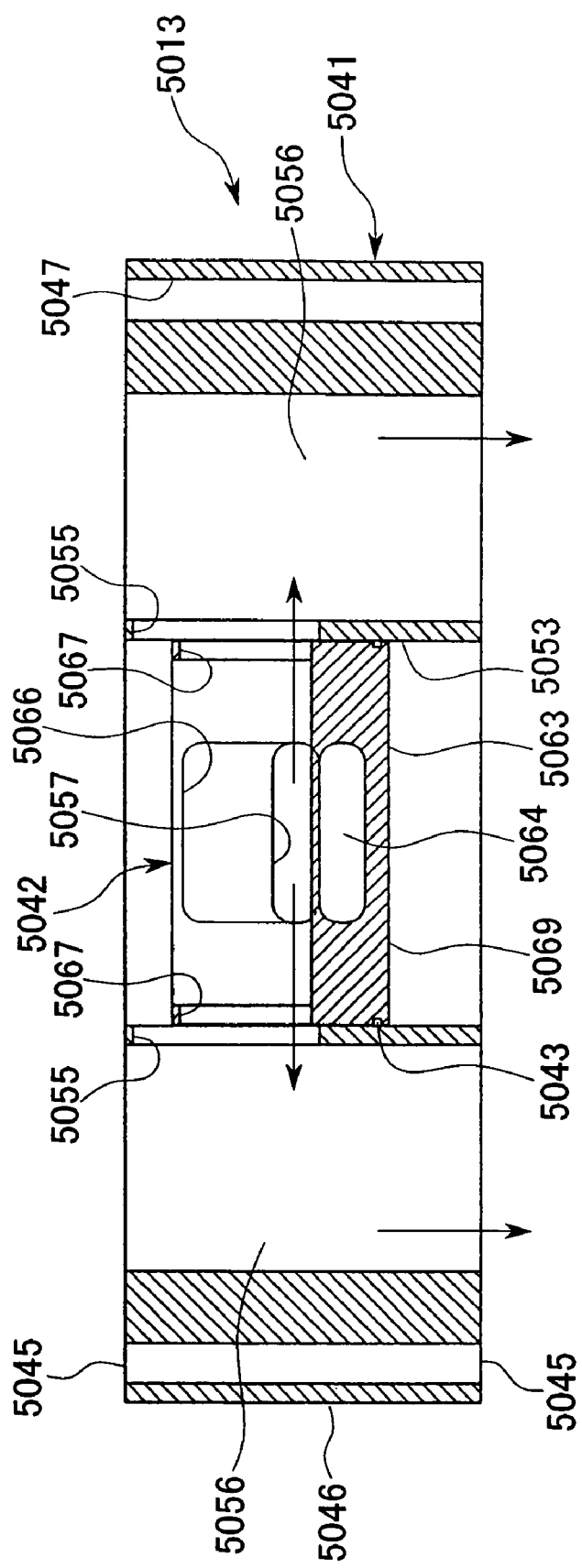
FIG. 36 is a side cross-sectional view taken along the line b—b of FIG. 3 showing the slider unit with the spring removed in the heat storage unit of the fifth aspect of the present invention, showing the first fluid introducing condition.
Figure 37:
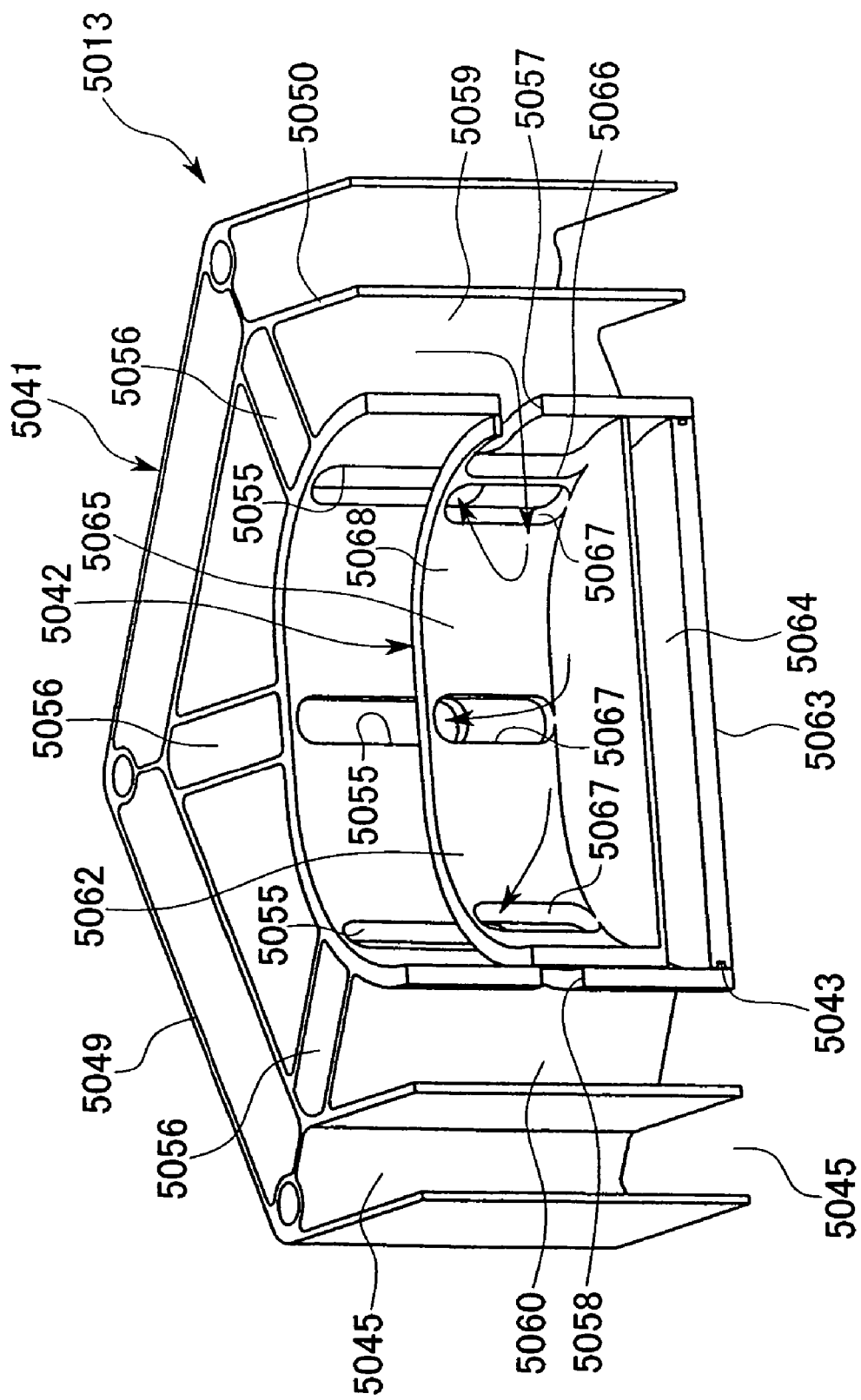
FIG. 37 is a perspective view, partially cross-sectioned, showing the slider unit with the spring removed in the heat storage unit of the fifth aspect of the present invention, showing a second fluid introducing condition.
Figure 38:
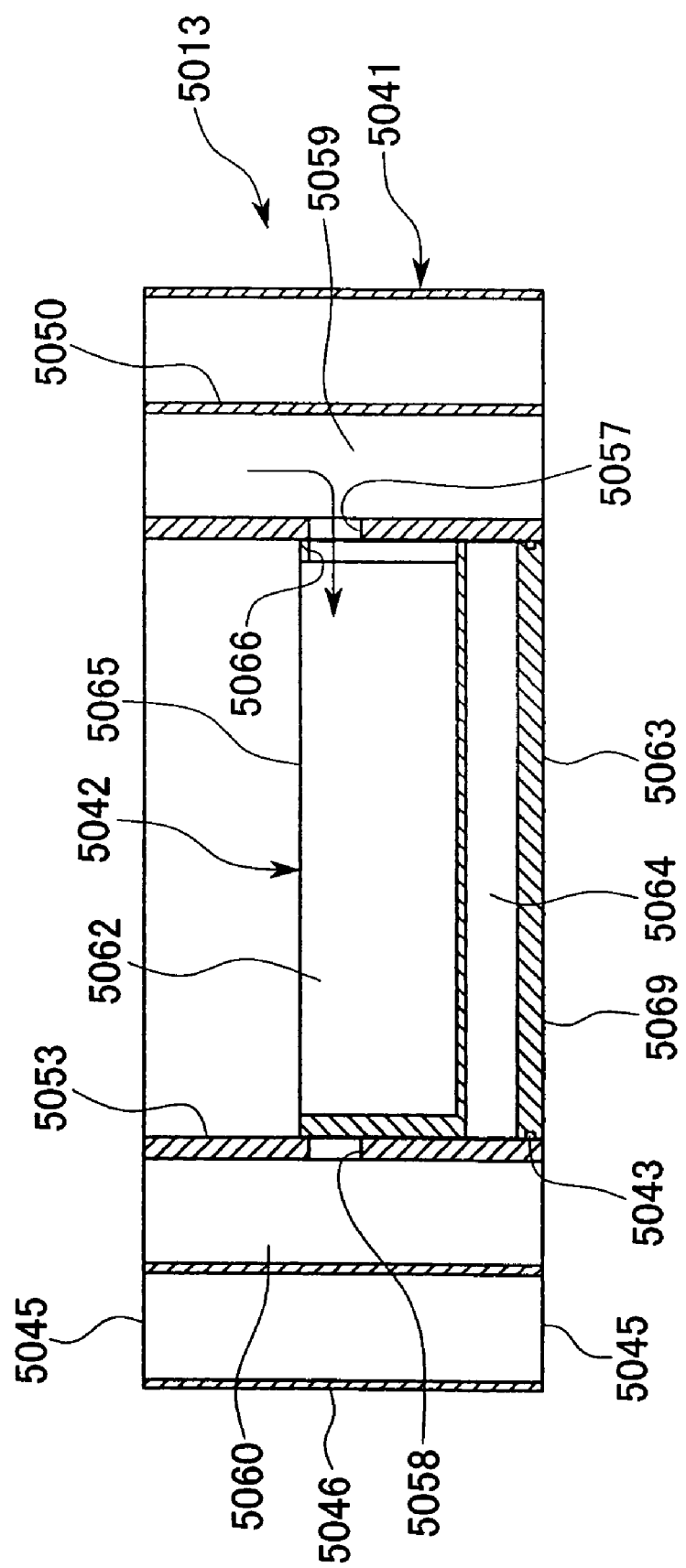
FIG. 38 is a side cross-sectional view taken along the line a—a of FIG. 3 showing the slider unit with the spring removed in the heat storage unit of the fifth aspect of the present invention, showing the second fluid introducing condition.
Figure 39:
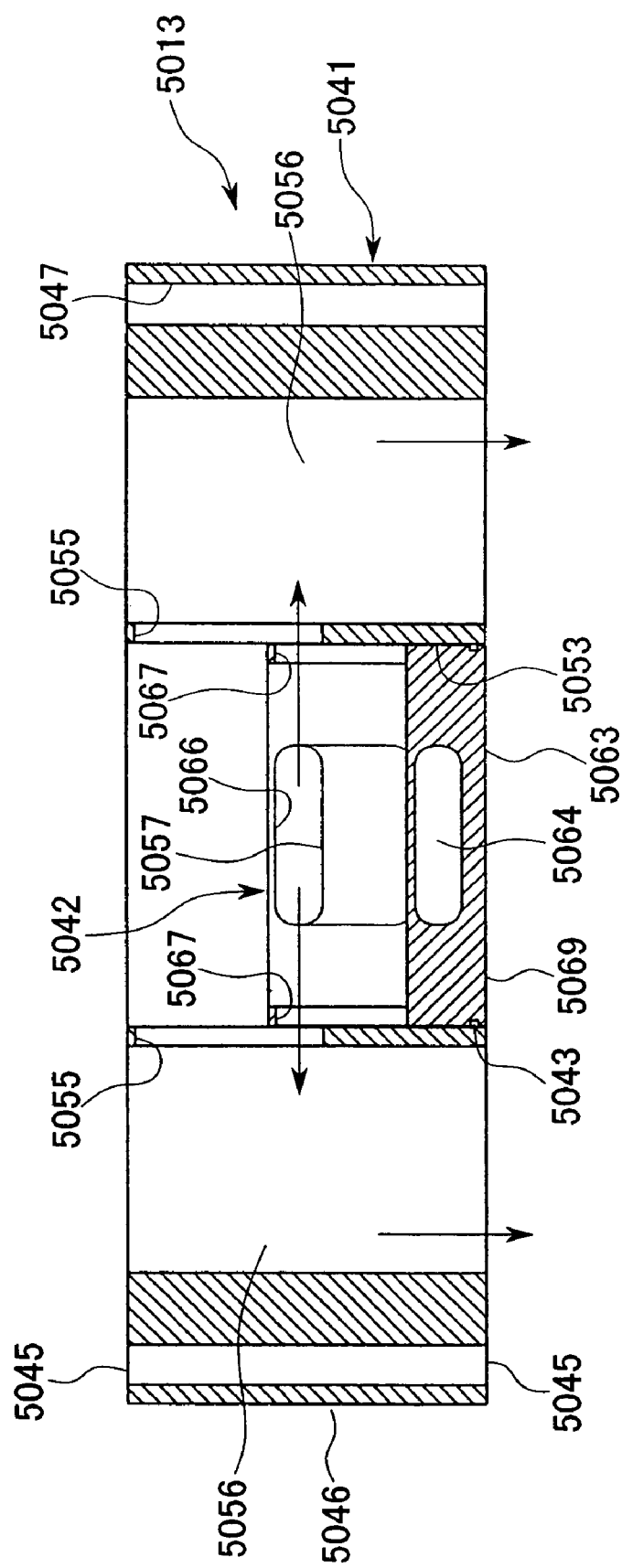
FIG. 39 is a side cross-sectional view taken along the line b—b of FIG. 30 showing the slider unit with the spring removed in the heat storage unit of the fifth aspect of the present invention, showing the second fluid introducing condition.

On the other hand, in the first fluid introductory condition shown in FIG. 36 to FIG. 36, the introductory switching hole 5066 communicates with the introducing hole 5057 on the bottom plate section 5063 side. Therefore, the introducing passage 5059, the introducing hole 5057, the introductory switching hole 5066, the intermediate guide passage 5068, the second introductory guide hole 5067, the first introductory guide hole 5065 and the introductory guide passage 5056 are communicated, and a fluid introduced to the introducing passage 5059 is introduced to the respective introductory guide passages 5056 as shown by the arrow in FIG. 34 to FIG. 36.

Furthermore, in the second fluid introductory condition shown in FIG. 34 to FIG. 39, the introductory switching hole 5066 communicates with the introducing hole 5057 on the opening section 5065 side. Therefore, the introducing passage 5059, the introducing hole 5057, the introductory switching hole 5066, the intermediate guide passage 5068, the second introductory guide hole 5067, the first introductory guide hole 5065 and the introductory guide passage 5056 are communicated, and a fluid introduced to the introducing passage 5059 is introduced to the respective introductory guide passages 5056 as shown by the arrow in FIG. 37 to FIG. 39.

The above guide case 5041 and the slider 5042, similarly to the abovementioned main member 5012, are integrally formed by a metal such as aluminum or a synthetic resin such as polypropylene, polyamide, polyacetal, polyethylene terephthalate and polyethylene. However, for example, it is possible to form by injection molding of a synthetic resin, to form by grinding of a metal such as aluminum, to form by casting of a metal such as aluminum, or to form by sintering of a ceramic material.

Figure 40:
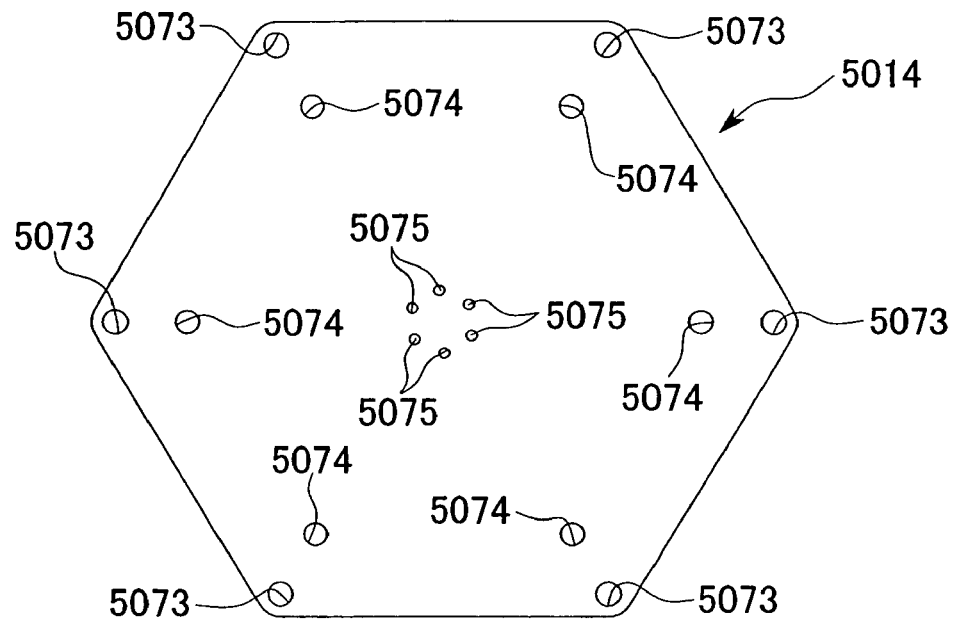
FIG. 40 is a plan view showing a first separator of the heat storage unit of the fifth aspect of the present invention.

In the first separator 5014, as shown in FIG. 40, a plurality of, specifically six, through holes 5073 are formed near the respective corners. On the center side of the respective through holes 5073, a plurality of, specifically six, fluid passage communication holes 5074 are also formed near the respective corners. Near the central section, a plurality of, specifically six, heat storage material filling space communication holes 5075 are formed.

Here, as shown in FIG. 28, regarding the first separator 5014 which is arranged between the pair of two main members 5012 farthest from the slider unit 5013, the respective fluid passage communication holes 5074 respectively communicate between a pair of the outer end sections corresponding to the fluid passages 5024 of the pair of main members 5012 which are arranged adjacent on both sides, and the respective heat storage material filling space communication holes 5075 respectively communicate between the inner end sections of the parts corresponding to the heat storage material filling spaces 5027 of the pair of main members 5012 which are arranged adjacent on both sides. Moreover, the respective through holes 5073 respectively communicate between corresponding through holes 5031 of the pair of main members 5012 which are arranged adjacent on both sides.

Furthermore, regarding the first separator 5014 which is arranged between the slider unit 5013 and the main member 5012 closest to this, the respective fluid passage communication holes 5074 respectively communicate between the introductory guide passages 5056 of the guide case 5041 and the parts corresponding to the outer end sections of the fluid passages 5024 of the main member 5012, which are arranged adjacent on both sides, and all of the heat storage material filling space communication holes 5075 communicate between the guide hole 5053 of the guide case 5041 and all of the inner end sections of the heat storage material filling spaces 5027 of the main member 5012, which are arranged adjacent on both sides. Moreover, the respective through holes 5073 respectively communicate between the through holes 5047 of the guide case 5041 and the parts corresponding to the through holes 5031 of the main member 5012, which are arranged adjacent on both sides.

Figure 41:
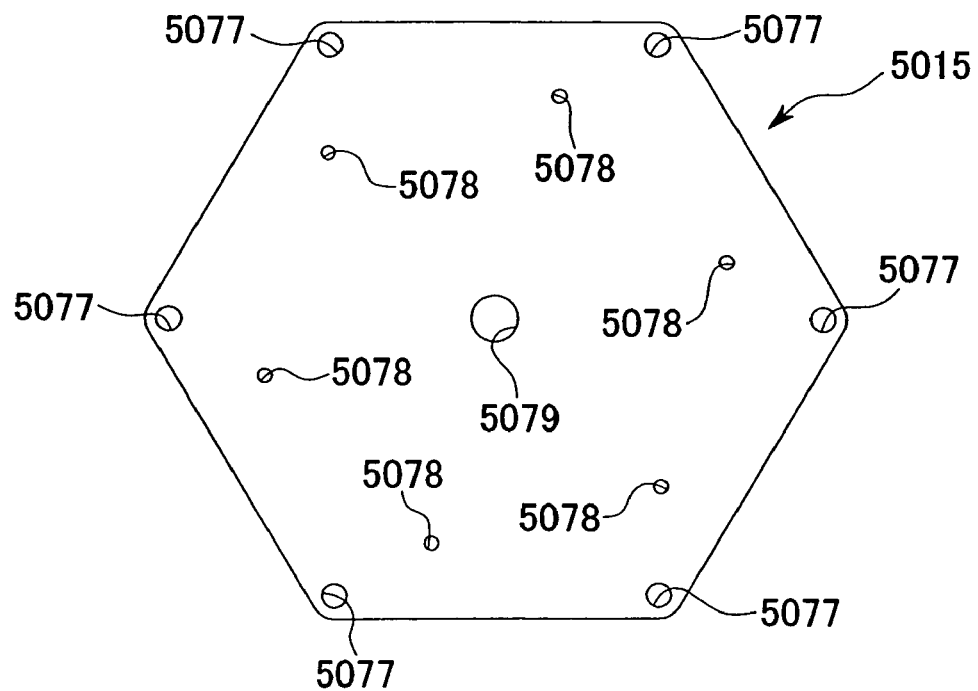
FIG. 41 is a plan view showing a second separator of the heat storage unit of the fifth aspect of the present invention.

In the second separator 5015, as shown in FIG. 41, a plurality of, specifically six, through holes 5077 are formed near the respective corners. At the positions which are inside the respective edge sections and close to the respective through holes 5077, a plurality of, specifically six, heat storage material filling space communication holes 5078 are formed. Furthermore, in the central section, one fluid passage filling space communication hole 5079 is formed.

Regarding the second separator 5015, as shown in FIG. 28, the fluid passage communication hole 5079 communicates between the merge sections 5038 in the centers of the fluid passages 5024 of the pair of main members 5012 which are arranged adjacent on both sides, and the heat storage material filling space communication holes 5078 respectively communicate between the pairs of outer end sections corresponding to the heat storage material filling spaces 5027 of the pair of main members 5012 which are arranged adjacent on both sides. Moreover, the respective through holes 5077 respectively communicate between the parts corresponding to the through holes 5031 of the pair of main member 5012 which are arranged adjacent on both sides.

The first separator 5014 and the second separator 5015 described above, similarly to the abovementioned main member 5012, are integrally formed by a metal such as aluminum or a synthetic resin such as polypropylene, polyamide, polyacetal, polyethylene terephthalate and polyethylene. When integrally forming by a resin, they can be formed by extrusion molding or injection molding. When integrally forming by aluminum, they can be formed by extrusion molding, grinding, or press molding. Moreover, they can be formed by sintering of a ceramic material.

In the first lid member 5016, as shown in FIG. 28, a plurality of, specifically six, through holes 5081 are formed near the respective corner sections. On the center sides of a pair of mutually parallel edge sections, a cylindrical inlet 5082 and a cylindrical bypass outlet 5083 are provided.

Regarding the first lid member 5016, the inlet 5082 is always communicated with the introducing passage 5059 of the guide case 5041 of the slider unit 5013, and the bypass outlet 5083 is always communicated with the bypass discharging passage 5060 of the guide case 5041. Moreover, the respective through holes 5081 are respectively communicated with the parts corresponding to the through holes 5047 of the guide case 5041.

In the second lid member 5017, a plurality of, specifically six, through holes 5085 are formed near the respective corner sections. In the center, a cylindrical outlet 5086 is provided. Furthermore, at positions which are inside the respective edge sections and close to the respective through holes 5085, a plurality of, specifically six, cylindrical heat storage material filling ports 5087 are provided.

Regarding the second lid member 5017, the outlet 5086 is always communicated with the merge section 5038 in the center of the fluid passages 5024 of the main member 5012 adjacent to each other, and the respective heat storage material filling ports 5087 are respectively communicated with the outer end sections of the parts corresponding to the heat storage material formation sections 5027 of the main member 5012 adjacent to each other. Moreover, the respective through holes 5085 are communicated with the parts corresponding to the through holes 5031 of the main member 5012 adjacent to each other. The respective heat storage material filling ports 5087, after filling the heat storage material 5026, are sealed and closed off by stopper members which are not shown.

The first lid member 5016 and the second lid member 5017 described above, similarly to the abovementioned main member 5012, are integrally formed by a metal such as aluminum or a synthetic resin such as polypropylene, polyamide, polyacetal, polyethylene terephthalate and polyethylene. When integrally forming by a synthetic resins, that can be formed by injection molding. When integrally forming by aluminum, they can be formed by grinding, or the like. Moreover they can be formed by sintering of a ceramic material. Here, in the case of injection molding of a synthetic resin, the whole of the first lid member 5016 and of the second lid member 5017 can be integrally formed. In other cases, it may be preferable that the inlet 5082 and the bypass outlet 5083 in the first lid member 5016, and the outlet 5086 and the heat storage material filling ports 5087 in the second lid member 5017, are separately formed and joined to the other part later.

Then, as shown in FIG. 28, for example, the main member 5012 is placed on the second lid member 5017 in a condition with the outlet 5086 facing the lower side. Then the first separator 5014, the main member 5012, the second separator 5015, the main member 5012, and the first separator 5014, are placed in sequence, and the guide case 5041 is placed on top. At this time, the guide case 5041 is placed in a direction to position the first introductory guide holes 5055 on the opposite side to the main member 5012, that is, the upper side. Then the slider 5042 in a condition with the seal ring 5043 fitted to the seal ring groove 5071 is fitted into the guide hole 5053 of the guide case 5041 in an orientation with the seal ring 5043 is on the lower side. On the bottom plate section 5063 of the slider 5042, the spring 5044 is then arranged, and the first lid member 5016 is placed on top of this.

Then, the second lid member 5017, the main member 5012, the first separator 5014, the main member 5012, the second separator 5015, the main member 012, the first separator 5014, the guide case 5041 and the first lid member 5016, are bonded and integrated at their contact parts, with their hexagonal shapes all aligned. At this time, they are bonded by a bonding method such as ultrasonic welding, brazing, or gluing, suitable for the material.

The through holes 5085 of the second lid member 5017, the through holes 5031 of the main member 5012, the through holes 5073 of the first separator 5014, the through holes 5031 of the main member 5012, the through holes 5077 of the second separator 5015, the through holes 5031 of the main member 5012, the through holes 5073 of the first separator 5014, the through holes 5047 of the guide case 5041, and the through holes 5081 of the first lid member 5016, may have bolts passed through all of the six holes of the combined members, which are mutually position adjusted, and nuts screwed onto one end of these bolts, so that they are all fastened and joined. In this case, for the first separators 5014, the second separator 5015, the first lid member 5016 and the second lid member 5017, in order to maintain sealability, it is preferable to use ones with a material having plasticity such as EPDM (ethylene propylene rubber) provided on the joint surfaces.

In the condition integrated in this way, the whole unit is turned upside down, and the heat storage material 5026 is filled from one of the heat storage material filling ports 5087 of the second lid member 5017, in a fluid liquid condition. As a result, the heat storage material 5026 travels from the outer end section to the inner end section of the one heat storage material filling space 5027 communicated with the heat storage material filling port 5087 where the filling is conducted in the main member 5012 adjacent to the second lid member 5017. Then is passes through one of the corresponding heat storage material filling space communication holes 5075 in the first separator 5014 immediately adjacent to this main member 5012, and travels from the inner end section to the outer end section of the one corresponding heat storage material filling space 5027 in the main member 5012 immediately adjacent to this first separator 5014.

Furthermore, the heat storage material 5026 passes through one of the corresponding heat storage material filling space communication holes 5078 in the second separator 5015 immediately adjacent to this main member 5012, and travels from the outer end section to the inner end section of the one corresponding heat storage material filling space 5027 in the main member 5012 immediately adjacent to this second separator 5015. Then it passes through one of the corresponding heat storage material filling space communication holes 5075 in the first separator 5014 immediately adjacent to this main member 5012, and is filled into the heat storage material filling space 5070 surrounded by this first separator 5014, the guide hole 5053 of the slider unit 5013 immediately adjacent to this first separator 5014, and the slider 5042 (refer to FIG. 42 to FIG. 45).

Then, the heat storage material 5026 passes from the heat storage material filling space 5070 through the rest of the five heat storage material filling space communication holes 5075 of the first separator 5014 adjacent to the slider unit 5013, and travels from the inner end section to the outer end section of the five corresponding heat storage material filling spaces 5027 in the main member 5012 immediately adjacent to this first separator 5014. Then it passes through the five corresponding heat storage material filling space communication holes 5078 in the second separator 5015 immediately adjacent to this main member 5012, and travels from the outer end section to the inner end section of the five corresponding heat storage material filling spaces 5027 in the main member 5012 immediately adjacent to this second separator 5015.

In addition, the heat storage material 5026 passes through the rest of the five heat storage material filling space communication holes 5075 of the first separator 5014 immediately adjacent to this main member 5012, and travels from the inner end section to the outer end section of the corresponding five heat storage material filling spaces 5027 in the main member 5012 immediately adjacent to this first separator 5014, and overflows from the corresponding five heat storage material filling ports 5087 of the second lid member 5017 immediately adjacent to main member 5012.

In this condition, the five heat storage material filling ports 5087 where the heat storage material 5026 has overflowed, are closed off by driving in stopper members. Then the heat storage material 5026 is poured in under a predetermined pressure from the one heat storage material filling port 5087 where the filling is being conducted, and the heat storage material 5026 is filled until the slider 5042 of the slider unit 5013 is touched against the first lid member 5016 and the heat storage material filling space 5027 becomes to the maximum. Then this one heat storage material filling port 5087 is closed off and sealed by driving in a stopper member. In the condition where the heat storage material filling space 5027 of the slider unit 5013 is the maximum, the slider unit 5013 attains the bypass condition.

From the above, the heat storage unit 5011 is completed.

In the condition completed in this way, the slider unit 5013 is provided on the outside of the main member 5012. Moreover, it is set side by side with the main member 5012 in the direction linking the opening sections 5020 at both ends of the main member 5012. Furthermore, the condition is such that the slider 5042 travels along the direction linking the opening sections 5020 of the main member 5012.

Figure 42:
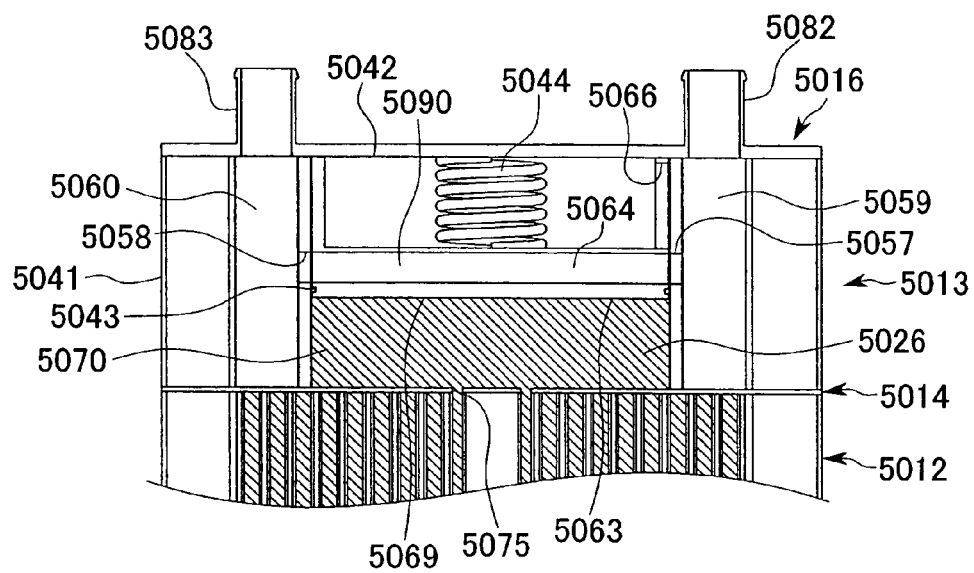
FIG. 42 is a side cross-sectional view taken along the line a—a of FIG. 3 showing the heat storage unit of the fifth aspect of the present invention, showing a bypass condition.
Figure 43:
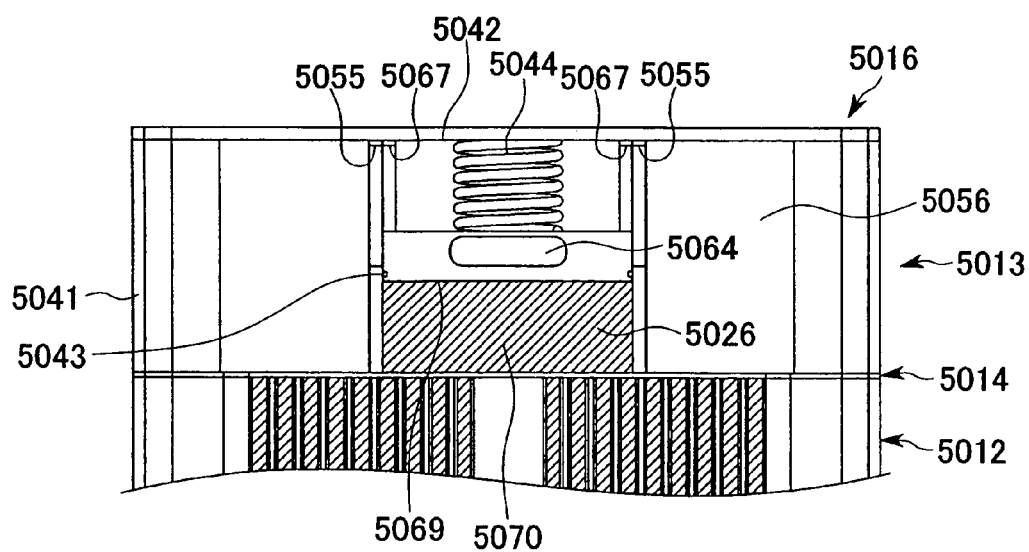
FIG. 43 is a side cross-sectional view taken along the line b—b of FIG. 3 showing the heat storage unit of the fifth aspect of the present invention, showing the bypass condition.

Here, regarding the heat storage material 5026, as mentioned above the volume varies corresponding to the heat storage condition, specifically, the volume is increased when the heat is stored and it melts while the volume is decreased when the heat is irradiated and it solidifies. Therefore, in the condition where, similarly to the above case when filled, the heat storage material 5026 is all in liquid form, that is, the density is the smallest, the slider 5042 travel against the urging force of the spring 5044 until it touches against the first lid member 5016, and the heat storage material filling space 5070 becomes a maximum. Then, as shown in FIG. 42 and FIG. 43, it becomes the bypass condition where the communication hole 5057, the bypass passage hole 5064 and the discharging hole 5058 are communicated.

As a result, the heat storage unit 5011 discharges a fluid which is introduced from the inlet 5082, from the bypass outlet 5083 via the introducing passage 5059, the introducing hole 5057, the bypass passage hole 5064, the discharging hole 5058 and the bypass discharging passage 5060. As a result, it is discharged not passing through, but bypassing, the fluid passage 5024 of the main member 5012, to the exterior of the heat storage unit 5011. At this time, the bypass passage hole 5064, the discharging hole 5058, the bypass discharging passage 5060 and the bypass outlet 5083 constitute the bypass passage 5090.

Figure 44:
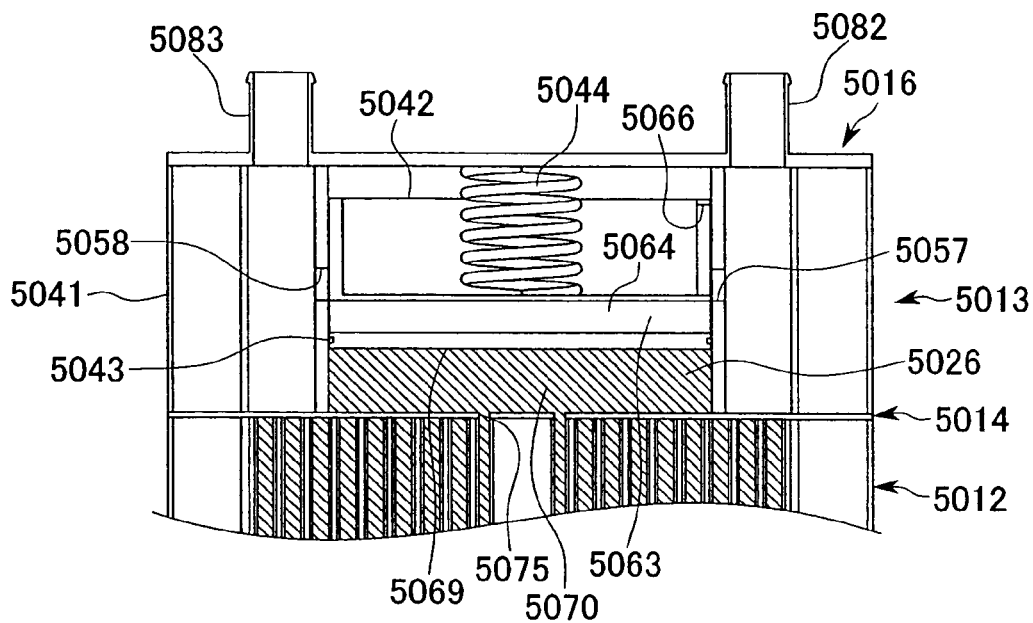
FIG. 44 is a side cross-sectional view taken along the line a—a of FIG. 3 showing the heat storage unit of the embodiment of the present invention, showing a first fluid introducing condition.
Figure 45:
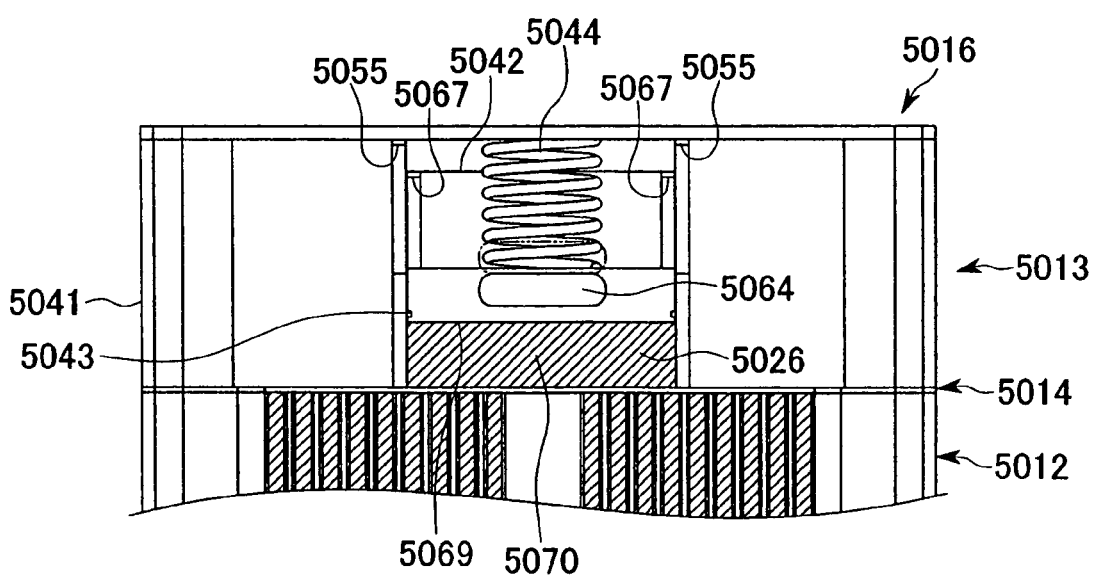
FIG. 45 is a side cross-sectional view taken along the line b—b of FIG. 3 showing the heat storage unit of the embodiment of the present invention, showing the first fluid introducing condition.

On the other hand, in the condition where the heat storage material 5026 is partially in solid form, that is, the density is large, the volume is decreased. Therefore, the slider which is arranged so that the end surface 5069 faces to the heat storage material filling space 5070, as shown in FIG. 44 and FIG. 45, with help from the urging force of the spring 5044, slightly travels in the direction to decrease the heat storage material filling space 5070. Consequently, the slider 5041 attains the first fluid introducing condition where the bottom plate section 5063 side of the introductory switching hole 5066 is communicated with the communication hole 5057 of the guide case 5041.

As a result, in the heat storage unit 5011, the fluid introduced from the inlet 5082 flows to the introducing passage 5059, the introducing hole 5057, the intermediate guide passage 5068, the respective second introductory guide holes 5067, the respective first introductory guide holes 5055 and the respective introductory guide passages 5074 in the slide unit 5013. It then flows via the respective introductory guide passages 5074 of the first separator 5014 adjacent to this, from the outer end section to the inner end section of the respective fluid passages 5024 of the main member 5012 adjacent to this. Furthermore, it flows via the fluid passage communication hole 5079 of the second separator 5015 adjacent to this, from the inner end section to the outer end section of the respective fluid passages 5024 of the main member 5012 adjacent to this. It then flows via the respective introductory guide passages 5074 of the first separator 5014 adjacent to this, from the outer end section to the inner end section of the respective fluid passages 5024 of the main member 5012 adjacent to this, and is discharged from the outlet 5086 of the second lid member 5017 adjacent to this. As a result, a heat containing fluid introduced from the inlet 5082 to the introducing passage 5059 is circulated by the fluid passages 5024 along the heat storage material filling spaces 5027 filled with the heat storage material 5026 of all the main members 5012 and is discharged from the outlet 5086 (at this time, the bypass passage 5059 is in the closed off condition).

Figure 46:
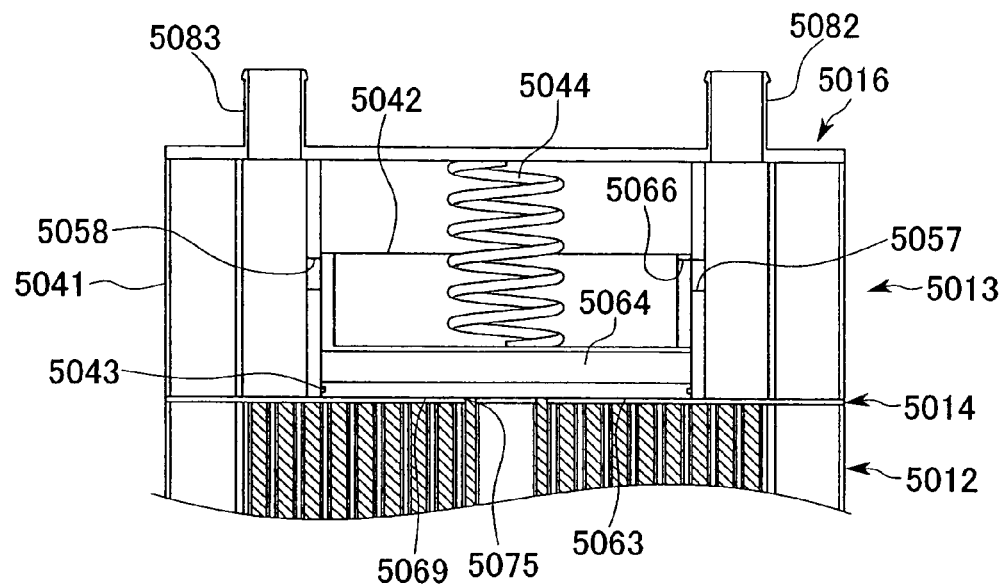
FIG. 46 is a side cross-sectional view taken along the line a—a of FIG. 3 showing the heat storage unit of the embodiment of the present invention, showing a second fluid introducing condition.
Figure 47:
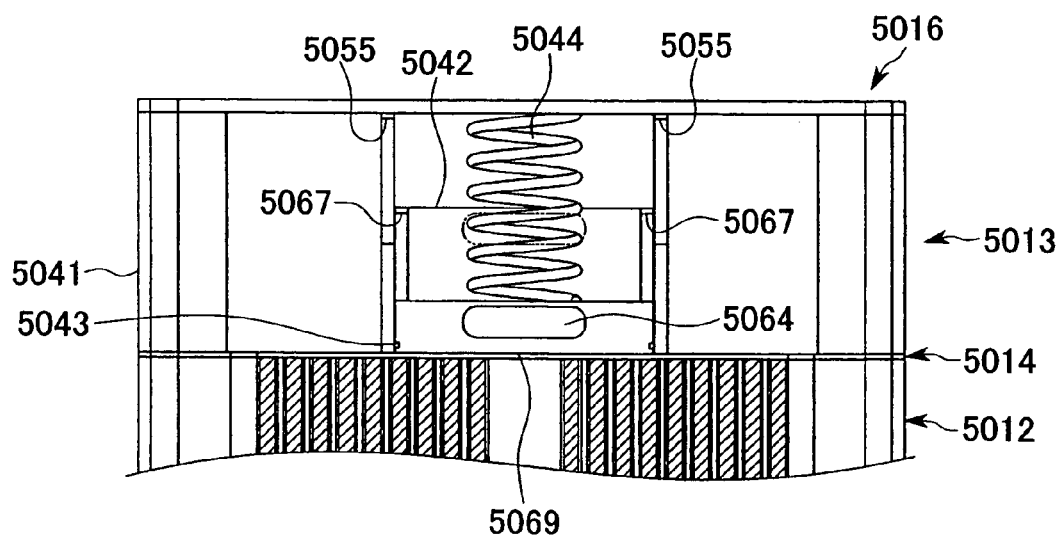
FIG. 47 is a side cross-sectional view taken along the line b—b of FIG. 3 showing the heat storage unit of the embodiment of the present invention, showing the second fluid introducing condition.

Furthermore, in the condition where the heat storage material 5026 is all in solid form, that is, the density is the largest, the volume is decreased. Therefore, the slider 5042 which is arranged so that the end surface 5069 faces to the heat storage material filling space 5027, as shown in FIG. 46 and FIG. 47, travels the farthest in the direction to decrease the heat storage material filling space 5070 and touches against the first separator 5014. Even in this condition, since the introductory switching hole 5066, the second introductory guide hole 5067 and the first introductory guide hole 5067 are slot shaped long in the slide direction, the slider 5042 attains the second fluid introducing condition where the opening section 5065 side of the introductory switching hole 5066 is communicated with the introducing hole 5057 of the guide case 5041.

As a result, in the heat storage unit 5011, similarly to the first introducing condition, a fluid introduced from the inlet 5082 is discharged via the introducing passage 5059, the introducing hole 5057, the intermediate guide passage 5068, the respective second introductory guide holes 5067, the respective first introductory guide holes 5055, the respective introductory guide passage 5056, the respective introductory guide passages 5074, the respective fluid passages 5024, the respective fluid passage communication holes 5079, the respective fluid passages 5024, the respective fluid passage communication holes 5079, and the respective fluid passages 5024, from the outlet 5086 of the second lid member 5017. As a result, a heat containing fluid introduced from the inlet 5082 to the introducing passage 5059, is circulated by the fluid passage 5024 along the heat storage material filling spaces 5027 filled with the heat storage material 5026 of all the main members 5012 and is discharged from the outlet 5086 (at this time, the bypass passage 5059 is in the closed off condition).

As above, the slider unit 5013 selectively switches the flow-in destination of the flow introduced from the inlet 5082, to the fluid passage 5024 or the bypass passage 5090, according to the position of the slider 5042 which travels due to the volume variation of the heat storage material 5026.

Such a heat storage unit 5011 is provided on the circulation path of the fluid (cooling water) for water cooling the internal combustion engine. The fluid which has passed through the internal combustion engine is introduced from the inlet 5082, and the fluid discharged from the outlet 5086 and the bypass outlet 5083 is returned to the internal combustion engine side. Moreover, when setting the heat storage unit 5011, the inlet 5082 and the bypass outlet 5083 are set to the upper side, and the outlet 5086 is set to the lower side.

The operation of the heat storage unit 5011 of the above configuration, is described.

First of all, in the condition where the heat storage unit 5011 is sufficiently warmed by the waste heat generated by the previous operation of the internal combustion engine, the heat storage material 5028 stores the heat and becomes liquid form. As shown in FIG. 31 to FIG. 33, and FIG. 42 to FIG. 43, the condition becomes such that the bypass passage hole 5064 of the slider 5042 is communicated with the introducing hole and the discharging hole 5058 of the guide case 5041 of the slider unit 5013, that is, the bypass condition such that the inlet 5082 is communicated with the bypass passage 5090.

Then, when the operation of the internal combustion engine is stopped in this condition and a fixed time passes, the heat storage material 5026 is partially solidified and the volume is a little decreased, and as shown in FIG. 34 to FIG. 36 and FIG. 44 to FIG. 45, the slider 5042 travels for a predetermined amount in the direction to decrease the heat storage material filling space 5070, in combination with the urging force of the spring 5044. At this time, the slider 5042 attains the first fluid introducing condition where the bottom plate section 5063 side of the introductory switching hole 5066 is communicated with the communication hole 5057 of the guide case 5041. Here, the inlet 5082 is communicated with the introducing passage 5059, the introducing hole 5057, the intermediate guide passage 5068, the respective second introductory guide holes 5067, the respective first introductory guide holes 5055, the respective introductory guide passages 5056, the respective introductory guide passages 5074 of the first separator 5014, the respective fluid passages 5024 of the main member 5012, the respective fluid passage communication holes 5079 of the second separator 5015, the respective fluid passages 5024 of the main member 5012, the respective fluid passage communication holes 5079 of the first separator 5014, the respective fluid passages 5024 of the main member 5012, and the outlet 5086 of the second lid member 5017. That is to say, in the condition where the heat storage material 5026 is at least partially solidified, in the slider unit 5013, the flow-in destination of a fluid introduced from the inlet 5082 is to the fluid passage 5024.

Then, when the internal combustion engine is operated in this condition and the heat containing fluid is introduced to the inlet 5082, the fluid flows from the outer end section to the inner end section of the fluid passage 5024 in the multiple spiral shape, of the main member 5012 closest to the slide unit 5013 side. It then flows from the inner end section to the outer end section of the fluid passage 5024 in the multiple spiral shape, of the next main member 5012. Then, it flows from the outer end section to the inner end section of the fluid passage 5024 in the multiple spiral shape, of the next main member 5012. At this time, it receives heat from the heat storage material 5026 in the heat storage material filling space 5027 which is gradually phase changed from the liquid form into the solid form and radiates heat, so that the temperature rises. In this condition, the heat containing fluid is introduced from the outlet 5086 to the internal combustion engine, and the heat is passed to the cooled internal combustion engine to give good startability.

When the heat is radiated as above, the heat storage material 5026 is gradually phase changed from the liquid form into the solid form, and the solid form with the large density is precipitated to the lower section of the heat storage unit 4011 by gravity in combination with the urging force of the spring 5044, and the volume is decreased. Consequently the slider 5042 of the slider unit 5013 travels in the direction to decrease the volume of the heat storage material filling space 5070. Finally, as shown in FIG. 37 to FIG. 39 and FIG. 46 to FIG. 47, it attains the second fluid introducing condition where the opening section 5065 side of the introductory switching hole 5066 is matched with the introducing hole 5057, and the heat radiation process is terminated.

Subsequently, when the temperature of the internal combustion engine rises and the temperature of liquid for cooling the engine is sufficiently raised above the melting point of the heat storage material 5026, then in reverse to the above, the heat storage material 5026 is phase changed from the solid form into the liquid form so that the heat is stored. At this time, regarding the heat storage material 5026, the density becomes smaller and the volume is increased, congregating to the top of the heat storage unit 5011. Consequently, the liquid heat storage material 5026 which overflows from the heat storage material filling space communication hole 5075 of the first separator 5014 adjacent to the slider unit 5013, flows into the heat storage material filling space 5070 of the slider unit 5013, and makes the slider 5042 travel in the direction to increase the heat storage material filling space 5070, against the urging force of the spring 5044.

Then, when the heat storage material 5026 becomes all liquid form, as shown in FIG. 31 to FIG. 33 and FIG. 42 to FIG. 43, the slider 5042 attains the bypass condition where the bypass passage hole 5064 is communicated with the introducing hole 5057 and the discharging hole 5058 of the guide case 5041. The heat containing fluid introduced from the inlet 5082 via the introducing passage 5059 and the introducing hole 5057, is then discharged from the bypass passage hole 5064, the discharging hole 5058 and the bypass discharging passage 5060, that is the bypass passage 5090, via the bypass outlet 5083, to the internal combustion engine side. That is to say, in the condition where the heat storage material 5026 is completely melted, then regarding the slider unit 5013, the flow-in destination of the fluid introduced from the inlet 5082 is to the bypass passage 5090. Accordingly, since the fluid does not pass through the spiral shaped fluid passage 5024 with the narrow passage cross-section area, the passage resistance is greatly decreased.

The travel amount of the slider 5042 at this time is set equal to the volume variation of the heat storage material 5026 before and after the phase change. That is, it becomes "the overall slide length of the slider 5042×the cross-section area=mass of heat storage material/(density of heat storage material in the solid condition−density of heat storage material in the liquid condition)."

As described above, according to the heat storage unit 5011 of the present embodiment, if the volume of the heat storage material 5026 varies according to the heat storage condition, the slider 5042 which is arranged so that a part faces to the heat storage material filling space 5070 travels so that the volume variation is absorbed. Therefore, it becomes unnecessary to enclose air for absorbing the volume variation of the heat storage material 5026 in heat storage material filling space 5027, and a sufficient amount of heat storage material 5026 can be filled into the heat storage material filling space 5027. Consequently, the volume variation of the heat storage material 5026 can be absorbed without the accompanying decrease in heat capacity, decrease in heat transfer coefficient, and oxidation and deterioration of the heat storage material 5026 due to the oxygen in the air, so that the heat storage capacity can be adequately maintained and high performance can be attained.

Furthermore, the slide unit 5013 utilizes the travel of the slider 5042 corresponding to the volume variation of this heat storage material 5026. In the condition where at least a part of the heat storage material 5026 solidifies, the flow-in destination of the fluid introduced from the inlet 5082 is to the fluid passage 5024. Therefore the fluid which receives heat from the heat storage material 5026 in the fluid passage 5024 is discharged to the internal combustion engine side, so that the heat is applied to the internal combustion engine side and the start-up becomes smooth. On the other hand, in the condition where the internal combustion engine side generates heat and the heat storage material 5026 completely melts, the flow-in destination of the fluid introduced from the inlet 5082 is to the bypass passage 5090. Therefore the fluid passes through the bypass passage 5090 to avoid passing through the fluid passage 5024, thereby preventing the occurrence of wasteful passage resistance. Consequently, components such as a sensor, three way valve, control unit and actuator become unnecessary, and the number of parts and the cost can be greatly reduced.

In addition, the slider unit 5013 is provided on the outside of the main member 5012 integrally formed with the outer wall section 5021, the heat insulating space formation section 5023, the fluid passage formation section 5025, and the heat storage material filling space formation section 5028. Therefore compared to the case where the slider unit 5013 is built-in, the shapewise limitation on the main member 5012 due to providing the slider unit 5013 is minimal. Consequently, the shapewise degree of freedom of the main member 5012 can be increased, and the heat can be effectively exchanged between the heat storage material 5026 and the fluid passage 5024.

Furthermore, since the fluid passage 5024 is a double or more spiral shape, then compared to a single spiral, for the same flow quantity, the flow velocity can be significantly reduced without reducing the heat exchange area.

Moreover, compared to a single spiral, for the same flowing quantity, the width of the passage can be narrowed and the quantity of fluid circulating can be reduced without reducing the heat exchange area. Therefore, miniaturization and high performance can be attained.

Furthermore, in the case where the fluid passage 5024 and the heat storage material filling space 5027 are double or more spiral shaped, the double or more spiral shaped heat storage material filling space 5027 becomes a shape converging on the center side of the spiral. However, in order to adequately operate the slider 5042 of the slider unit 5013 by the volume variation of the heat storage material 5026, it is effective to concentrate the volume variation of the heat storage material 5026, from all of the center sides of the heat storage material filling spaces 5027 which converge on the center side in this manner, and transmit this to the slider 5042 of the slider unit 5013. Due to this reason, by setting the slider unit 5013 side by side with the main member 5012 in the direction linking the openings 5021 at both ends of the main member 5012, the volume variation of the heat storage material 5026 can be effectively transmitted to the slider 5042. Therefore, the switching of the passages by the slider 5042 of the slider unit 5013 can be adequately conducted.

As abovementioned, when concentrating the volume variation of the heat storage material 5026 from all of the center sides of the spirals of the double or more spiral shaped heat storage material filling spaces 5027, and transmitting this to the slider 5042 of the slider unit 5013 which is set side by side with the main member 5012 in the direction linking the openings 5020 at both ends of the main member 5012, the direction of the volume variation of the heat storage material 5026 becomes the direction linking the openings of the main member 5012. Therefore, this arrangement is the most effective for moving the slider 5042 along the direction linking the openings 5020 of the main member 5012. Consequently, the switching of the passage by the slider 5042 of the slider unit 5013 can be even more adequately conducted.

In the above configuration, the case was explained as an example where the second lid member 5017, the main member 5012, the first separator 5014, the main member 5012, the second separator 5015, the main member 5012, the first separator 5014, the slider unit 5013 and the first lid member 5016 are sequentially laminated. However, except for the second lid member arranged on the one end side, the slider unit 5013 and the first lid member 5016 arranged on the other end side, the number of the main member 5012, the first separator 5014 and the second separator 5015 may be suitably changed. That it to say, on the second lid member 5017, similarly to the above, the main member 5012, the first separator 5014, the main member 5012, the second separator 5015, the main member 5012 and the first separator 5014 may be provided; and on this it is possible to further provide more than one set of the main member 5012, the second separator 5015, the main member 5012 and the first separator 5014; and on this, the slider unit 5013 and the first lid member 5016 can be provided.

INDUSTRIAL APPLICABILITY

The present invention relates to a heat storage unit suitable for waste heat recovery. For example, in an internal combustion engine, much waste heat is generated when driving. On the other hand, by applying heat when starting, start-up becomes smooth. Therefore this is applicable as a heat storage unit which stores the waste heat when driving and uses this for warming up when starting.

The invention claimed is:

1. A heat storage unit comprising:
    a main member provided with: a housing provided with openings at front and rear ends in the axial direction with identical cross-sections perpendicular to the axis; a plurality of wall sections within the housing, the wall sections including a fluid passage formation section which forms a fluid passage for circulating a heat containing fluid, on the inside of said housing, and a heat storage material filling space formation section which forms a heat storage material filling space for filling with a heat storage material, adjacent to said fluid passage on the inside of said housing;
    a plurality of reinforcing sections which extend inwardly from an interior surface of the housing into engagement with one of the wall sections; and
    a pair of lid members arranged at the front and rear ends of said main member,
    wherein said housing of said main member, said fluid passage formation section, and said heat storage material filling space formation section are integrally formed.

2. A heat storage unit according to claim 1, wherein said fluid passage formation section and said heat storage material filling space formation section are in a shape for wrapping around the axis.

3. A heat storage unit according to claim 2, wherein, in said fluid passage formation section, a communication port which communicates with either one of an inlet for introducing a fluid, and an outlet for discharging a fluid, formed in said lid member, is formed in an inner end, and a communication port which communicates with the other one of said inlet and said outlet is formed in the outer end.

4. A heat storage unit comprising:
    a main member provided with: a housing provided with openings at front and rear ends in the axial direction with identical cross-sections perpendicular to the axis, a heat insulating space formation section which forms a heat insulating space where a heat insulator for preventing radiation of heat is arranged, or which is to be a space, on the inside of said housing, a fluid passage formation section which forms a fluid passage for circulating a heat containing fluid, on the inside of said heat insulating space, and a heat storage material filling space formation section which forms a heat storage material filling space for filling with a heat storage material, adjacent to said fluid passage, on the inside of said heat insulating space; and a pair of lid members arranged at the front and rear ends of said main member, wherein, said housing of said main member, said heat insulating space formation section, said fluid passage formation section, and said heat storage material filling space formation section are integrally formed.

5. A heat storage unit according to claim 4, wherein said fluid passage formation section and said heat storage material filling space formation section are in a shape for wrapping around the axis.

6. A manufacturing method for a heat storage unit comprising a main member comprising a housing provided with openings at front and rear ends in the axial direction with identical cross-sections perpendicular to the axis; a plurality of wall sections within the housing, the wall sections including a fluid passage formation section which forms a fluid passage for circulating a heat containing fluid, on the inside of said housing, and a heat storage material filling space formation section which forms a heat storage material filling space for filling with a heat storage material, adjacent to said fluid passage, on the inside of said housing, a pair of lid members arranged at the front and rear ends of said main member, and a plurality of reinforcing sections which extend inwardly from an interior surface of the housing into engagement with one of the wall sections, the manufacturing method comprising the step of:

integrally forming said housing of said main member, said fluid passage formation section, said heat storage material filling space formation section, and said reinforcing sections.

7. A manufacturing method for a heat storage unit according to claim 6, wherein said fluid passage formation section and said heat storage material filling space formation section are formed in a shape for wrapping round the axis.

8. A manufacturing method for a heat storage unit according to claim 7, wherein the communication port which communicates with either one of an inlet for introducing a fluid, and an outlet for discharging a fluid, formed in said lid member, is formed in an inner end of said fluid passage formation section, and a communication port which communicates with the other one of said inlet and said outlet is formed in an outer end of said fluid passage formation section.

9. A manufacturing method for a heat storage unit comprising a main member comprising a housing provided with openings at front and rear ends in the axial direction with identical cross-sections perpendicular to the axis, a heat insulating space formation section which forms a heat insulating space where a heat insulator for preventing radiation of heat is arranged, or which is to be a space, on the inside of said housing, a fluid passage formation section which forms a fluid passage for circulating a heat containing fluid, on the inside of said heat insulating space, and a heat storage material filling space formation section which forms a heat storage material filling space for filling with a heat storage material, adjacent to said fluid passage, on the inside of said heat insulating space; and a pair of lid members arranged at the front and rear ends of said main member, the method comprising the step of:

integrally forming said housing of said main member, said heat insulating space formation section, said fluid passage formation section, and said heat storage material filling space formation section.

10. A manufacturing method for a heat storage unit according to claim 9, wherein said fluid passage formation section and said heat storage material filling space formation section are formed in a shape for wrapping around the axis.

11. A heat storage unit comprising a pair of main members, wherein bottomed cylindrical housing sections provided with openings at one end, fluid passage formation sections, which form fluid passages for circulating a heat containing fluid, on the inside of said housing sections, and heat storage material filling space formation sections which form heat storage material filling spaces for filling with a heat storage material, adjacent to said fluid passages, on the inside of said housing sections, are integrally formed, and these pair of main members comprise the opening sides of said housing sections mutually opposed.

12. A heat storage unit according to claim 11, wherein, in said main members, heat insulating space formation sections which form heat insulating spaces where heat insulators for preventing radiation of heat are arranged, or which are to be spaces, between said housing sections, said fluid passage formation sections and said heat storage material filling space formation sections, are further integrally formed.

13. A heat storage unit according to claim 11, wherein, in said main members, fluid inlets with axes arranged on the opening sides of said housing sections and which form a fluid introducing opening which communicates with one of said fluid passages, and fluid outlets with axes arranged on the opening sides of said housing sections and which form a fluid outlet opening which communicates with the other of said fluid passages, are further integrally formed.

14. A heat storage unit according to claim 11, wherein, in said main members, at the bottom sections of said housing sections, heat storage material circulation port sections which form heat storage material circulation openings which communicate with said heat storage material filling spaces, are further integrally formed.

15. A heat storage unit according to claim 11, wherein said main member is left-right symmetrically shaped.

16. A heat storage unit according to claim 11, wherein, between said pair of main members, a separator which separates between both of these main members is provided.

17. A heat storage unit according to claim 16, wherein, in said separator, a communication hole which communicates between said heat storage material filling spaces of said pair of main members is formed.

18. A heat storage unit according to claim 16, wherein said fluid passages are double spiral shaped communicating with each other at the center.

19. A heat storage unit according to claim 16, wherein said heat storage material filling spaces are double in the spiral shape.

20. A heat storage unit according to claim 11, wherein said pair of main members are identically shaped.

21. A heat storage unit comprising a main member, wherein a bottomed cylindrical housing section provided with an opening at one end; a plurality of wall sections within the housing, the wall sections including a fluid passage formation section which forms a fluid passage for circulating a heat containing fluid, on the inside of said housing section, and a heat storage material filling space formation section which forms a heat storage material filling space for filling with a heat storage material, adjacent to said fluid passage, on the inside of said housing section, are integrally formed, a plurality of reinforcing sections which extend inwardly from an interior surface of the housing into engagement with one of the wall sections, and a lid member opposes the opening side of said housing section.

22. A heat storage unit according to claim 21, wherein in said main member, a heat insulating space formation section which forms a heat insulating space where a heat insulator for preventing radiation of heat is arranged or which is to be a space, between said housing section, said fluid passage formation section and said heat storage material filling space formation section, is further integrally formed.

23. A heat storage unit according to claim 21, characterized in that in said main member, a fluid inlet with an axis arranged on the opening side of said housing section and which forms a fluid introducing opening which communicates with one of said fluid passages, and a fluid outlet with an axis arranged the opening side of said housing section and which forms a fluid outlet opening which communicates with the other of said fluid passages, are further integrally formed, and in said lid member, cover sections are respectively provided corresponding to the fluid inlet and the fluid outlet of said main member.

24. A heat storage unit according to claim 21, characterized in that in said lid member, a heat storage material circulation port section which forms a heat storage material circulation opening which communicates with said heat storage material filling space, is integrally formed.

25. A heat storage unit according to claim 21, characterized in that said fluid passage is a double spiral shape communicating with each other at the center.

26. A heat storage unit according to claim 21, characterized in that said heat storage material filling space is a double spiral shape.

27. A heat storage unit comprising:
two or more main members wherein; a cylindrical outer wall section with both ends open; a plurality of wall sections within the housing, the wall sections including a fluid passage formation section which forms a fluid passage for circulating a heat containing fluid, on the inside of said outer wall section, a heat storage material filling space formation section which forms a heat storage material filling space for filling with a heat storage material, adjacent to said fluid passage, on the inside of said outer wall section, are integrally formed, and which are set front to back so that the openings are opposed, and a plurality of reinforcing sections which extend inwardly from an interior surface of the housing into engagement with one of the wall sections,
a separator which separates between said main members adjacent to each other, and
a lid member which is respectively set on a front side of said main member at a front end and on a rear side of said main member at a rear end.

28. A heat storage unit according to claim 27, is characterized in that in said main members, heat insulating space formation sections which form heat insulating spaces where a heat insulator for preventing radiation of heat is arranged or which are to be spaces, between said outer wall sections, said fluid passage formation sections and said heat storage material filling space formation sections, are further integrally formed.

29. A heat storage unit according to claim 27, characterized in that in said lid member, a fluid circulation port section which forms a fluid circulation opening which communicates with said fluid passage, is integrally formed.

30. A heat storage unit according to claim 27, characterized in that in said lid member, a heat storage material filling port section which forms a heat storage material filling opening which communicates with said heat storage material filling space, is integrally formed.

31. A heat storage unit according to claim 27, characterized in that in said separator, a fluid passage communication hole which communicates between said fluid passages of said main members adjacent to each other, is formed.

32. A heat storage unit according to claim 27, characterized in that in said separator, a heat storage material filling space communication hole which communicates between said heat storage material filling spaces of said main members adjacent to each other, is formed.

33. A heat storage unit according to claim 27, characterized in that said at least two main members are identically-shaped.

34. A heat storage unit according to claim 27, characterized in that said fluid passages and said heat storage material filling spaces are respectively single spiral shaped or multiple spiral shaped.

35. A manufacturing method for a heat storage unit according to claim 27, characterized in that said main members are formed by injection molding or extrusion molding, and said at least two main members, said separators and said pair of lid members are joined and integrated.

36. A heat storage unit characterized in having:
a heat storage material filling space for filling with a heat storage material for which the volume varies corresponding to the heat storage condition,
a fluid passage which circulates a heat containing fluid introduced from an inlet along said heat storage material filling space filled with said heat storage material,
a bypass passage which bypasses said fluid passage to discharge said fluid introduced from said inlet, and
a passage switching section having a travelling member which travels due to the volume variation of said heat storage material inside said heat storage material filling space by being arranged so that a part faces to said heat storage material filling space, and which selectively switches the flow-in destination of said fluid introduced from said inlet by the position of said travelling member, to said fluid passage or to said bypass passage.

37. A heat storage unit according to claim 36, is characterized in that said heat storage material is one which if it stores heat and melts, the volume is increased, while if it releases heat and solidifies, the volume is decreased, and
said passage switching section selects the flow-in destination of said fluid introduced from said inlet, to said fluid passage, in a condition where at least a part of said heat storage material is solidified, and selects the flow-in destination of said fluid introduced from said inlet, to said bypass passage, in a condition where said heat storage material is completely melted.

38. A heat storage unit characterized in having:
a main member wherein: a cylindrical outer wall section having openings at both ends, a fluid passage formation section which forms a fluid passage for circulating a heat containing fluid introduced from an inlet, on the inside of said outer wall section, and a heat storage material filling space formation section which forms a heat storage material filling space for filling with a heat storage material for which the volume varies corresponding to the heat storage condition, adjacent to said fluid passage, on the inside of said outer wall section, are integrally formed, and
a passage switching section which is provided on the outside of said main member, and which selectively switches the flow-in destination of said fluid introduced from said inlet, according to a position of a travelling member which travels due to the volume variation of said heat storage material, to said fluid passage or to a bypass passage which bypasses said fluid passage to discharge.

39. A heat storage unit according to claim 38, characterized in that said fluid passage and said heat storage material filling space are respectively double or more spiral shaped centered on an axis in a direction linking bath ends of said openings, and said passage switching section is set side by side with said main member in a direction linking both ends of said openings.

40. A heat storage unit according to claim 39, characterized in that said travelling member travels along a direction linking said openings at both ends of said main member.

41. A heat storage unit according to claim 38, characterized in that, said heat storage material is one which if it stores heat and melts, the volume is increased, while if it releases heat and solidifies, the volume is decreased, and said passage switching section selects the flow-in destination of said fluid introduced from said inlet, to said fluid passage, in a condition where at least a part of said heat storage material is solidified, and selects the flow-in destination of said fluid introduced from said inlet, to said bypass passage, in a condition where said heat storage material is completely melted.

* * * * *